US006438566B1

(12) United States Patent
Okuno et al.

(10) Patent No.: US 6,438,566 B1
(45) **Date of Patent: *Aug. 20, 2002**

(54) DOCUMENT PROCESSING METHOD AND APPARATUS WHICH CAN ADD COMMENT DATA ADDED TO AN ORIGINAL DOCUMENT TO A REVISED DOCUMENT

(75) Inventors: Yasuhiro Okuno, Kawasaki; Tadashi Yamakawa, Yokohama; Masaaki Nagashima, Kawasaki; Takayuki Sasaki, Chikushino, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/734,308

(22) Filed: Oct. 21, 1996

Related U.S. Application Data

(63) Continuation of application No. 08/267,717, filed on Jun. 29, 1994, now abandoned.

(30) Foreign Application Priority Data

| | | |
|---|---|---|
| Jun. 30, 1993 | (JP) | 5-161382 |
| Jun. 30, 1993 | (JP) | 5-162780 |
| Jun. 30, 1993 | (JP) | 5-162781 |
| Jun. 30, 1993 | (JP) | 5-162782 |
| Nov. 30, 1993 | (JP) | 5-299297 |

(51) Int. Cl.[7] ........ G06F 17/21

(52) U.S. Cl. ........ 707/512; 707/511; 707/530

(58) Field of Search ........ 395/762, 766, 395/772, 773, 774, 776, 792, 793, 802, 336, 337, 338, 347, 601, 619; 707/501, 505, 511, 512, 513, 514, 530, 100, 203; 345/336, 337, 338, 347

(56) References Cited

U.S. PATENT DOCUMENTS

| | | | | |
|---|---|---|---|---|
| 4,667,228 A | | 5/1987 | Kawamura et al. | 358/80 |
| 4,789,962 A | * | 12/1988 | Berry et al. | 395/338 |
| 5,144,555 A | * | 9/1992 | Takadachi et al. | 395/792 |
| 5,146,552 A | * | 9/1992 | Cassorla et al. | 707/512 |
| 5,159,669 A | * | 10/1992 | Trigg et al. | 395/357 |
| 5,179,650 A | * | 1/1993 | Fukui et al. | 395/148 |

(List continued on next page.)

FOREIGN PATENT DOCUMENTS

| | | |
|---|---|---|
| EP | 0314183 | 5/1989 |
| EP | 0437159 | 7/1991 |

*Primary Examiner*—Stephen S. Hong
(74) *Attorney, Agent, or Firm*—Fitzpatrick, Cella, Harper & Scinto

(57) ABSTRACT

A comment added to a certain portion in a first document can be automatically re-added to an equivalent position in a second document, and comment transfer processing between documents is automatically performed. Position information of a comment with respect to an old document obtained from an old document comment file is stored in a position information area, and comment contents also obtained from the old document comment file are stored in a comment content area. A character string corresponding to the position information is extracted from an old document file, and is stored in a character string area. A new document file is searched on the basis of the character string stored in the character string area, and position information of the detected character string is stored in a candidate area. One of position information stored in the candidate area is selected according to a predetermined rule, and the selected position information is stored in a new position information area. The comment contents stored in the comment content area, and the position information stored in the new position information area are written in a new document comment file.

66 Claims, 78 Drawing Sheets

U.S. PATENT DOCUMENTS

| | | | | | |
|---|---|---|---|---|---|
| 5,253,362 | A | * | 10/1993 | Nolan et al. | 395/601 |
| 5,297,027 | A | * | 3/1994 | Morimoto et al. | 395/762 |
| 5,325,297 | A | * | 6/1994 | Bird et al. | 364/419.07 |
| 5,355,472 | A | * | 10/1994 | Lewis | 395/612 |
| 5,367,621 | A | * | 11/1994 | Cohen et al. | 395/762 |
| 5,371,675 | A | * | 12/1994 | Greif et al. | 364/419.1 |
| 5,428,733 | A | * | 6/1995 | Carr | 395/342 |
| 5,493,658 | A | * | 2/1996 | Chiang et al. | 395/375 |
| 5,557,722 | A | * | 9/1996 | DeRose | 395/774 |
| 5,564,046 | A | * | 10/1996 | Nemoto et al. | 395/613 |
| 5,574,898 | A | * | 11/1996 | Leblang et al. | 395/601 |

* cited by examiner abcde.fghij.klmno.
pqrst.uvwxy.eflmn.

COMMENT FILE

```
⟨comment⟩
⟨place⟩ 7,11 ⟨/place⟩
⟨content⟩ aabbc
⟨/content⟩
⟨/comment⟩
⟨comment⟩
⟨place⟩ 13,17 ⟨/place⟩
⟨content⟩ wwxxy
⟨/content⟩
⟨/comment⟩
```

FIG. 6

```
abcde.fghij.xyz.klmno.
pqrst.uvwxy.eflmn.
```

FIG. 8

COMMENT FILE

```
⟨comment⟩
⟨place⟩ 7,11 ⟨/place⟩
⟨content⟩ aabbc
⟨/content⟩
⟨/comment⟩
⟨comment⟩
⟨place⟩ 17,21 ⟨/place⟩
⟨content⟩ wwxxy
⟨/content⟩
⟨/comment⟩
```

FIG. 11

```
⟨doc⟩
 ⟨sec⟩ ⟨heading⟩ ABCD ⟨/heading⟩
  ⟨par⟩ abcde. ⟨/par⟩
  ⟨par⟩ fghij. ⟨/par⟩
 ⟨/sec⟩
 ⟨sec⟩ ⟨heading⟩ XYZUVW ⟨/heading⟩
  ⟨par⟩ klmno. ⟨/par⟩
  ⟨par⟩ pqrst. ⟨/par⟩
  ⟨par⟩ uvwxy. ⟨/par⟩
 ⟨/sec⟩
⟨/doc⟩
```

FIG. 12

COMMENT FILE

```
⟨comment⟩
⟨place⟩ 11,15 ⟨/place⟩
⟨content⟩ FGHIJ
⟨/content⟩
⟨/comment⟩
⟨comment⟩
⟨place⟩ 23,27 ⟨/place⟩
⟨content⟩ KLMNO
⟨/content⟩
⟨/comment⟩
```

FIG. 14

```
⟨doc⟩
 ⟨sec⟩ ⟨heading⟩ ABCD ⟨/heading⟩
  ⟨par⟩ abcde. ⟨/par⟩
  ⟨par⟩ fghij. ⟨/par⟩
 ⟨/sec⟩
 ⟨sec⟩ ⟨heading⟩ XYZUVW ⟨/heading⟩
  ⟨par⟩ hkppqr. ⟨/par⟩
  ⟨par⟩ klmno. ⟨/par⟩
  ⟨par⟩ pqrst. ⟨/par⟩
  ⟨par⟩ uvwxy. ⟨/par⟩
 ⟨/sec⟩
⟨/doc⟩
```

FIG. 15

COMMENT FILE

```
⟨comment⟩
⟨place⟩ 11,15 ⟨/place⟩
⟨content⟩ FGHIJ
⟨/content⟩
⟨/comment⟩
⟨comment⟩
⟨place⟩ 30,34 ⟨/place⟩
⟨content⟩ KLMNO
⟨/content⟩
⟨/comment⟩
```

FIG. 17

ORIGINAL DOCUMENT FILE abcde, fghij, klmno.
pqrst, uvwxy, eflmn.

FIG. 18

COMMENT FILE

⟨comment⟩
⟨place⟩ 1 ⟨/place⟩
⟨content⟩ aabbc
⟨/content⟩
⟨/comment⟩
⟨comment⟩
⟨place⟩ 2 ⟨/place⟩
⟨content⟩ ffghi
⟨/content⟩
⟨/comment⟩

FIG. 20

ORIGINAL DOCUMENT FILE

```
abcdpqrstghij, klmno.
zyxwv, utsrqp.
pqrst, uvwxy, eflmn.
```

FIG. 22

COMMENT FILE

```
<comment>
<place> 1 </place>
<content> aabbc
</content>
</comment>
<comment>
<place> 3 </place>
<content> ffghi
</content>
</comment>
```

FIG. 24

COMMENT FILE

```
<comment>
<place> 2 </place>
<content> FGHIJ
</content>
</comment>
<comment>
<place> 3 </place>
<content> KLMNO
</content>
</comment>
```

FIG. 26A

```
<doc>
 <sec> <heading> ABCD </heading>
  <par> abcde. </par>
  <par> fghij. </par>
 </sec>
 <sec> <heading> XYZUVW </heading>
  <par> nnopp. </par>
  <par> klmnefgg. </par>
  <par> klpqrs. </par>
  <par> uvwxy. </par>
 </sec>
</doc>
```

FIG. 26B

COMMENT FILE

```
<comment>
<place> 2 </place>
<content> FGHIJ
</content>
</comment>
<comment>
<place> 4 </place>
<content> KLMNO
</content>
</comment>
```

FIG. 31

ORIGINAL DOCUMENT FILE (NEW DOCUMENT)

53

```
abcde.xyz.klmno.
pqrst.uvwxy.eflmn.
```

FIG. 32

COMMENT FILE (FOR NEW DOCUMENT)

54

```
⟨comment⟩
 ⟨place⟩ 11,15 ⟨/place⟩
 ⟨content⟩ wwxxy ⟨/content⟩
⟨/comment⟩
```

FIG. 33

DROPOUT COMMENT FILE

55

```
⟨comment⟩
 ⟨place⟩ 7,11 ⟨/place⟩
 ⟨content⟩ aabbc ⟨/content⟩
⟨/comment⟩
```

FIG. 38

COMMENT FILE (FOR NEW DOCUMENT)

54

```
<comment>
 <place> 11,15 </place>
 <content> wwxxy </content>
</comment>
<dropout>
 <comment>
  <place> 7,11 </place>
  <content> aabbc </content>
 </comment>
</dropout>
```

FIG. 39

COMMENT FILE (FOR NEW DOCUMENT)

54

```
<comment>
 <place> 0,0 </place>
 <content> aabbc </content>
</comment>
<comment>
 <place> 11,15 </place>
 <content> wwxxy </content>
</comment>
```

FIG. 55

```
*****dropout
7,0
FGHIJ
*****
11,15
KLMNO
```

COMMENT FILE (FOR OLD DOCUMENT)

COMMENT FIL (FOR NEW DOCUMENT)

COMMENT FILE (FOR NEW DOCUMENT)

FIG. 66

COMMENT FILE (FOR NEW DOCUMENT)

```
⟨comment⟩
 ⟨place⟩ 7,0 ⟨/place⟩
 ⟨content⟩ aabbc ⟨/content⟩
⟨/comment⟩
⟨comment⟩
 ⟨place⟩ 11,15 ⟨/place⟩
 ⟨content⟩ xxyyz ⟨/content⟩
⟨/comment⟩
```

DOCUMENT FILE (ORIGINAL DOCUMENT)

```
<doc>
 <sec>
  <heading> ABCD </heading>
  <par> abcde. </par>
  <par> fghij. </par>
 </sec>
 <sec>
  <heading> XYZUVW </heading>
  <par> klmno. </par>
  <par> pqrst. </par>
  <par> uvwxy. </par>
 </sec>
</doc>
```

COMMENT FILE (FOR ORIGINAL DOCUMENT)

```
<comment>
 <place> 51,67 </place>
 <content> FGHIJ </content>
</comment>
<comment>
 <place> 104,120 </place>
 <content> KLMNO </content>
</comment>
```

DOCUMENT FILE (NEW DOCUMENT)

```
⟨doc⟩
 ⟨sec⟩
  ⟨heading⟩ ABCD ⟨/heading⟩
  ⟨par⟩ abcde. ⟨/par⟩
  ⟨par⟩ xyz. ⟨/par⟩
 ⟨/sec⟩
 ⟨sec⟩
  ⟨heading⟩ XYZUVW ⟨/heading⟩
  ⟨par⟩ klmno. ⟨/par⟩
  ⟨par⟩ pqrst. ⟨/par⟩
  ⟨par⟩ uvwxy. ⟨/par⟩
 ⟨/sec⟩
⟨/doc⟩
```

COMMENT FILE (FOR NEW DOCUMENT)

```
⟨comment⟩
 ⟨place⟩ 51,65 ⟨/place⟩
 ⟨content⟩ FGHIJ ⟨/content⟩
⟨/comment⟩
⟨comment⟩
 ⟨place⟩ 102,118 ⟨/place⟩
 ⟨content⟩ KLMNO ⟨/content⟩
⟨/comment⟩
```

COMMENT FILE (FOR NEW DOCUMENT)

```
⟨comment⟩
 ⟨place⟩ 46,0 ⟨/place⟩
 ⟨content⟩ FGHIJ ⟨/content⟩
⟨/comment⟩
⟨comment⟩
 ⟨place⟩ 31,47 ⟨/place⟩
 ⟨content⟩ KLMNO ⟨/content⟩
⟨/comment⟩
```

COMMENT FILE (FOR NEW DOCUMENT)

```
⟨comment⟩
 ⟨place⟩ 6,71 ⟨/place⟩
 ⟨content⟩ FGHIJ ⟨/content⟩
⟨/comment⟩
⟨comment⟩
 ⟨place⟩ 102,118 ⟨/place⟩
 ⟨content⟩ KLMNO ⟨/content⟩
⟨/comment⟩
```

DOCUMENT FILE (OLD DOCUMENT)

```
⟨A⟩
 ⟨B⟩ abcde ⟨/B⟩
 ⟨C⟩ fghij ⟨/C⟩
 ⟨D⟩
  ⟨E⟩ klmno ⟨/E⟩
  ⟨F⟩ pqrst ⟨/F⟩
 ⟨/D⟩
 ⟨G⟩ uvwxy ⟨/G⟩
 ⟨H⟩
  ⟨I⟩ eflmn ⟨/I⟩
 ⟨/H⟩
⟨/A⟩
```

COMMENT FILE (FOR OLD DOCUMENT)

```
⟨comment⟩
 ⟨place⟩ 48,78 ⟨/place⟩
 ⟨content⟩ cmnt ⟨/content⟩
⟨/comment⟩
```

52

COMMENT FILE (FOR NEW DOCUMENT)

FIG. 85

DOCUMENT FILE (NEW DOCUMENT)

```
abcde.xyz.klmno.
pqrst.uvwxy.eflmn

***** dropout comment *****
aabbc
```

COMMENT FILE (FOR NEW DOCUMENT)

```
<comment>
 <place> 11,15 </place>
 <content> eflmn </content>
</comment>
```

| OLD START POSITION | OLD END POSITION | CONTENTS |
|---|---|---|
| 7 | 11 | aabbc |
| 13 | 17 | wwxxy |

FIG. 90

DOCUMENT FILE (NEW DOCUMENT)

53

```
abcde. ⟨dropout⟩ aabbc ⟨/dropout⟩ xyz.klmno.
pqrst.uvwxy.eflmn.
```

FIG. 91

COMMENT FILE (FOR NEW DOCUMENT)

54

```
⟨comment⟩
 ⟨place⟩ 11,15 ⟨/place⟩
 ⟨content⟩ wwxxy ⟨/content⟩
⟨/comment⟩
```

```
THIS DOCUMENT IS ADDED
WITH COMMENT.                         51
NO COMMENT IS ADDED
TO PORTION DISPLAYED HERE.

⟨comment⟩
⟨line⟩ 1 ⟨/line⟩
⟨file⟩ /comment/c1 ⟨/file⟩
⟨/comment⟩
```

/comment/c1

```
COMMENT TEXT      52
IS DISPLAYED
HERE.
```

DOCUMENT PROCESSING METHOD AND APPARATUS WHICH CAN ADD COMMENT DATA ADDED TO AN ORIGINAL DOCUMENT TO A REVISED DOCUMENT

This application is a continuation of application Ser. No. 08/267,717 filed Jun. 29, 1994, now abandoned.

BACKGROUND OF THE INVENTION

The present invention relates to a document processing method and apparatus, which can add additional data such as a comment to a document.

A document processing apparatus, with which a user can add some comments to a portion of a document (e.g., a manual) stored in, e.g., a floppy disk, is known. FIG. 102 shows an example of a document (to be referred to as an original document hereinafter) furnished with a comment, and the display state of the comment. On a CRT screen 120, two windows are displayed. An original document is displayed on a text window 111, and a comment is displayed on a comment window 112. Therefore, the original document and the comment are displayed on different windows, and the position of the original document where the comment is added is represented by a line 113 connecting the two windows.

In this case, as a method of adding a comment to an original document, a special code as link information may be embedded in original document data. The comment is linked with the original document by the link information embedded in the original document, and the comment can be displayed by following the link information. Therefore, in the method of embedding the link information in the original document, a user who adds a comment must have an authority for embedding link information in an original document. In such an original document file, the same comment is displayed for any users who open the file. If another user added a comment, then the added comment is displayed. The contents (sentences) of the comment and the original document may be stored in the same file or in different files.

As a method of adding a comment for a user who cannot modify an original document, an original document and a comment are stored in different files (an original document file and a comment file), and when the comment and the original document are to be displayed, a system is started by inputting IDs (e.g., file names) of the two files, so as to link and display these data. In this case, information indicating a correspondence between the comment and the position of the original document is possessed by the comment file. For example, the comment file has position information indicating a correspondence between a comment and the ordinal number of the character in question from the beginning of the original document file.

In this method, each user can independently have a comment file, respectively, and the original document file is shared by all users. For this reason, no authority of modifying the original document file is required, and a user can display a document while displaying his or her own comment, without displaying comments added by other users. If the system arrangement allows to display comments added by other users, a user can display a document while displaying such comments, as a matter of course.

In the above-mentioned example, the number of characters from the beginning of the original document file or a special code embedded in original document data is used as position information indicating the adding position of a comment in the original document. Therefore, the position information of the comment and the state of the original document file are closely related to each other. For this reason, when the original document is partially modified to be a new version, and becomes a quite different document in terms of data, all comments added so far become meaningless even if the documents of old and new versions have similar contents.

For example, when a comment is added using link information, if a modified document (new document) is provided as a new document file, since no link information is embedded in the provided new document file, a special code as the link information must be re-embedded. When the number of characters from the beginning of a document is used as comment position information, if the number of characters in the provided new document is locally larger/smaller than that in an old document, a position (the number of characters from the beginning) where a comment is to be added changes even if the following contents remain the same. For this reason, a comment cannot be added at a correct position of a new document with the use of position information in a comment file for an unmodified document (old document). Therefore, in this case as well, the position information of a comment must be changed.

In particular, in the case of manuals whose versions are updated by adding some minor revisions or some sentences, the contents of a new document (new version) are not largely different from those of an old document (old version). Therefore, most of comments are still relevant to the new document. However, in the above-mentioned technique, since data of an original document is rewritten, old comments cannot often be utilized. When comments for an old document are to be utilized for a new document, the above-mentioned operation for transferring the comments is required, and such an operation is very troublesome.

SUMMARY OF THE INVENTION

It is an object of the present invention to provide a document processing method and apparatus, which can easily re-add additional data added to a certain portion of a first document to an equivalent position in a second document, and can transfer a comment from one document to another efficiently.

It is another object of the present invention to provide a document processing method and apparatus, which, when additional data added to a first document is re-added to an equivalent portion of a second document, can extract a portion having the same character string as that included at the addition position of the additional data in the first document from the second document, and can determine the portion as the equivalent portion.

It is still another object of the present invention to provide a document processing method and apparatus, which, when additional data added to a first document is re-added to an equivalent portion of a second document, can extract a portion having a predetermined similarity or higher to the addition position of the additional data in the first document from the second document as the equivalent portion.

It is still another object of the present invention to provide a document processing method and apparatus, which can extract a portion having a character string, which coincides with a character string of a predetermined number of characters included at the addition position of additional data in a first document, from a second document as an equivalent portion (note that the predetermined number of characters serves as the similarity).

It is still another object of the present invention to provide a document processing method and apparatus, which can extract a portion including a predetermined amount or more of words included at the addition position of additional data in a first document from a second document as an equivalent portion (note that a value for designating the predetermined amount serves as the similarity).

It is still another object of the present invention to provide a document processing method and apparatus, which can desirably set the above-mentioned similarity, and can flexibly extract the equivalent portion.

It is still another object of the present invention to provide a document processing method and apparatus, which can vary the above-mentioned similarity on the basis of a search state of an equivalent portion, and can detect the equivalent portion using an optimal similarity.

It is still another object of the present invention to provide a document processing method and apparatus, which, upon transfer or copy of additional data between first and second documents having a predetermined logical structure, can extract a portion equivalent to the addition position of the additional data in the first document from the second document by utilizing the logical structure.

It is still another object of the present invention to provide a document processing method and apparatus, which, upon efficient transfer of additional data between documents, can store additional data, which could not be transferred, to be distinguished from additional data which could be successfully transferred, and can prevent loss of comments upon transfer of the comments.

It is still another object of the present invention to provide a document processing method and apparatus, which can display additional data which could be successfully transferred to be distinguished from additional data which could not be transferred.

It is still another object of the present invention to provide a document processing method and apparatus, which can identify a correspondence between displayed additional data and a document even when the addition position of the displayed additional data falls outside the current document display range.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing an example of a new document file in the first embodiment;

FIG. 8 is a view showing an example of a comment file for a new document in the first embodiment;

FIG. 11 is an explanatory view of a data structure of a document file in the second embodiment;

FIG. 12 is an explanatory view of a data structure of a comment file in the second embodiment;

FIG. 14 is a view showing a new document file in the second embodiment;

FIG. 15 is a view showing a comment file for a new document in the second embodiment;

FIG. 17 is an explanatory view showing an example of a document file in the third embodiment;

FIG. 18 is an explanatory view of a data structure of a comment file in the third embodiment;

FIG. 20 is a view showing an example of a new document file in the third embodiment;

FIG. 22 is a view showing an example of a comment file for a new document in the third embodiment;

FIG. 24 is an explanatory view of a data structure of a comment file in the fourth embodiment;

FIG. 26A is a view showing an example of a new document file in the fourth embodiment;

FIG. 26B is a view showing an example of a comment file for a new document in the fourth embodiment;

FIG. 31 is a view showing the contents of a new document file in the sixth embodiment;

FIG. 32 is a view showing the contents of a comment file for a new document in the sixth embodiment;

FIG. 33 is a view showing the contents of a dropout comment file in the sixth embodiment;

FIG. 38 is a view showing the contents of a comment file for a new document as a result of execution of the comment transfer processing by the document processing apparatus of the eighth embodiment;

FIG. 39 is a view showing a comment file for a new document file, in which comments are distinguished from each other on the basis of position information;

FIG. 55 is a view showing an example of a comment file for a new document of the 11th embodiment;

FIG. 66 is a view showing an example of a comment file for a new document in the 14th embodiment;

FIG. 69 is a view showing an example of an old document file in the 15th embodiment;

FIG. 70 is a view showing an example of a comment file for an old document in the 15th embodiment;

FIG. 71 is a view showing an example of a new document file in the 16th embodiment;

FIG. 72 is a view showing an example of a comment file for a new document in the 15th embodiment;

FIG. 74 is a view showing an example of a comment file for a new document in the 15th embodiment;

FIG. 75 is a view showing an example of a comment file for a new document in the 16th embodiment;

FIG. 77 is a view showing an example of an old document file in the 17th embodiment;

FIG. 78 is a view showing an example of a comment file for an old document in the 17th embodiment;

FIG. 85 is a view showing an example of a new document file in the 18th embodiment;

FIG. 86 is a view showing an example of a comment file for a new document in the 18th embodiment;

FIG. 89 is a view showing an example of a comment information list in the 19th embodiment;

FIG. 90 is a view showing an example of a new document file in the 19th embodiment;

FIG. 91 is a view showing an example of a comment file for a new document in the 19th embodiment;

DETAILED DESCRIPTION OF THE PREFERRED EMBODIMENTS

The preferred embodiments of the present invention will be described hereinafter with reference to the accompanying drawings.

<First Embodiment>

Figure 1:
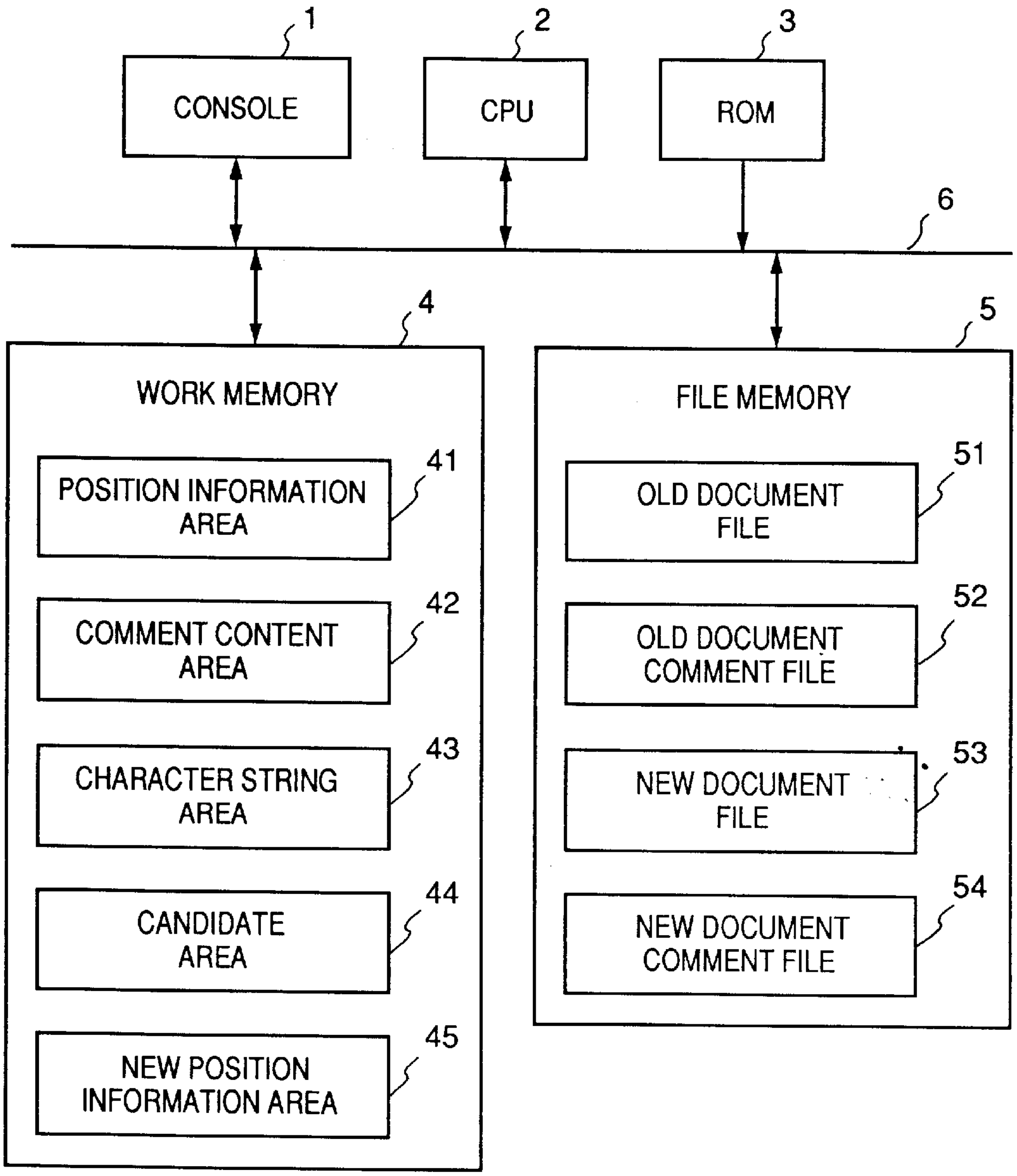
FIG. 1 is a schematic block diagram showing the arrangement of a document processing apparatus of the first embodiment.

FIG. 1 is a schematic block diagram showing the arrangement of a document processing apparatus of the first embodiment.

Figures 2, 3:
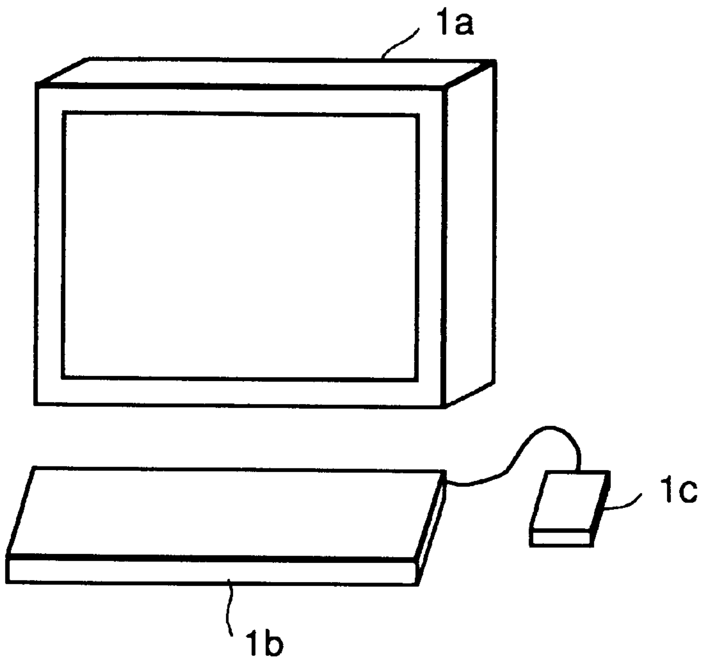
FIG. 2 is a perspective view for explaining the device arrangement of a console.
FIG. 3 is an explanatory view of an original document file in the first embodiment.

Referring to FIG. 1, a console 1 comprises input devices such as a keyboard, a mouse, and the like, and a screen display device such as a CRT. FIG. 2 is a perspective view for explaining the arrangement of the console 1, and illustrates a CRT la, a keyboard 1b, and a pointing device 1*c*. A CPU 2 controls the overall document processing apparatus of this embodiment. A ROM 3 stores programs used by the CPU 2 for executing various kinds of processing.

Various work areas necessary for transferring a comment are assured on a work memory 4. A position information area 41 is an area for storing position information of a comment read out from a comment file for an old document (to be referred to as an old document comment file hereinafter). A comment content area 42 is an area for storing a character string of the contents of a comment read out from the old document comment file. A character string area 43 is an area for storing a character string of a portion extracted from an old document file and corresponding to position information of a comment. A candidate area 44 is an area for, when the character string stored in the character string area 43 is searched from a new document file, and the same character string is found, storing the position information of the found character string in the new document file. A new position information area 45 is an area for storing one position information selected from those in the candidate area 44.

Reference numeral 5 denotes a file memory for storing document files and comment files. An old document file 51 is an unmodified file to which a comment has already been added. An old document comment file 52 is a comment file corresponding to the old document file 51. A new document file 53 is a document file which is obtained by modifying, e.g., an old document file, and to which no comment is yet added. A new document comment file 54 is a comment file which corresponds to the new document file 53, and in which no comment information is yet stored.

The above-mentioned units are connected to a bus 6. Note that the above-mentioned work memory 4 and file memory 5 are realized by RAMs, a hard disk, or the like.

A method of adding a comment to an original document will be described below.

In this embodiment, assume that one comment file corresponds to one document. The document herein is a normal text file, and is not a specific one. A correspondence between a document file and a comment file can be realized by adding some extension to a document file name as a comment file name. For example, a comment file corresponding to a document "doc1" can be named as "doc1.comment". The contents of the comment file include a plurality of pieces of comment information each consisting of a pair of position information and a comment content character string for each comment.

Figures 4, 5:
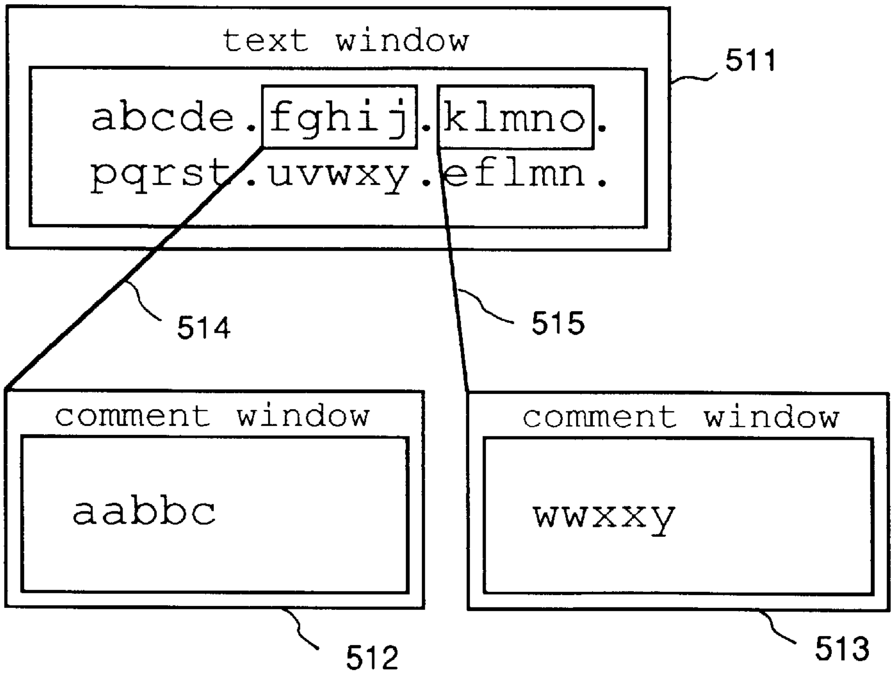
FIG. 4 is an explanatory view of a data structure of a comment file in the first embodiment.
FIG. 5 is a view showing the screen display state of comments in the first embodiment.

FIG. 3 shows an example of an original document stored in a document file. FIG. 4 shows the data structure of a comment file. A comment is added by designating a predetermined range in an original document. This range is designated using the number of characters from the beginning of an original document file. For example, when a comment "aabbc" is added to a portion "fghij" and a comment "wwxxy" is added to a portion "klmno" in the original document shown in FIG. 3, the contents of the comment file are as shown in FIG. 4.

One comment information consisting of position information and a comment content character string is sandwiched between character strings <comment> and </comment>. The position information (the number of characters from the beginning of a document file) sandwiched between <place> and </place> and a comment content text (comment itself) sandwiched between <content> and </content> are inserted between <comment> and </comment>.

In the case of the comment file shown in FIG. 4, the first comment information indicates that a comment "aabbc" is added to a character string ("fghij") from the seventh to 11th characters from the beginning of the document file shown in FIG. 3, and the second comment information indicates that a comment "wwxxy" is added to a character string ("klmno") from the 13th to 17th characters from the beginning of the document file.

A display shown in FIG. 5 is made on the display screen of the CRT 1*a* of the console 1 using the above-mentioned document file and comment file.

FIG. 5 shows the display state on the display screen of the CRT 1*a*. A display based on the document file 51 shown in FIG. 3 is made on a text window 511. Also, displays based on the contents of the comment file are made on comment windows 512 and 513. Furthermore, lines 514 and 515 connecting the text window and the comment windows are displayed on the basis of position information in the comment file.

As described above, assume that the old document file 51 is present as an original document of the first version, and a comment file corresponding to this document is created as the old document comment file 52. Then, assume that the original document of the first version is modified, and an original document (new document file 53) of a new version is provided, as shown in FIG. 6. At this time, if the old document comment file 52 (FIG. 4) corresponding to the document file (old document file 51) of the first version is used without any modifications, comments cannot be normally displayed in correspondence with the new document file 53 to and from which characters have already been added and deleted. Thus, a method of modifying a comment file corresponding to an old document to one corresponding to a new document will be described below.

A document of the first version is assumed to be the old document file 51, and a document of the second version is assumed to be the new document file 53. Also, comment files corresponding to the documents of different versions are respectively assumed to be the old document comment file 52 and the new document comment file 54. Furthermore, these files (51 to 54) are assumed to be stored in the file memory 5.

In this embodiment, as a means for detecting a portion, to which a comment is to be added, in the new document file 53, the following means is used. More specifically, when the same character string as that to which a comment is added in the old document file 51 is detected from the new document file 53, the detected character string is determined to be a portion, to which a comment is to be added, in the new document file 53. When a plurality of such character strings are detected, the one closest to a position (the number of characters from the beginning), where a comment is attached, in the old document file 51 is selected.

Figure 7:
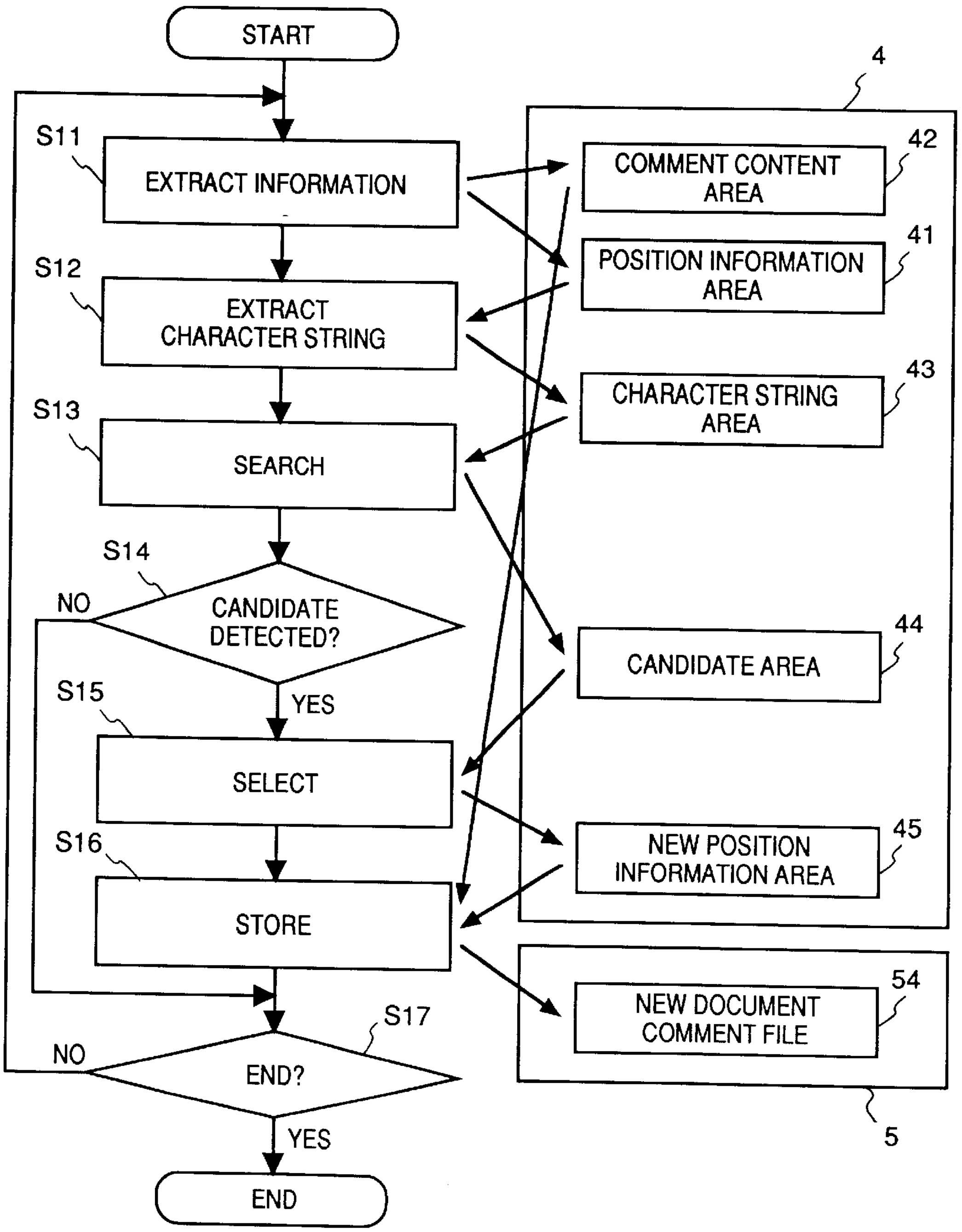
FIG. 7 is a flow chart showing the processing sequence for creating a comment file for a new document in the first embodiment.

FIG. 7 is a flow chart for creating the new document comment file for adding comments to the new document file 53. Note that FIG. 7 also illustrates the storage locations of various data or memory areas to be looked up in the corresponding steps of the flow chart.

In step S11, position information (the number of characters from the beginning of the document) indicating the position where a comment is added, and the contents of the comment are read out from the old document file 52, and are respectively stored in the position information area 41 and the comment content area 42 in the memory 4.

Furthermore, in step S12, a character string, to which each comment is added, in the old document file 51 is extracted. In this case, the character string need only be extracted from the old document file 51, as indicated by position information in each comment information. The extracted character string is stored in the character string area 43 in the work memory 4.

In step S13, the new document file 53 is searched for the same character string as that extracted in step S11. If the same character string is found, the numbers of characters indicating the start and end positions of the found character string in the new document file 53 are calculated, and a set of the two numbers are stored as a candidate position in the candidate area 44 of the work memory 4. This search operation is executed for all the sentences in the new document file 53, and if a plurality of character strings satisfying the search condition are found, a plurality of candidates are stored in the candidate area 44.

In step S14, it is checked if a candidate is present as a search result. If YES in step S14, the flow advances to step S15.

In step S15, a candidate which is determined to be closest to the position (stored in the position information area 41) of the comment added to the old document file 51 is selected from those in the candidate area 44, and the selected candidate is stored as new position information in the new position information area 45 of the work memory 4.

As the discrimination criterion for the closeness, a candidate numerically closest to the information in the position information area 41 of the old document file 51 is selected in this embodiment. For example, when a candidate from "the 45th to 52nd characters" and a candidate from "the 105th to 112th characters" are found as candidates for a comment added from "the 35th to 42nd characters" of the old document file 51, the candidate from "the 45th to 52nd characters" is selected. More specifically, the numbers of characters from the beginning of the document, which numbers represent the start positions of candidates, are simply compared with each other, and a candidate closest to the comment-added position in the old document file is selected. When a plurality of candidates equally close to the comment-added position in the old document file are found, a candidate having a smaller numerical value (closer to the beginning of the document) is selected.

In step S16, information stored in the new position information area 45 and the contents stored in the comment content area 42 are read out, and are written in the new document comment file 54 in the format of the comment file, as shown in FIG. 4.

If no candidate is found as a result of the search processing in step S13, the flow advances from step S14 to step S17. Therefore, if no candidate is detected in step S13, no data is output to the new document comment file 54.

The new document comment file 54 is assumed to have a file name obtained by adding a specific extension to the file name of the new document file 53 in this embodiment. If a file having such a name is not present, a new file of that name is created, and comment information is written in the new file. On the other hand, if a file having such a name has already been present, comment information is added to the file.

In step S17, it is checked if the above-mentioned processing is completed for all the comments stored in the old document comment file 52. If YES in step S17, this processing ends. However, if non-processed comment information remains, the flow returns to step S11 to repeat the above-mentioned processing.

With the above-mentioned processing, the new document comment file 54 corresponding to the new document file 53 can be generated based on the old document file 51 and the corresponding old document comment file-52.

For example, when a document file shown in FIG. 3 is presented as the old document file 51, and a document file shown in FIG. 6 is presented as the new document file 53, the new document comment file 54 shown in FIG. 8 is generated based on the old document comment file 52 shown in FIG. 4.

The above-mentioned comment file updating method is particularly effective since a comment for an old document can be reflected when the modification of a document is not of a large scale, the position of a comment added to an old document is substantially the same as that of a comment added to a new document, and the contents of a text to which the comment is added do not change.

In place of adding a comment to a desired range of an original document as in the first embodiment, a document may be considered as data strings divided by newline codes, and comments may be added in units of lines. In this case, position information is the line number (only one numerical value) indicating the addition position of a comment in the document. As a method of detecting a portion to which a comment is added, all character strings of lines to which comments are added are extracted from an old document file using the position information (the numbers of lines from the beginning of the document). Then, lines having the same contents are detected from a new document file, and corresponding comments are added to the lines. When a plurality of lines having the same contents are detected, a line closest to the position (the number of lines) of a comment added in the old document file can be selected. With this means, search processing can be simplified, and high-speed processing can be realized. Note that the method of designating a comment-added position using the number of lines will be described in detail in the third embodiment later.

<Second Embodiment>

The second embodiment will be described below.

In the first embodiment, a document file is a simple text file. However, in the second embodiment, a document is assumed to have a predetermined structure. A document is assumed to be divided into elements (document elements) constituting the document in accordance with the predetermined structure.

Figure 9:
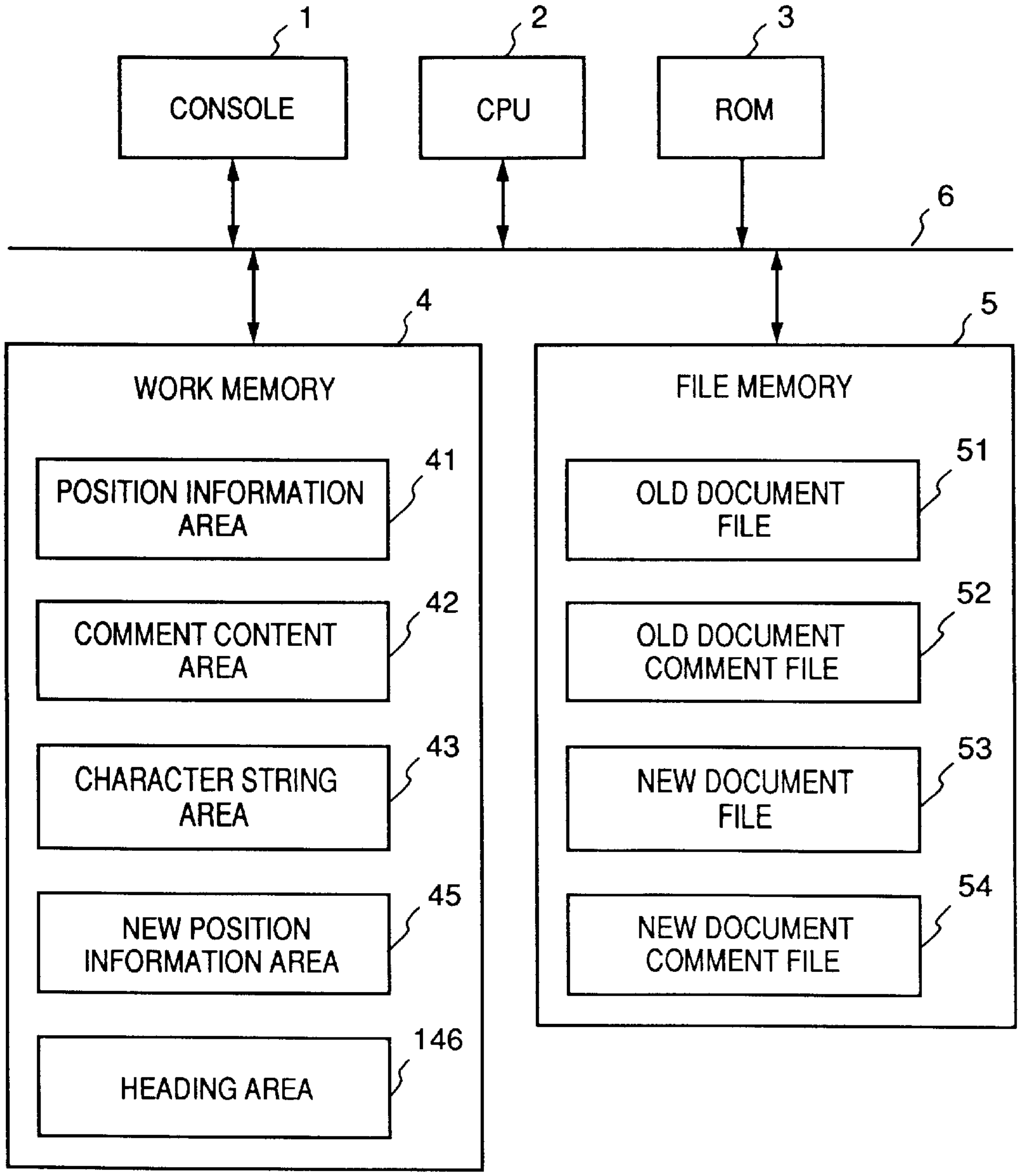
FIG. 9 is a schematic block diagram showing the arrangement of a document processing apparatus of the second embodiment.

FIG. 9 is a schematic block diagram showing the arrangement of a document processing apparatus of the second embodiment.

In this embodiment, a document (doc) is assumed to be constituted by the following document elements, for the sake of simplicity. More specifically, a document (doc) is defined to be constituted by a plurality of chapters or sections (sec), and each sec is constituted by one heading (heading) and a plurality of paragraphs (par).

The same reference numerals in FIG. 9 denote the same parts as in the arrangement of the first embodiment (FIG. 1), and a detailed description thereof will be omitted.

Referring to FIG. 9, a heading area 146 stores character strings representing the headings of sections, to which comments are added, in an old document.

Figure 10:
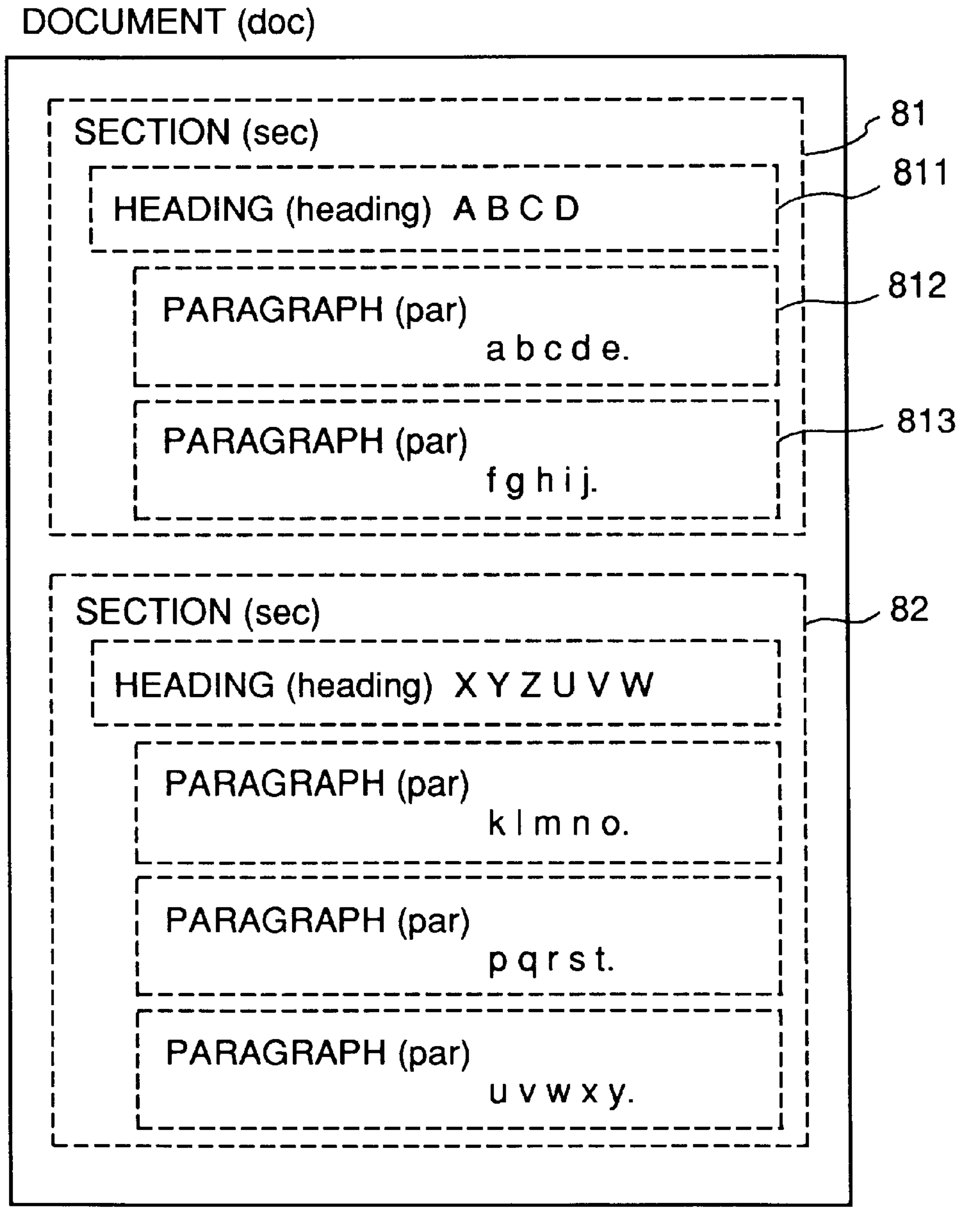
FIG. 10 is an explanatory view of a document structure in the second embodiment.

FIG. 10 shows an example of the arrangement of document element of a document in the second embodiment. In this case, one document has two sections (81, 82). In the section 81, a heading 811 is "ABCD", and two paragraphs (812, 813) "abcde" and "fghij" are present.

In the case of the document with the above-mentioned structure, a description in a document file is as shown in FIG. 11. That is, the entire document is sandwiched between <doc> and </doc>. Each section is sandwiched between <sec> and </sec>. A heading is sandwiched between <heading> and </heading>, and each paragraph is sandwiched between <par> and </par>. In the above-mentioned format, a structure is provided to a document.

(1) A character string described in a portion sandwiched between "<" and ">" represents a structure of a document, and will be referred to as a document element name hereinafter.

(2) A character string consisting of "<", a document character name, and ">" represents the start of a document element, and will be referred to as a document element start symbol hereinafter.

(3) A character string consisting of "<", "/", a document character name, and ">" represents the end of a document element, and will be referred to as a document element end symbol hereinafter.

(4) The contents of a document element are described in a portion sandwiched between the document element start symbol and the document element end symbol.

In the second embodiment, a document and a comment are stored in different files. Unlike in the first embodiment, the contents of a document file are described by a method specifying the structure of a document, as shown in FIG. 11. A comment file has information consisting a set of position information represented by the number of characters from the beginning of a document file, and comment contents as in the first embodiment, but the comment addition range is inhibited from extending over two or more document elements in a document file.

For example, in a document file shown in FIG. 11, when a comment "FGHIJ" is added to a character string "fghij" present in a section "ABCD", and a comment "KLMNO" is added to a character string "klmno" present in a section "XYZUVW", a comment file is as shown in FIG. 12. In this case, upon counting of the number of characters from the beginning of the document file, character strings used for document element start and end symbols are not counted.

In this embodiment, a means for detecting the addition position of a comment in a new document file is as follows. More specifically, when it is detected that a new document has a portion having the same heading as information of a portion starting from <heading> (information of a heading) in ma comment file corresponding to an old document, and the portion includes a character string having the same contents as those of a character string to which a comment is added, the portion is determined to be the addition position of the comment in the new document.

Figure 13:
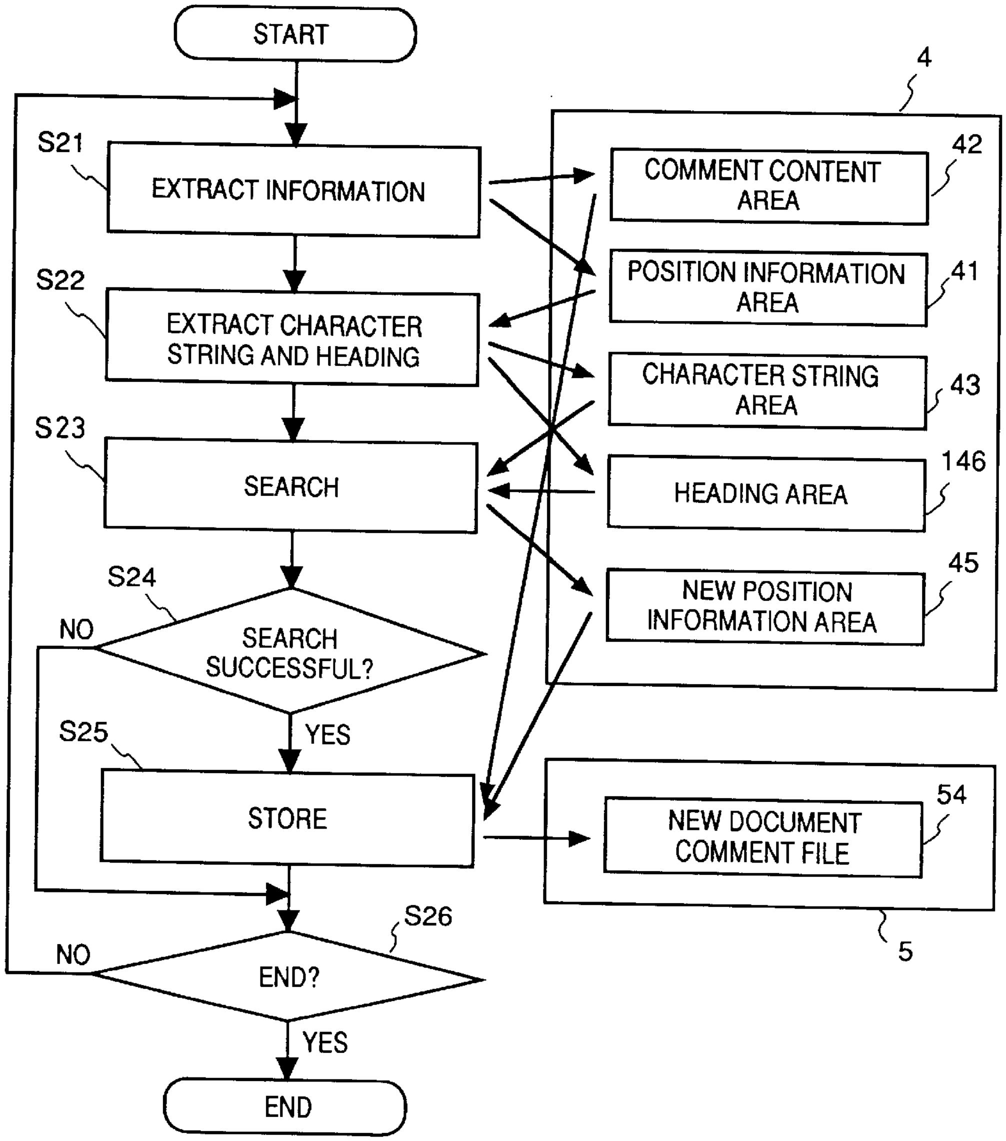
FIG. 13 is a flow chart showing the processing sequence for creating a comment file for a new document in the second embodiment.

The detection of the addition position of a comment will be described below with reference to the flow chart in FIG. 13. FIG. 13 is a flow chart showing processing for generating a new document comment file in the second embodiment. Note that FIG. 13 also illustrates the storage locations of various data or memory areas to be looked up in the corresponding steps of the flow chart.

In step S21, position information (the number of characters from the beginning of a document) of a comment and the contents of the comment are read out from the old document comment file 52, and are respectively stored in the position information area 41 and the comment content area 42 in the work memory 4.

In step S22, a character string, corresponding to the comment, in the old document file 51, and a heading of a section including the comment-added portion are extracted. The extracted character string and heading are respectively stored in the character string area 43 and the heading area 146 in the work memory 4.

In step S23, the headings in the new document file 53 are searched for the same heading as that stored in the heading area 146. If the same heading is present, whether or not the same character string as that stored in the character string area 43 is present in the section is examined. If the same character string is found, the numbers of characters indicating the start and end positions of the character string in the new document file 53 are calculated, and are stored as new position information in the new position information area 45 in the work memory 4. Note that the examination ends at the first hit position.

In step S24, it is checked if the search processing of the heading and character string in steps S22 and S23 has succeeded. If YES in step S24, the flow advances to step S25.

In step S25, the information stored in the new position information area 45 and the contents stored in the comment content area 42 are read out, and are written in the new document comment file 54 in the format of the comment file, as shown in FIG. 12.

On the other hand, if the search processing in steps S22 and S23 has not succeeded, the flow advances from step S24 to step S26. Therefore, when the search processing is not successful in step S23, no information is output to the new document comment file 54.

In step S26, it is checked if processing is completed for all the comments in the old document comment file 52. If non-processed comment information still remains, the flow returns to step S21 to repeat the above-mentioned processing. However, if processing is completed for all the comment information, this routine ends.

With the above-mentioned processing, the comment file 54 corresponding to the new document file 53 can be created based on the old document file 51 and the corresponding comment file 52.

For example, when a document file shown in FIG. 11 is presented as the old document file 51, and a document file shown in FIG. 14 is presented as the new document file 53, the new document comment file 54 shown in FIG. 15 is created based on the old document comment file 52 shown in FIG. 12.

Since the document structure does not largely change between old and new documents, portions having the same character strings in the ranges of the same sections probably have the same contents or meanings between the old and new documents. As described above, since the second embodiment utilizes the document structure, reliability of transfer of comments can be improved. In addition, since the first search processing is performed in units of headings, search efficiency can also be improved.

Note that the method of designating the comment position in the second embodiment is not limited to a method using the number of characters from the beginning of a document. For example, a designation method in units of lines described in the modification of the first embodiment may be used. Furthermore, the comment position may be designated using the number of characters or lines from the beginning of each heading.

As described above, according to the above-mentioned embodiments, the same character string as that included in a comment-added portion in an old document is searched from a new document, and a corresponding comment of the old document can be easily added to the searched character string in the new document. For example, a comment transfer operation performed every time the document version is updated can be efficiently realized.

<Third Embodiment>

Figure 16:
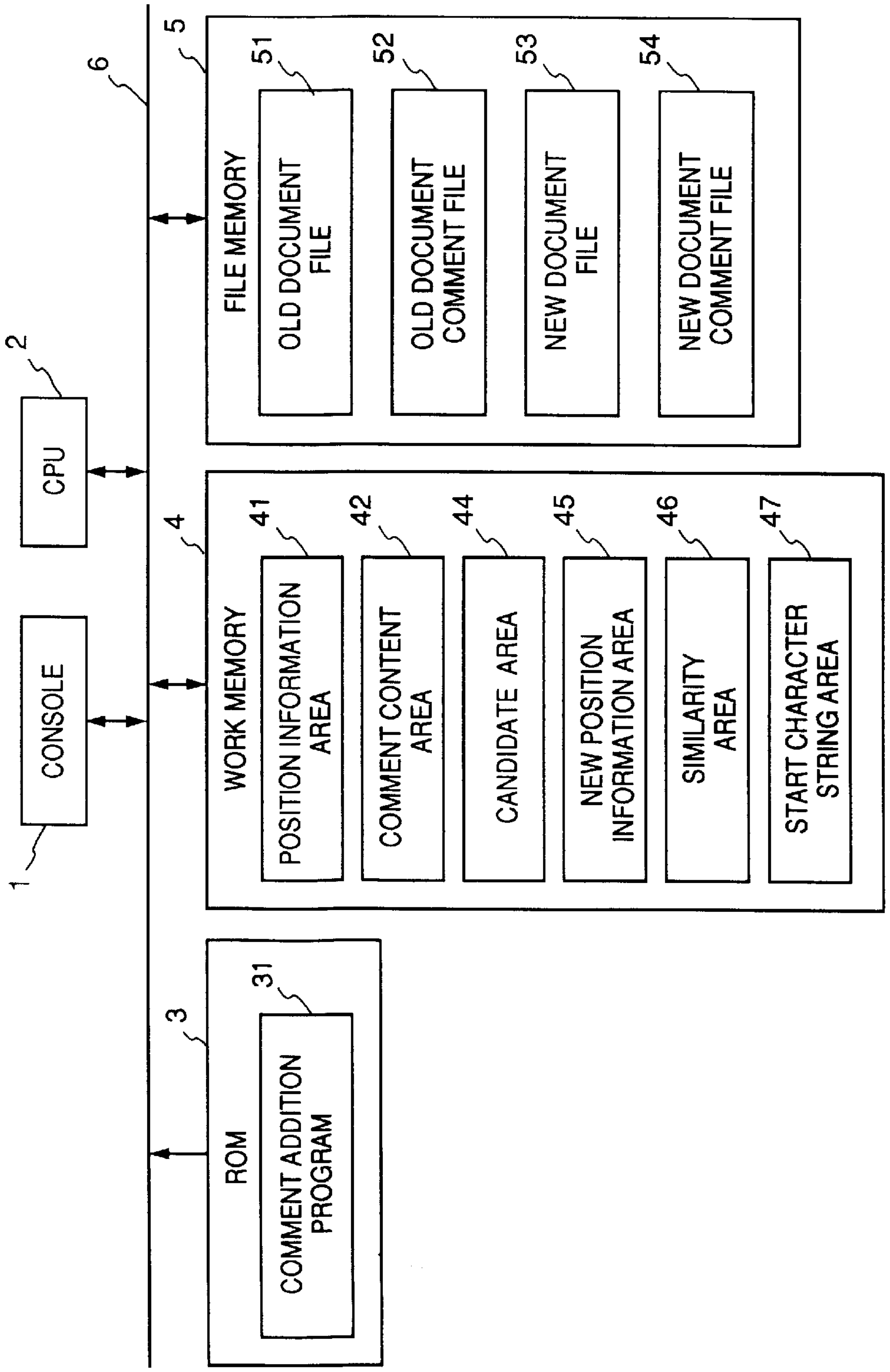
FIG. 16 is a schematic block diagram showing the arrangement of a document processing apparatus of the third embodiment.

FIG. 16 is a schematic block diagram showing the arrangement of a document processing apparatus of the third embodiment. The same reference numerals in FIG. 16 denote the same parts as in the first embodiment (FIG. 1), and a detailed description thereof will be omitted. A ROM 3 stores control programs used by the CPU 2 to execute various kinds of processing. Note that the ROM 3 stores a comment addition program 31 which is represented by a flow chart to be described later.

In the work memory 4, a similarity area 46 is an area for storing a designated similarity (to be described later). A start character string area 47 is an area for storing a character string in the old document file 51, which string is extracted based on position information stored in the position information area 41 and a similarity stored in the similarity area 46.

A method of adding a comment to an original document in the third embodiment will be described below. Note that a "document" indicates a document to which a comment is added.

One comment file corresponds to one document. A document is a normal text file, and is not a specific one. A correspondence between a document file and a comment file can be realized by adding some extension to a document file name as a comment file name. For example, a comment file corresponding to a document "doc1" can be named as "doc1.comment". One comment information consists of a pair of position information and comment contents. The contents of the comment file include a plurality of pieces of comment information.

In the third embodiment, a document is considered as data strings divided or delimited by newline codes, and comments are added in units of lines. A line to which a comment is added is designated by the number of lines from the beginning of a document file. For example, when a comment "aabbc" is added to a line starting from "abcde" (first line) and a comment "ffghi" is added to a line starting from "pqrst" (second line) in a document shown in FIG. 17, the contents of the comment file are as shown in FIG. 18.

In the comment file, one comment information is sandwiched between character strings <comment> and </comment>. In this information, position information (a line number indicating the number of lines from the beginning of a document file) is sandwiched between <place> and </place>, and comment contents (comment itself) are sandwiched between <content> and </content> are inserted. In the case of comment information in the comment file shown in FIG. 18, the first comment information indicates that a comment "aabbc" is added to the first line from the beginning of the document file shown in FIG. 17. The second comment information indicates that a comment "ffghi" is added to the second line from the beginning of the document file shown in FIG. 17.

Figure 19:
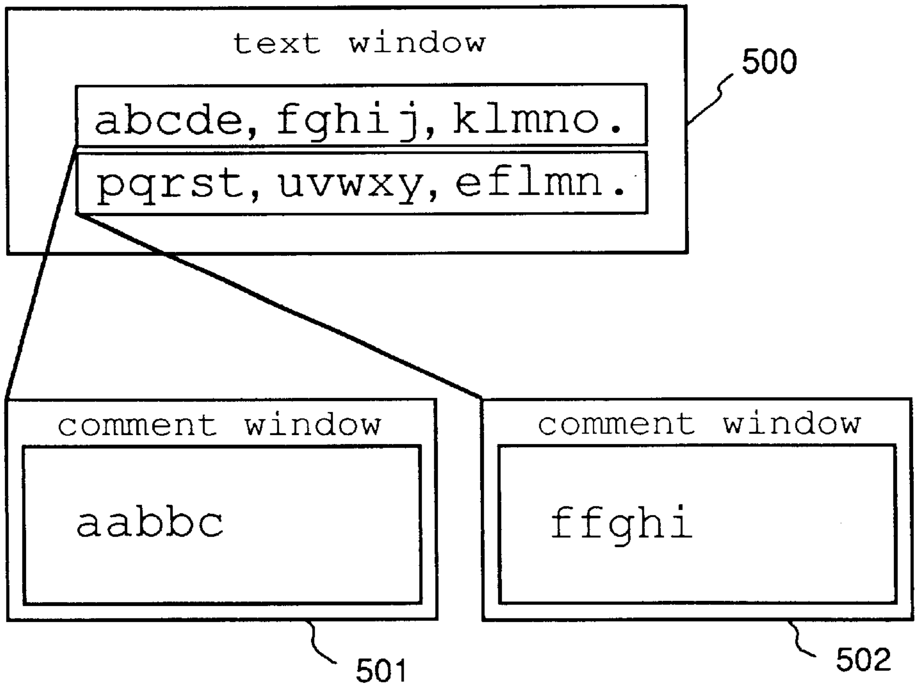
FIG. 19 is a view showing an example of a comment display screen in the third embodiment.

When the document file and comment file prepared as described above are present, these document and comments are displayed on the display screen of the CRT 1*a*, as shown in FIG. 19. In FIG. 19, a window 500 displays the document, and a window 501 displays the first comment. Also, a window 502 displays the second comment.

Assume that a document file of the first version is present, and a corresponding comment file is generated, as described above. Then, assume that the document file is modified to the second version, and the modified document file is presented to a user. At this time, if the comment file created for the document file of the first version is used without any modifications, comments cannot be normally displayed in correspondence with the document of the second version, in which characters have already been replaced.

For example, when the document file shown in FIG. 17 is assumed to be a document of the first version, and this document is modified, as shown in FIG. 20, to obtain a document file of the second version, the comment-added positions shift to different positions if the comment file shown in FIG. 18 is used.

A method of modifying the comment file corresponding to the first version to one corresponding to the document of the second version will be described below. Note that a document of the first version is assumed to be the old document file 51, a comment file corresponding to the document of the first version is assumed to be the old document comment file 52, and a document of the second version is assumed to be the new document file 53. Furthermore, a comment file to be created in correspondence with the document of the second version is assumed to be the new document comment file 54.

In the third embodiment, as a means for searching a portion similar to or coinciding with a portion added with a comment in an old document from a new document, a means based on "n-character coincidence" is used. With the "n-character coincidence" means, first n characters of a portion added with a comment in an old document are extracted, and whether or not a character string starting from the extracted n characters is present in data units (e.g., in units of lines, in units of characters, or the like) to which comments are to be added in a new document is used as a discrimination criterion for the similarity or coincidence.

For example, assuming that a document is considered as data strings divided by newline codes, and comments are added in units of lines as data units, the "n-character coincidence" means will be described below.

For example, a line "abcde, fghij, klmno" in an old document is modified to a line "abcdpqrstghij, klmno" to obtain a new document. In this case, upon execution of the "n-character coincidence" means of "n=4", since a coincidence is determined using first four characters "abcd" in the line "abcd, fghij, . . . ", it is determined that the line "abcdpqrstghij, klmno" is similar to that in the old document. However, upon execution of the "n-character coincidence" means of "n=5", since a coincidence is determined using first five characters "abcde", it is determined that the line "abcdpqrstghij, klmno" is not similar to that in the old document.

In this manner, since the degree of similarity can be changed by changing the value n, a similarity or coincidence can be flexibly determined. In this embodiment, the value n will be called a "similarity".

In the third embodiment, a portion (line) to which a comment is to be added in the new document file 53 is discriminated using the above-mentioned "n-character coincidence" means as a similar portion search means. In this case, when a plurality of corresponding portions (lines) are detected, a portion closest to the comment-added position (a line number indicating the number of lines from the beginning) in the old document is selected.

Figure 21A:
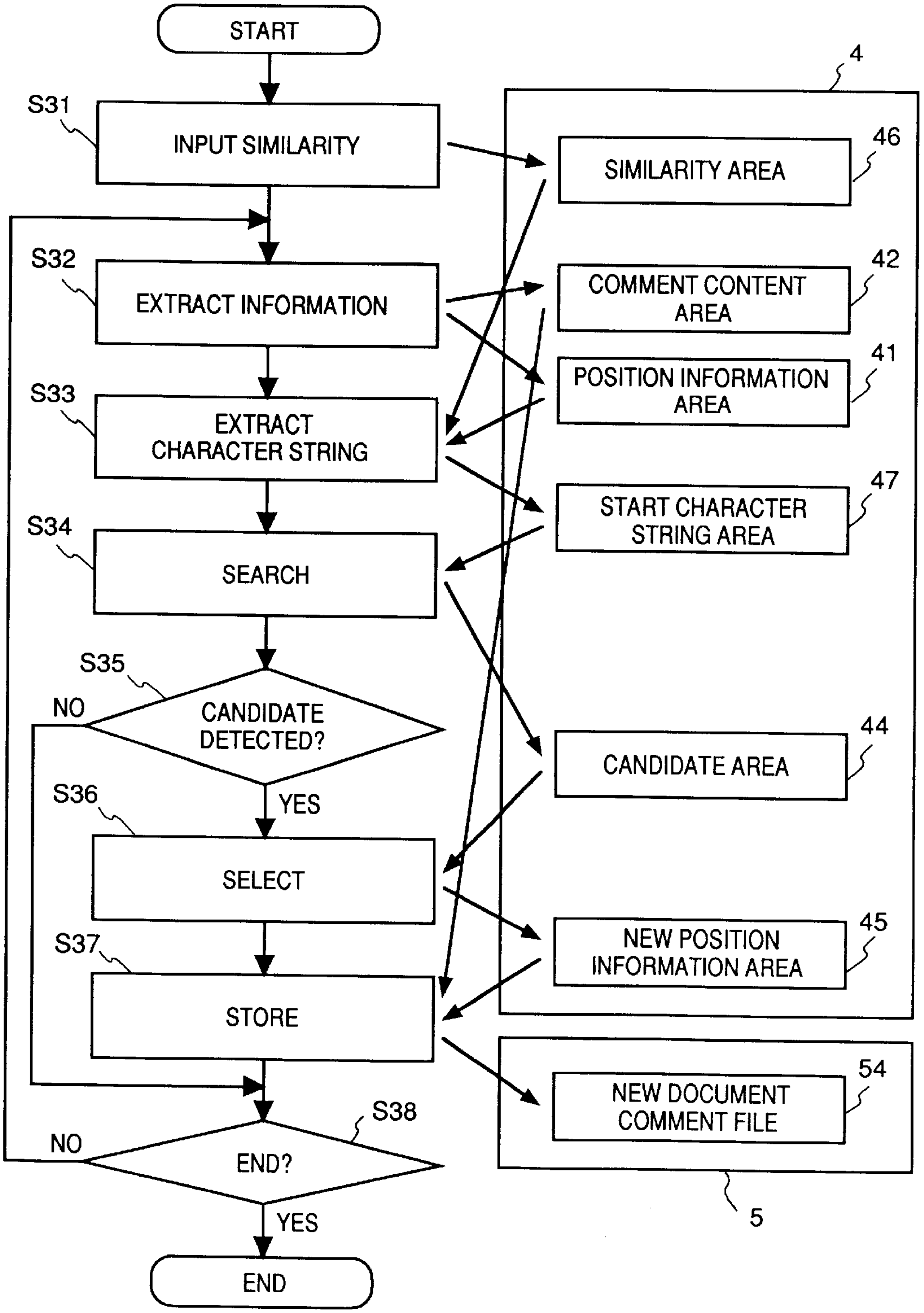
FIG. 21A is a flow chart showing the processing sequence for creating a comment file for a new document in the third embodiment.

FIG. 21A is a flow chart for explaining the processing sequence for creating the new document comment file 54 by the document processing apparatus of the third embodiment. Note that FIG. 21A also illustrates the storage locations of various data or memory areas to be looked up in the corresponding steps of the flow chart.

In step S31, a similarity (numerical value) is input using the input device of the console 1. The input similarity is stored in the similarity area 46 in the work memory 4.

In step S32, position information (line number) here a comment is added and the contents of the comment are read out from the old document comment file 52, and are respectively stored in the position information area 41 and the comment content area 42 in the work memory 4.

In step S33, characters, the number of which is designated by the similarity, are extracted from the beginning of a line to which the comment is added in the old document file 51 on the basis of the position information and similarity stored in the position information area 41 and the similarity area 46. The extracted character string is stored in the start character string area 47 in the work memory 4.

In step S34, the new document file 53 is searched for a line starting from the start character string stored in the start character string area 47. If such a line is found, the position (line number) of the found line is calculated, and this value is stored as a candidate in the candidate area 44 in the work memory 4. This search processing is executed for all the lines in the new document file 53, and if a plurality of lines satisfying the search condition are detected from the new document file 53, a plurality of candidates are stored in the candidate area 44.

In step S35, it is checked if a candidate is detected in step S34. If YES in step S35, the flow advances to step S36.

In step S36, a candidate closest to the position (stored in the position information area 41) of the comment added in the old document file 51 is selected from the stored candidates, and the position of the selected candidate is stored as new position information in the new position information area 45.

As the criterion for the closeness, in the third embodiment, a candidate numerically closest to the position stored in the position information area 41 is selected. For example, when a comment is added to the "second line" in the old document file 51, and the "third line" and "fourth line" are detected as candidates, the "third line" is selected as the new position information. In this case, the line numbers can be simply compared with each other, and a candidate closer to the position in the old document file can be selected. If candidates are equally close to the position in the old document file, a candidate having a smaller line number (closer to the beginning of a document) is selected.

In step S37, the information stored in the new position information area 45 and the contents stored in the comment content area 42 are written in the new document comment file 54 according to the format of the comment file shown in FIG. 18.

If no candidate is detected in step S35, the flow advances to step S38. Therefore, no data is written in the new document comment file 54. The new document comment file 54 is assumed to have a file name obtained by adding a specific extension to the file name of the new document file 53. If a file having such a name is not created yet, a new file is created, and comment information is written in the new file. On the other hand, if a file having such a name has already been created, comment information is added to the file.

In step S38, it is checked if processing is completed for all the comment information in the old document comment file 52. If non-processed comment information still remains, the flow returns to step S32 to repeat the above-mentioned processing; otherwise, this routine ends.

With the above-mentioned processing, the new document comment file 54 can be created based on the old document file 51 and the corresponding old document comment file 52.

For example, when a document file shown in FIG. 17 is presented as the old document file 51, and a document file shown in FIG. 20 is presented as the new document file 53, the new document comment file 54 shown in FIG. 22 is created based on the old document comment file 52 shown in FIG. 18.

As described above, according to the document processing apparatus of the third embodiment, a comment added to a certain portion in an old document can be automatically re-added to a position, corresponding to that in the old document, in a new document.

Note that comment transfer processing can be optimized by changing n, i.e., the similarity. For example, when comment transfer processing fails by the "n-character coincidence" means of "n=5", n is changed to "n=4". More specifically, if a candidate is detected by decreasing the similarity, it can be determined that an optimal value of the similarity is "n=4". When a plurality of comment transfer candidates are detected by the "n-character coincidence" means of "n=5", and the number of candidates can be decreased by changing n to "n=6", i.e., increasing the similarity, since "n=6" is a proper value in view of similarity, it can be determined that an optimal value is "n=6". More specifically, an optimal value of similarity in comment transfer processing can be obtained by changing the similarity.

Therefore, when a plurality of candidates are obtained in the search processing in step S34 of the third embodiment, the number of candidates can be decreased by increasing the similarity by one. Contrary to this, when no candidate is detected, the search processing may be executed again by decreasing the similarity by one.

Figure 21B:
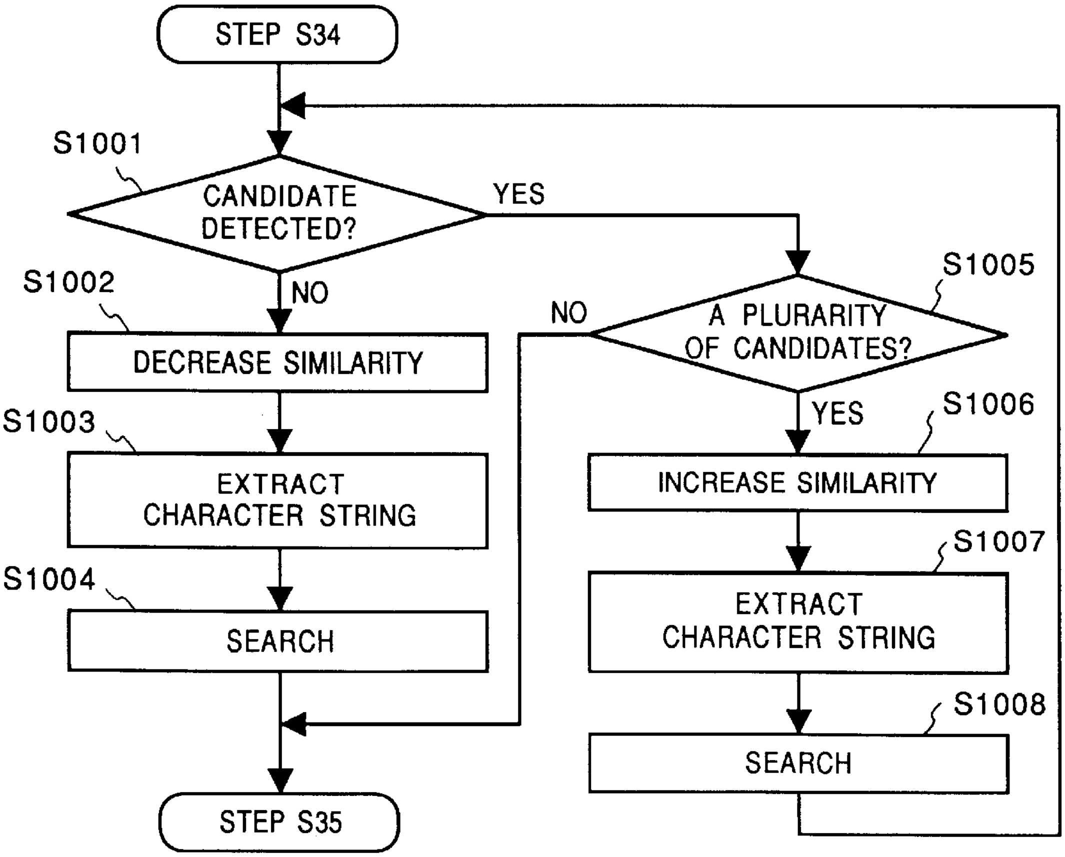
FIG. 21B is a flow chart showing processing for changing a similarity.

FIG. 21B shows the above-mentioned updating method of the similarity. FIG. 21B shows a flow to be inserted between steps S34 and S35 in FIG. 21A. It is checked if a candidate is detected in the search processing in step S34 above. If no candidate is detected, the similarity (i.e., the value n) is decreased by one (steps S1001 and S1002). In steps S1003 and S1004, extraction of a character string, and search processing of a similar portion (the same processing as in steps S33 and S34 above) are performed using the changed similarity. On the other hand, if it is determined in step S1001 that a candidate is detected, the flow advances to step S1005 to check if a plurality of candidates are detected. If the number of candidates is one, the flow directly advances to step S35. However, if a plurality of candidates is detected, the flow advances to step S1006, and the similarity is increased by one. In steps S1007 and S1008, extraction of a character string, and search processing of a similar portion (the same processing as in steps S33 and S34 above) are performed using the changed similarity. Then, the flow returns to step S1001.

The "n-character coincidence" means is particularly effective when the start characters of a portion added with a comment do not change when a new character string is inserted in the portion added with the comment.

In place of applying the "n-character coincidence means" to a start character string of a portion added with a comment as in this embodiment, the means may be applied to an end character string of a portion added with a comment. In this case, processing can be realized by substantially the same means as in the third embodiment. That is, processing based on the "start character string" can be replaced by that based on the "end character string". Thus, the same effect as in the third embodiment can be obtained.

When the "n-character coincidence means" is simultaneously applied to both the start and end character strings, search processing with higher precision can be realized.

In the third embodiment, a line including a start character string coinciding with that in an old document file is searched from a new document file in the search processing in step S34. However, the present invention is not limited to this. For example, a line including a coinciding character string somewhere in the line may be determined to be a candidate.

<Fourth Embodiment>

The fourth embodiment will be described below.

In the third embodiment, a document file is a simple text file. In the fourth embodiment, a case will be described below wherein a document has a predetermined structure like in the second embodiment.

Figure 23:
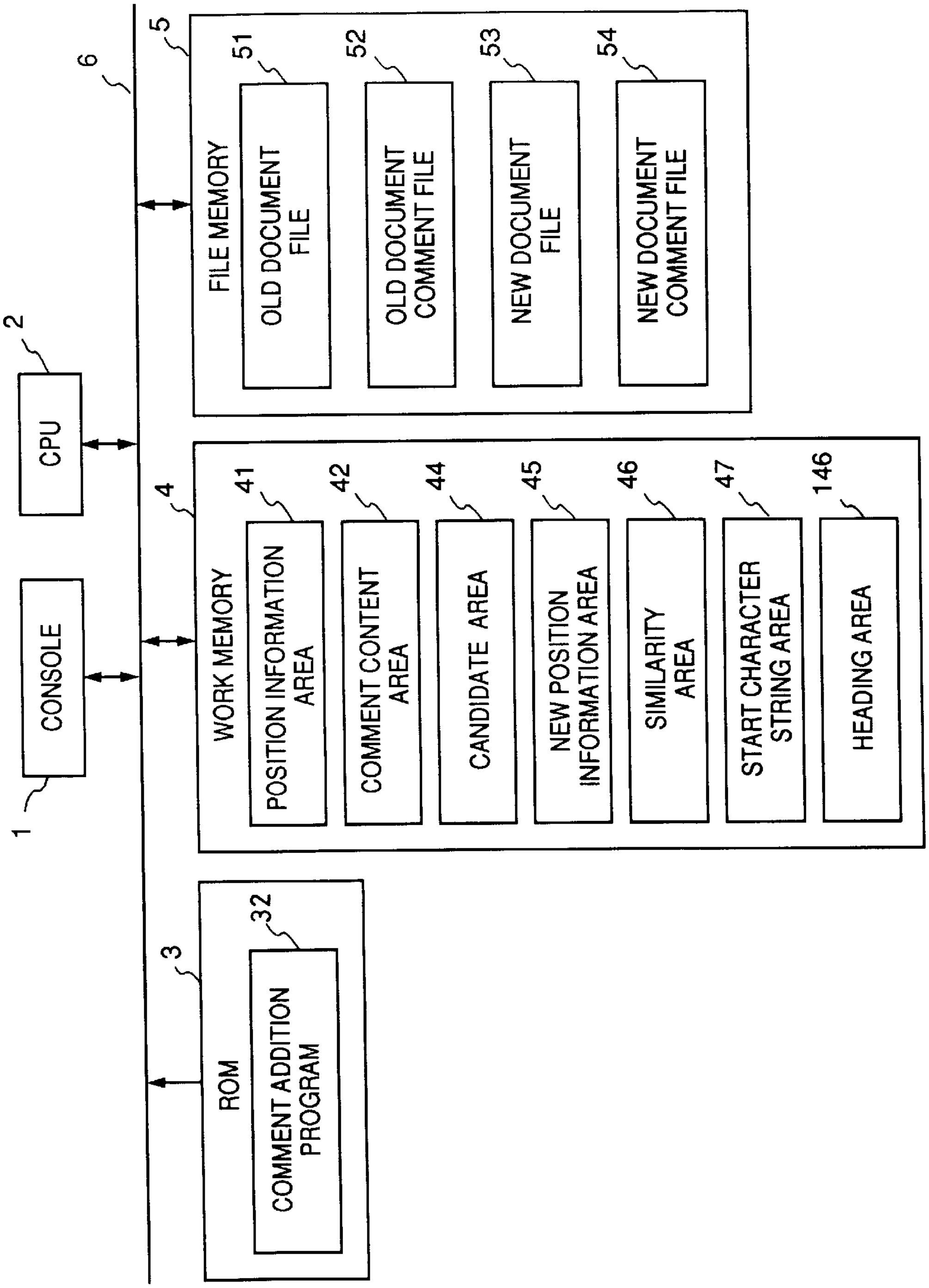
FIG. 23 is a schematic block diagram showing the arrangement of a document processing apparatus of the fourth embodiment.

FIG. 23 is a schematic block diagram showing the arrangement of a document processing apparatus of the fourth embodiment. The same reference numerals in FIG. 23 denote the same parts as in FIG. 16, and a detailed description thereof will be omitted. Therefore, only different portions from FIG. 16 will be described below. The work memory 4 includes a heading area 146 which stores headings (heading) of sections (sec) where comments are located. Also, the ROM 3 stores a comment addition program 32 which describes processing shown in the flow chart in FIG. 25 (to be described later).

In the fourth embodiment as well, a document and comments are stored in different files. A document file is described by the method specifying the structure of a document, as shown in FIG. 11, like in the second embodiment. On the other hand, comments are added in units of paragraphs (a document element starting from <par> and closed by </par>) unlike in the second embodiment. Therefore, as shown in FIG. 24, a comment file has information consisting of a pair of position information (paragraph number) indicating the number of paragraphs from the beginning of a document file, and comment contents. Note that the comment addition range is inhibited from extending over two or more document elements in a document file.

For example, in a document file shown in FIG. 11, when a comment "FGHIJ" is added to a paragraph "fghij" present in a section "ABCD", and a comment "KLMNO" is added to a paragraph "klmno" present in a section "XYZUVW", a comment file is as shown in FIG. 24.

In the fourth embodiment, similar portion search processing is executed as follows. A section having the same heading as information (heading information) of a portion starting from <heading> in a section including a paragraph added with a comment in an old document is obtained from a new document. In the section obtained in this manner, search processing is executed by the "n-character coincidence" means (start character string) on the basis of the paragraph added with the comment in the old document. If the corresponding paragraph is detected from the section obtained from the new document, it is evaluated that the detected paragraph is a similar paragraph. The similarity in the fourth embodiment is the same as that used in the third embodiment, and a detailed description thereof will be omitted. Note that processing in the fourth embodiment is executed in units of paragraphs in place of lines in the third embodiment.

Assume that the above-mentioned document file of the first version (FIG. 11) is present, and a corresponding comment file (FIG. 24) is created. Then, assume that the document file (FIG. 11) is modified to obtain a document file of the second version (FIG. 14), and the modified document file is presented to a user. At this time, if the comment file (FIG. 24) added to the document file of the first version is used without any modifications, comments cannot be normally displayed in correspondence with the document of the second version (FIG. 26A), in which characters have already been replaced.

A method of modifying the comment file corresponding to the first version to one corresponding to the document of the second version will be described below. Note that a document of the first version is assumed to be the old document file 51, a comment file corresponding to the document of the first version is assumed to be the old document comment file 52, and a document of the second version is assumed to be the new document file 53. Furthermore, a comment file to be created in correspondence with the document of the second version is assumed to be the new document comment file 54.

Figure 25:
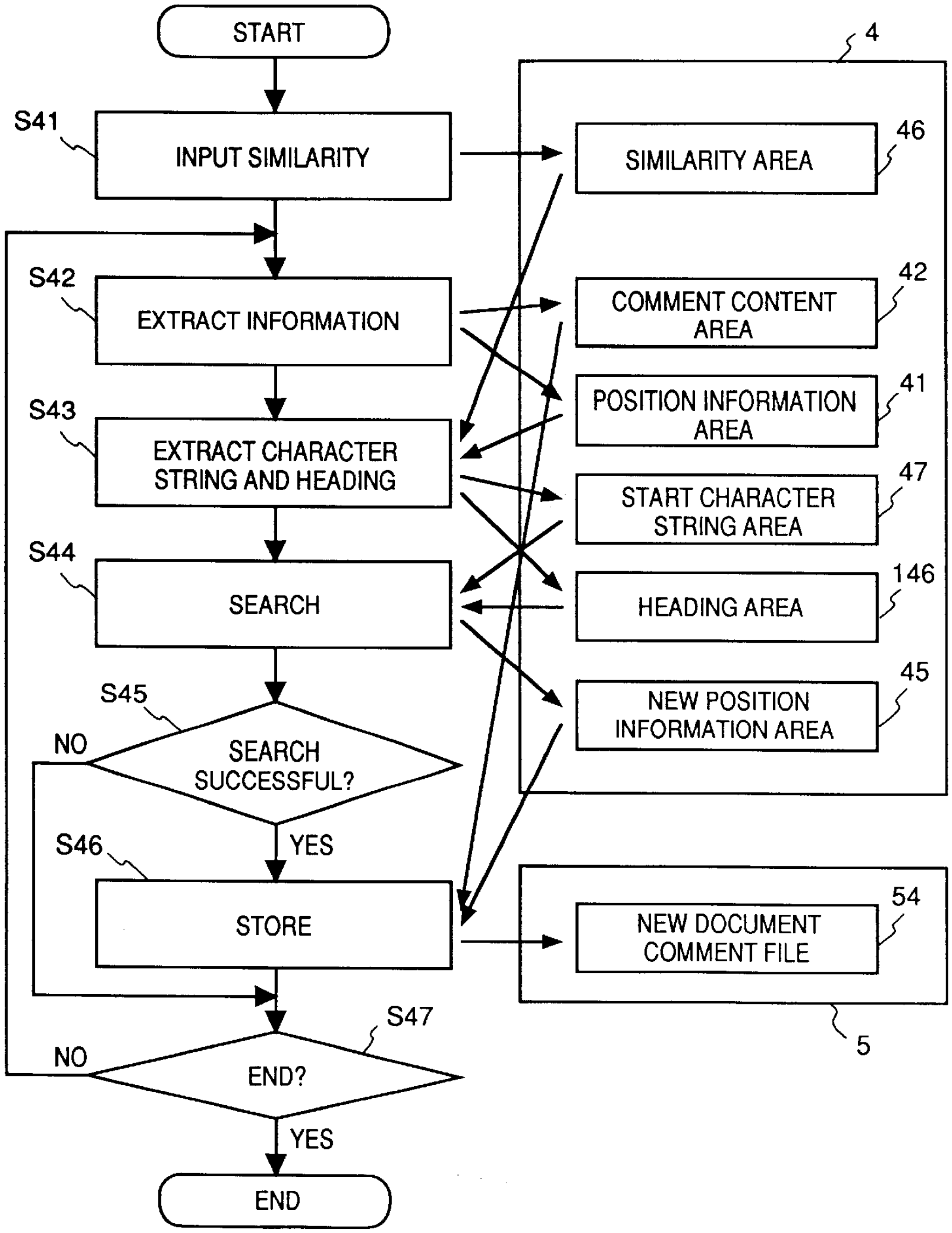
FIG. 25 is a flow chart showing the processing sequence for generating a file for a new document in the fourth embodiment.

FIG. 25 is a flow chart showing the sequence for creating the new document comment file 54 by the document processing apparatus of the fourth embodiment. Note that FIG. 25 also illustrates the storage locations of various data or memory areas to be looked up in the corresponding steps of the flow chart.

In step S41, a similarity (numerical value) is input using the input device of the console 1. The input similarity is stored in the similarity area 46 in the work memory 4.

In step S42, position information (paragraph number) where a comment is added and the contents of the comment are read out from the old document comment file 52, and are respectively stored in the position information area 41 and the comment content area 42 in the work memory 4.

In step S43, characters, the number of which is designated by the similarity, are extracted from the beginning of a paragraph, added with a comment, in the old document file 51 on the basis of the information stored in the position information area 41 and the similarity area 46. At the same time, the heading of a section where the comment is added is extracted. The extracted character string and heading are respectively stored in the character string area 47 and the heading area 146 in the work memory 4.

When a section having the same heading as that stored in the heading area 146 is detected among the headings in the new document file 53 in step S44, the detected section is searched for a paragraph starting from the start character string stored in the start character string area 47. If the corresponding paragraph is detected, the position (the number of paragraphs from the beginning; paragraph number) of the detected paragraph in the new document file 53 is calculated, and is stored as new position information in the new position information area 45 in the work memory 4. Note that the search processing ends at the first hit position.

In step S45, it is checked if the search processing executed in steps S43 and S44 is successful. If YES in step S45, the flow advances to step S46.

In step S46, the information in the new position information area 45 and the contents in the comment content area 42 are read out, and are written in the new document comment file 54 in the format of the comment file shown in FIG. 26B.

On the other hand, if the search processing in steps S43 and S44 is not successful, the flow advances from step S45 to step S47, and no information is written in the new document comment file 54.

In step S47, it is checked if processing is completed for all the comments in the old document comment file 52. If non-processed comment information still remains, the flow returns to step S42 to repeat the above-mentioned processing. However, if processing is completed for all the comment information, this routine ends.

With the above-mentioned processing, the comment file 54 (FIG. 26B) corresponding to the new document file 53 (FIG. 26A) can be created based on the old document file 51 (FIG. 11) and the corresponding comment file 52 (FIG. 24).

The start four characters of the fourth paragraph in FIG. 26A start with "klmn", and coincide with those in the third paragraph in the old document (FIG. 11). Therefore, it is determined that the fourth paragraph of the new document is similar to the third paragraph of the old document, and the comment file is created, as shown in FIG. 26B.

In the fourth embodiment described above, the comment positions are specified in units of paragraphs. However, the present invention is not limited to this. For example, the comment positions may be specified in units of lines, as has been described above in the third embodiment.

<Fifth Embodiment>

In the fifth embodiment, a "similarity function" means is used as a means for searching a portion, which is similar to or coincides with a portion added with a comment in an old document, from a new document. With the "similarity function", the rate (%) of occurrence of words (e.g., nouns), included in a character string as a comparison reference, in a character string to be compared is calculated, and it is checked if the calculated value is equal to or larger than a designated similarity discrimination reference value. For example, if the similarity discrimination reference value is set to be 75%, if eight out of 10 designated words occur in a character string to be compared, the occurrence rate in this case is calculated to be 80%, and it is determined that the character string to be compared is similar to that used as a comparison reference. By changing the similarity discrimination reference value, the similarity/coincidence can be flexibly determined. In this embodiment, this discrimination reference value is called a "similarity".

Figure 27:
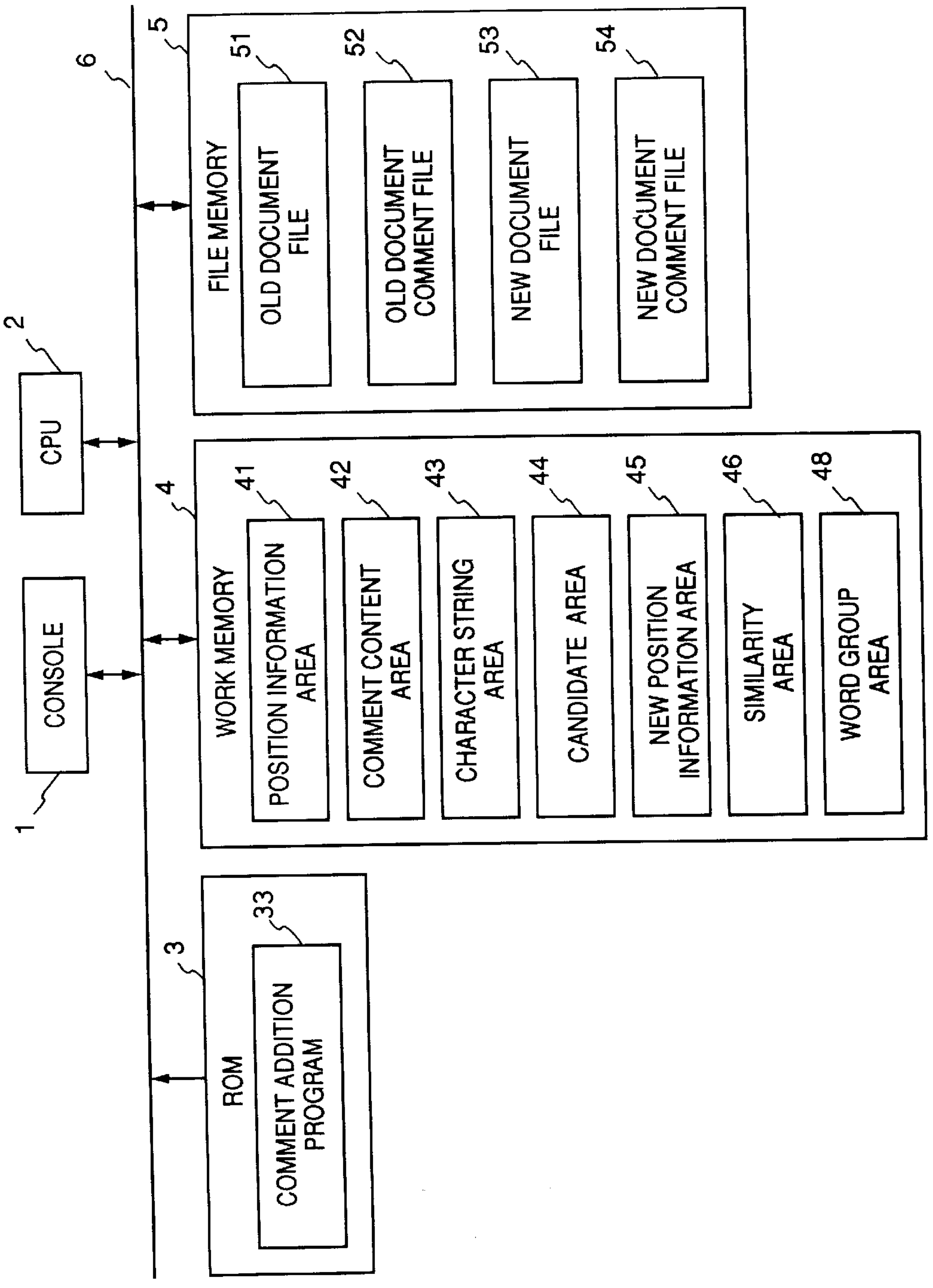
FIG. 27 is a schematic block diagram showing the arrangement of a document processing apparatus of the fifth embodiment.

FIG. 27 is a schematic block diagram showing the arrangement of a document processing apparatus of the fifth embodiment. The same reference numerals in FIG. 27 denote the same parts as in FIG. 1 of the first embodiment or FIG. 16 of the third embodiment, and a detailed description thereof will be omitted. Note that the function of a word group area 48 will be understood from the following description of the operation.

A method of creating a comment file corresponding to a document of the second version on the basis of a comment file corresponding to a document of the first version will be described below.

A document of the first version is assumed to be the old document file 51, a document of the second version is assumed to be the new document file 53, and a comment file corresponding to the document of the first version is assumed to be the old document comment file 52. Furthermore, a comment file to be created in correspondence with the document of the second version is assumed to be the new document comment file 54.

In the fifth embodiment, a document is considered as data strings divided by newline codes, and position information of each comment is assigned in units of lines, as in the third embodiment. As a search means of a similar portion in the new document file 53, the above-mentioned "similarity function" means is used, and a line to which a comment is to be added in the new document file 53 is discriminated. If a plurality of corresponding lines are detected, a line having the largest similarity function value is selected. Thereafter, if a plurality of lines still remain, a line closest to the comment position (the line number from the beginning) in the old document is selected.

Figure 28:
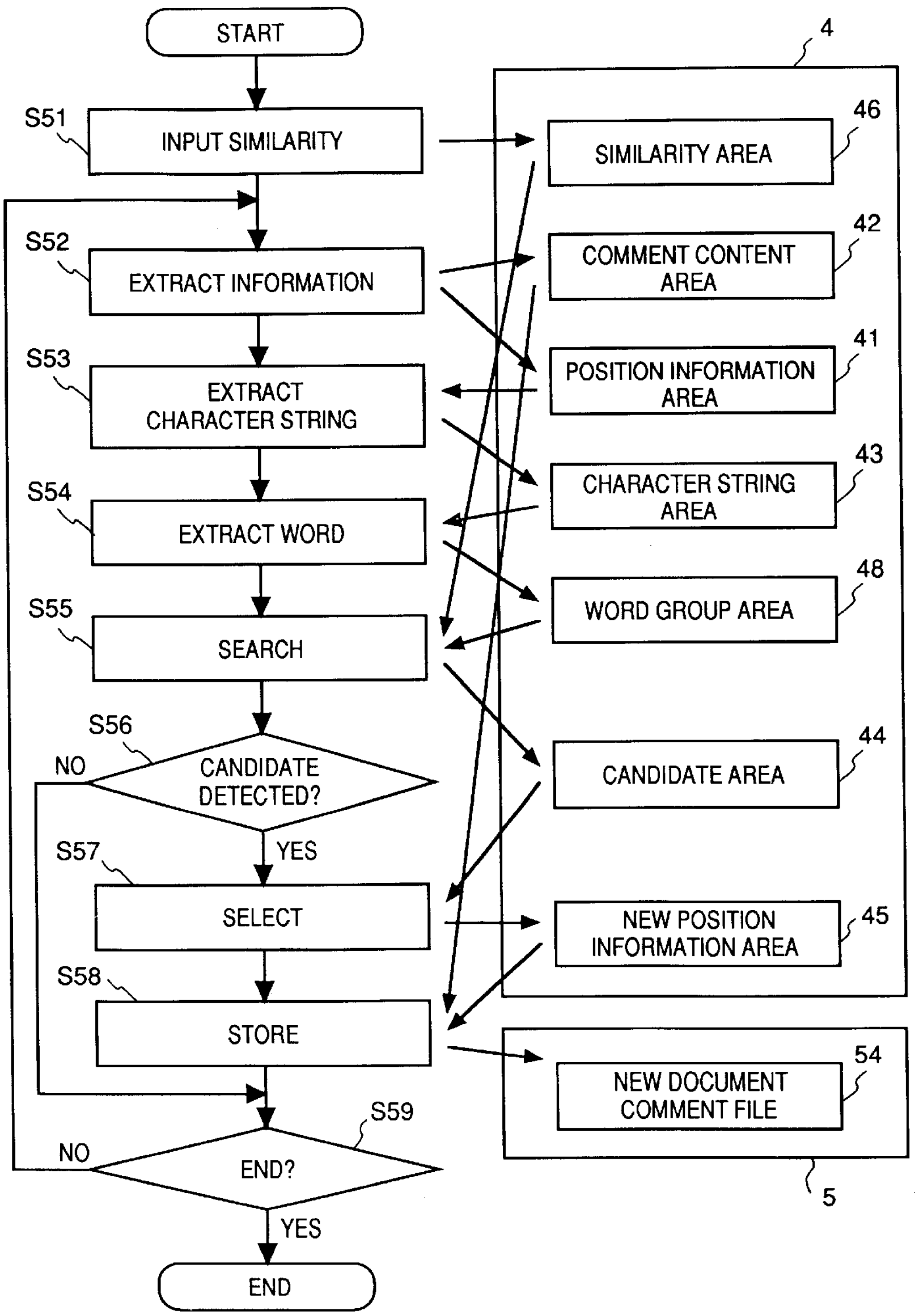
FIG. 28 is a flow chart showing the processing sequence for creating a file for a new document in the fifth embodiment.

FIG. 28 is a flow chart for explaining the sequence of similar portion search processing in the fifth embodiment.

In step S51, a similarity (numerical value) is input using the input device of the console 1. The input similarity is stored in the similarity area 46 in the work memory 4.

In step S52, position information (line number) where a comment is added and the contents of the comment are read out from the old document comment file 52, and are respectively stored in the position information area 41 and the comment content area 42 in the work memory 4.

Furthermore, in step S53, a character string of the entire line, to which the comment is added, in the old document file 51 is extracted. In this case, the corresponding character string is simply extracted from the old document file 51 on the basis of position information stored in the position information area 41. The extracted character string is stored in the character string area 43 in the work memory 4.

In step S54, the syntactic analysis of the character string extracted in step S53 and stored in the character string area 43 is performed to extract words from the character string. For example, nouns are extracted as words. The extracted words are stored in a word group area 48 in the work memory 4.

In step S55, the new document file 53 is searched for a similar portion on the basis of the word group extracted in step S54. In this case, the occurrence rate of words in the word group area 48 is calculated in units of lines in the new document file, and the search processing is achieved by checking if the calculated value of each line is larger than the similarity value stored in the similarity area 46.

If a similar line is detected, the position (line number) of the detected line from the beginning of the new document file 53 is calculated, and the calculated line number and occurrence rate are stored as a candidate in the candidate area 44 in the work memory 4. This search processing is executed for all the lines in the new document file 53, and if a plurality of lines satisfying the search condition are detected from the new document file 53, a plurality of candidates are stored in the candidate area 44.

In step S56, it is checked if a candidate is detected in step S55. If at least one candidate is detected, the flow advances to step S57.

In step S57, a candidate having the maximum occurrence rate is selected from those stored in the candidate area 44. If a plurality of candidates having the maximum occurrence rate are present, a candidate closest to the comment position (the position information stored in the position information area 41) in the old document file 51 is selected, and the position information of the selected candidate is stored as new position information in the new position information area 45 in the work memory 4.

As the criterion for the closeness, in the fifth embodiment, a candidate numerically closest to the position information in the position information area 41 is selected.

In step S58, the information stored in the new position information area 45 and the contents stored in the comment content area 42 are read out and are written as comment information in the new document comment file 54 in the format of the comment file shown in FIG. 18.

If no candidate is detected in the search processing in step S55, the flow advances from step S56 to step S59, and no information is written in the new document comment file 54. The new document comment file 54 is assumed to have a file name obtained by adding a specific extension to the file name of the new document file 53. If a file having such a name is not created yet, a new file is created, and comment information is written in the new file. On the other hand, if a file having such a name has already been created, comment information is added to the file.

In step S59, it is checked if processing is completed for all the comments in the old document comment file 52. If a non-processed comment still remains, the flow returns to step S52; otherwise, this routine ends.

As described above, the comment file 54 corresponding to the new document file 53 can be created based on the old document file 51 and the corresponding comment file 52.

The "similarity function" means is particularly effective for transfer of comments when similar words are used at a predetermined rate or higher even when the contents of a character string with a comment are modified in a new document.

In the fifth embodiment, the comment positions are specified in units of lines. Alternatively, the comment positions may be specified in units of paragraphs in a predetermined document structure like in the fourth embodiment.

As means for searching a portion similar to or coinciding with a portion added with a comment in an old document from a new document, a plurality of search means such as "perfect coincidence" means for determining a portion perfectly identical with a portion with a comment in the old document to be a coincidence, the "n-character coincidence" means described in the third embodiment, the "similarity function" means described in the fifth embodiment, and the like may be selectively used or combined in correspondence with the nature of a document. When a plurality of different search means are selectively used or combined, the search means can operate effectively in correspondence with different situations, and a comment transfer failure can be avoided as much as possible. In the above-mentioned "perfect coincidence" means, the comment position is specified by start and end character positions, and when a new document includes a character string which perfectly coincides with a character string in a range defined by these start and end character positions, a comment is added to that portion of the new document.

As described above, according to the comment addition method and the document processing apparatus of the present invention, a comment added to a certain portion in a first document can be easily re-added to an equivalent position in a second document, and a comment transfer operation between documents can be automatically realized.

Furthermore, when the "similarity" as a discrimination reference value of the equivalent position is properly set and changed, the search processing of a similar portion can be flexibly performed.

<Sixth Embodiment>

According to the first to fifth embodiments, a comment is re-added to a portion in a second document, which portion is evaluated as a portion having a meaning equivalent to that of a certain comment-added position in a first document, thus automatically realizing a comment transfer operation between documents. However, in each of the above embodiments, when a portion equivalent to a comment-added portion in the first document cannot be detected from the second document, the comment added to the first document cannot be reflected in the second document. Therefore, as a result of the modification of a document, a certain comment may be lost without the user's knowledge of it.

In the embodiment below, a document processing apparatus which preserves, in consideration of the above-mentioned problem, comment information, which could not be transferred upon automatic transfer of comments between documents, in an identifiable way, thereby preventing the comment from being unexpectedly lost upon transfer of comments, will be described below.

In the sixth embodiment, upon transfer of comments from an old document to a new document, when a portion having a meaning equivalent to that in the old document cannot be detected from the new document, a comment (a plurality of comments in some cases) is stored in a single file, thereby informing the comment, which could not be transferred, to a user.

In the sixth embodiment, as one method for detecting a portion having a meaning equivalent to that in the old document from the new document, a whole sentence coincidence method is adopted as in the first embodiment. More specifically, a portion in the new document, which has quite the same character string as that of a comment-added portion in the old document, is determined to be a portion having an equivalent meaning.

Figure 29:
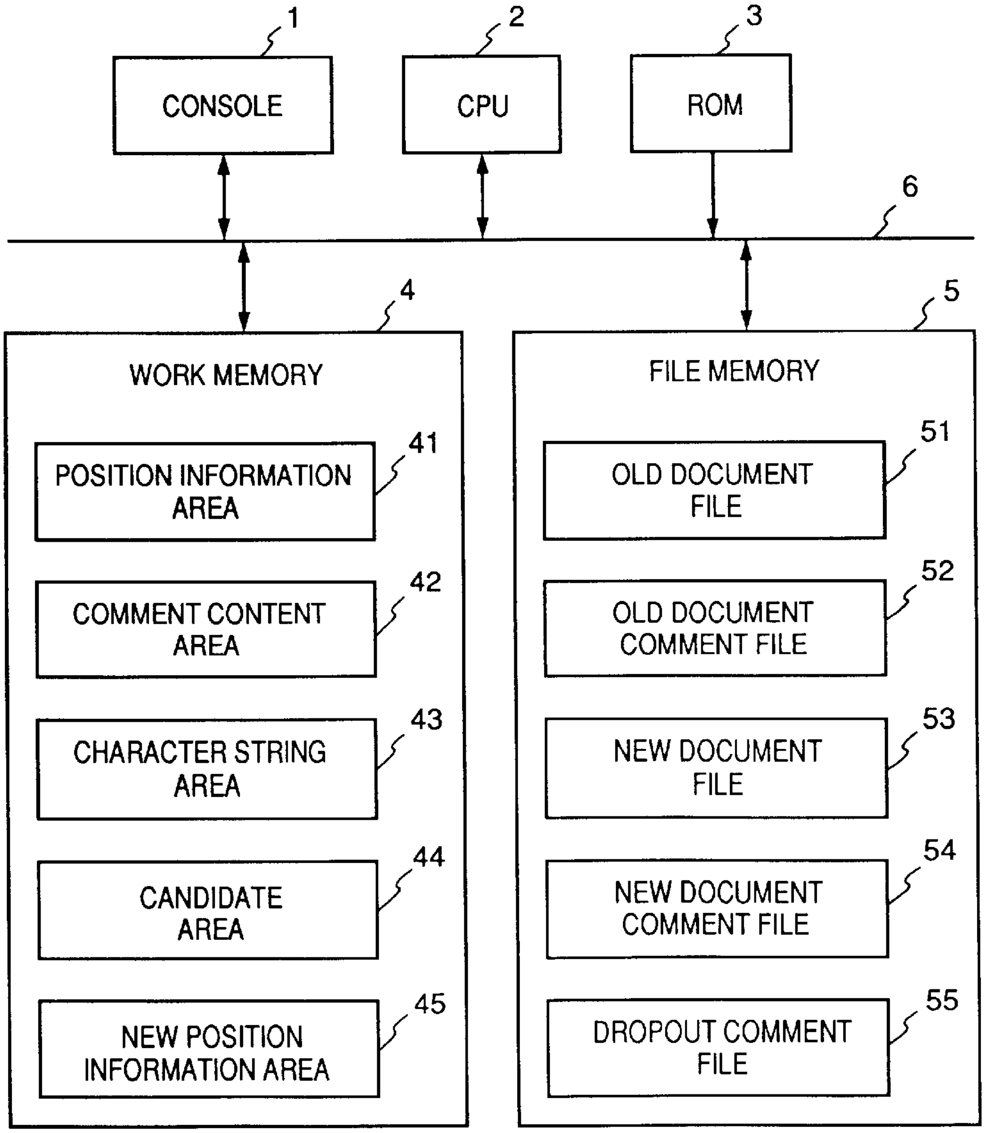
FIG. 29 is a schematic block diagram showing the arrangement of a document processing apparatus of the sixth embodiment.

FIG. 29 is a schematic block diagram showing the arrangement of a document processing apparatus of the sixth embodiment. The same reference numerals in FIG. 29 denote the same parts as in the first embodiment (FIG. 1), and a detailed description thereof will be omitted.

Referring to FIG. 29, reference numeral 55 denotes a dropout comment file for storing comment information which could not be successfully transferred upon transfer of comments.

Figure 30:
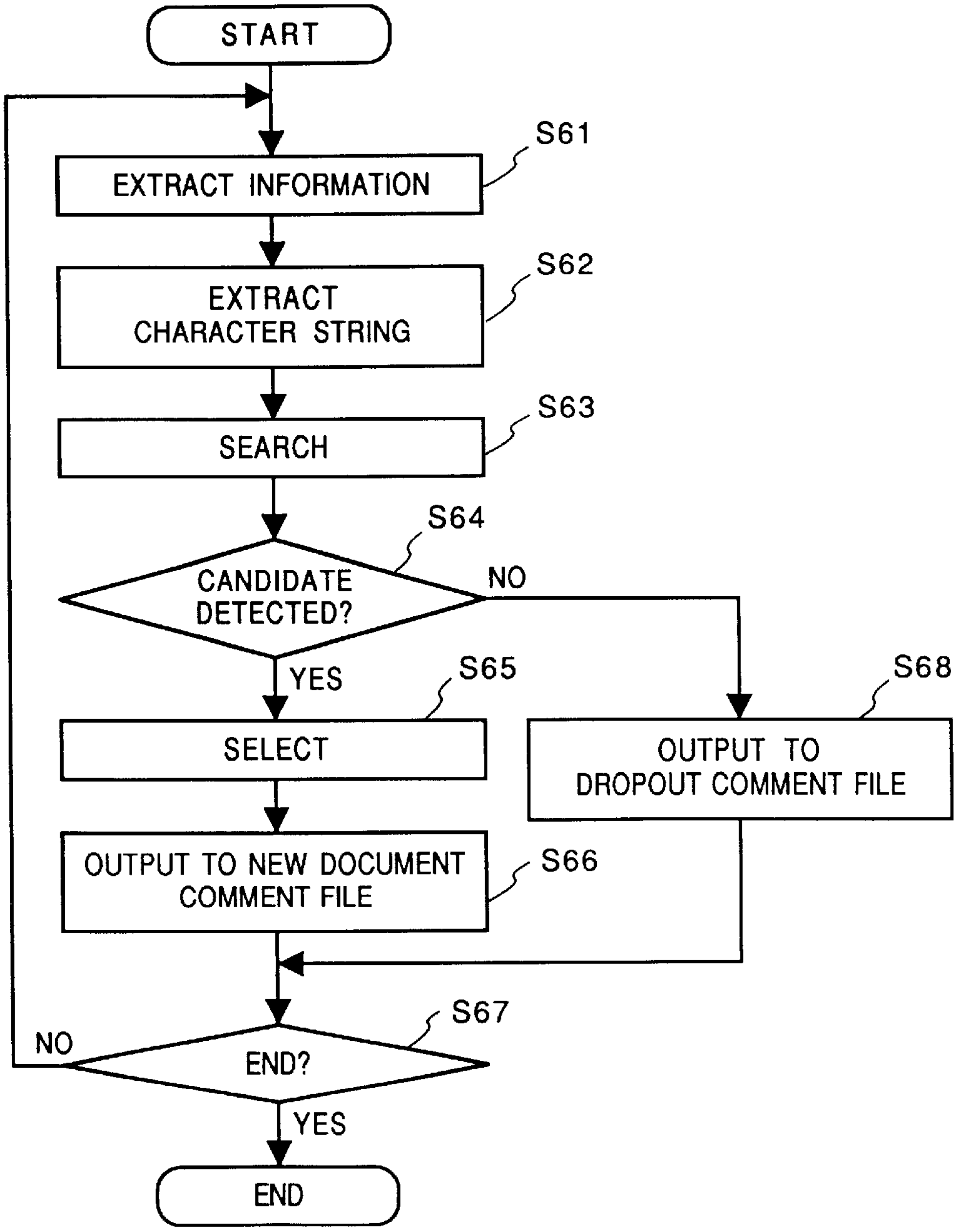
FIG. 30 is a flow chart showing the processing sequence for transferring a comment in the document processing apparatus in the sixth embodiment.

Comment transfer processing by the document processing apparatus of the sixth embodiment will be described below with reference to FIG. 30. FIG. 30 is a flow chart showing the comment transfer processing sequence by the document processing apparatus of the sixth embodiment.

In step S61, position information indicating a position where a comment is added, and the contents of the comment are read out from the old document comment file 52, and are respectively stored in the position information area 41 and the comment content area 42 in the work memory 4. In step S62, a character string to which the comment is added is extracted from the old document file 51. In this case, a portion designated by the position information stored in the old document comment file 52 can be simply extracted from the old document file 51. The extracted character string is stored in the character string area 43 in the work memory 4. Furthermore, in step S63, the new document file 53 is searched for the same character string as that stored in the character string area 43. If the same character string is detected as a result of the search processing, the start and end positions (the number of characters from the beginning of the document) of the detected character string in the new document file 53 are calculated. A pair of the two calculated values are stored as a candidate of a comment addition position in the candidate area 44 in the work memory 4. This search processing is executed for all the sentences in the new document file 53, and if a plurality of character strings satisfying the search condition are detected in the new document file 53, a plurality of candidates are stored in the candidate area 44.

In step S64, it is checked if at least one candidate is detected in step S63. If YES in step S64, the flow advances to step S65; otherwise, the flow advances to step S68.

In step S65, a candidate closest to the comment-added position (stored in the position information area 41) in the old document file 51 is selected from the candidates, and the position information of the selected candidate is stored as position information of the comment for the new document file in the new position information area 45 in the work memory 4. The criterion for the closeness is the same as that in the first embodiment, and a detailed description thereof will be omitted.

In step S66, the position information stored in the new position information area 45 is paired with the contents stored in the comment content area 42 to generate comment information, and the generated comment information is written in the new document comment file 54. At this time, the data format of the new document comment file has the format of the comment file, as shown in FIG. 4. Note that the new document comment file 54 is assumed to have a file name obtained by adding a specific extension to the file name of the new document file 53. For example, if the new document file name is "doc2", the new document comment file is named as "doc2.comment". If the file "doc2.comment" is not created yet, a new file is created, and comment information is written in the created file. On the other hand, if the file "doc2.comment" has already been created, comment information is additionally written in the file.

In step S67, it is checked if the transfer processing is executed for all the comment information in the old document comment file 52. If non-processed comment information still remains, the flow returns to step S61 to repeat the above-mentioned processing; otherwise, this routine ends.

On the other hand, if no candidate is detected in step S64, the flow advances to step S68, and the comment information added to the old document at that time is registered in the dropout comment file 55 as a dropout comment. The file name of the dropout comment file 55 can be determined by adding a specific extension to the names of the old and new documents like "doc1-doc2.dropout", for the sake of easy understanding for a user.

Upon registration of comment information in the dropout comment file 55, if the dropout comment file 55 is not created yet, a new file is created by the above-mentioned method, and a dropout comment is registered in the created file. On the other hand, when the dropout file 55 has already been created, a dropout comment is added to the file. In the dropout comment file 55, a dropout comment is registered in the same format as that shown in, e.g., FIG. 4. The flow then advances to step S67.

FIGS. 31, 32, and 33 respectively show the contents of the new document file 53, the new document comment file 54, and the dropout comment file 55 as a result of the processing of this embodiment. The contents of the new document file 53 shown in FIG. 31 are obtained by modifying "fghij" as the contents of the old document file 51 shown in FIG. 3 to "xyz". At this time, in the new document comment file 54 (FIG. 32) created by the above-mentioned comment transfer processing, comment information for which an equivalent portion could be successfully searched in step S63 is registered. The position information of this comment information, i.e., the contents of a document element <place> are changed to new position information (the 11th to 15th characters). Furthermore, in the dropout comment file 55 (FIG. 33), comment information for which an equivalent position could not be successfully searched in step S63 is registered. In this file, the comment information in the old document comment file is registered without any modifications.

As described above, according to the document processing apparatus of the sixth embodiment, upon execution of automatic transfer processing of comments from an old document to a new document, when a corresponding comment addition position cannot be found in the new document, since the corresponding comment is stored in another file, the comment in the old document can be prevented from being inadvertently lost.

<Seventh Embodiment>

As a method of detecting a comment (dropout comment) whose comment addition position could not be detected in transfer processing of comments from an old document to a new document, a method of detecting a dropout comment on the basis of the different between comment files for the new and old documents is also available. In the seventh embodiment, an embodiment using method will be described.

The schematic arrangement of a document processing apparatus of the seventh embodiment is the same as that of the sixth embodiment shown in FIG. 29, and a detailed description thereof will be omitted. Also, the formats of the document and comment files are the same as those in the sixth embodiment, and a detailed description thereof will be omitted.

Figure 34:
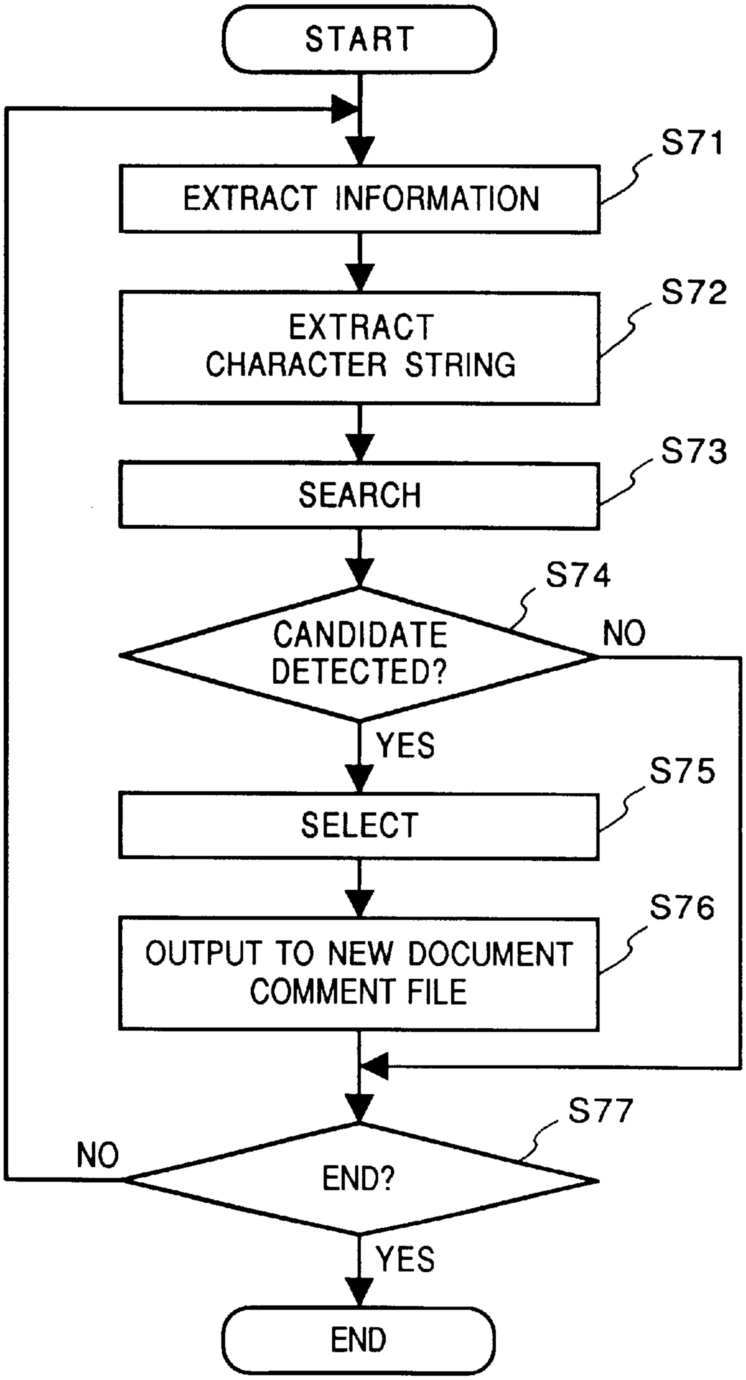
FIG. 34 is a flow chart showing the processing sequence for transferring a comment in a document processing apparatus of the seventh embodiment.
Figure 35:
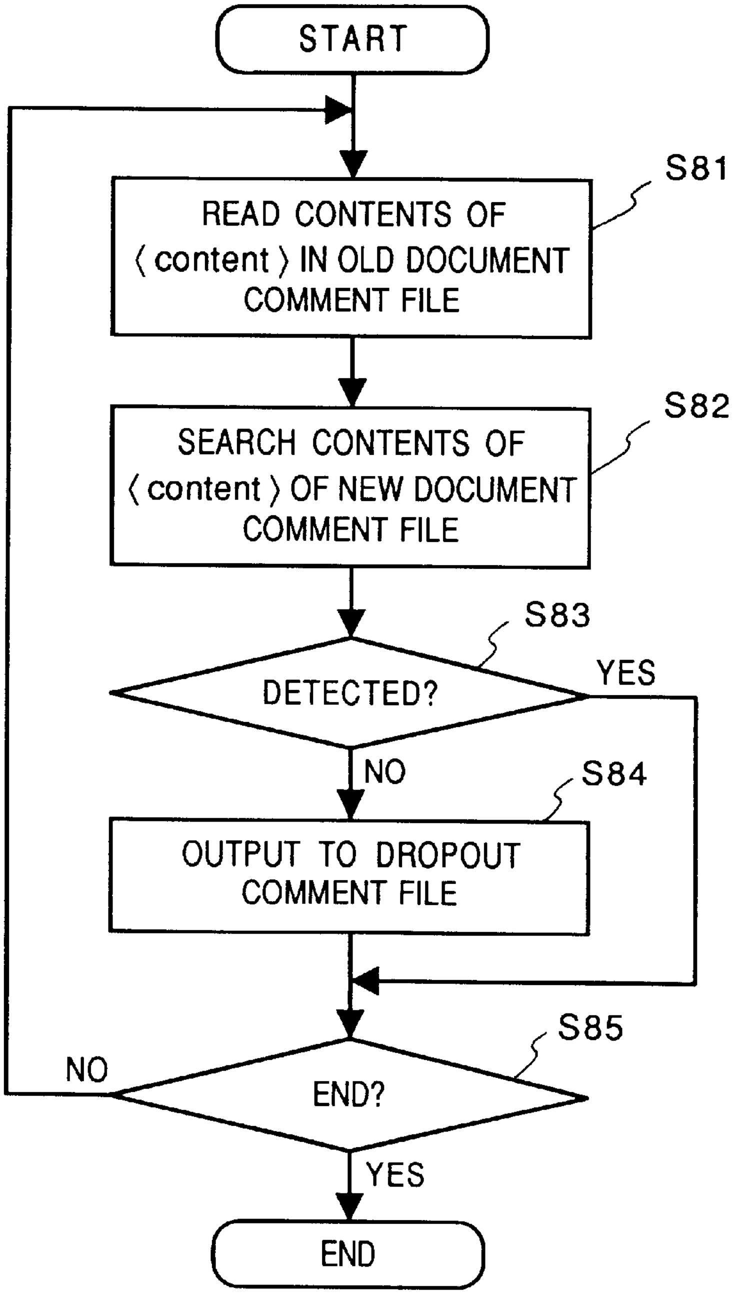
FIG. 35 is a flow chart showing the sequence for creating a dropout comment file in the document processing apparatus of the seventh embodiment.

The comment transfer processing by the document processing apparatus of the seventh embodiment will be described below with reference to FIGS. 34 and 35. FIG. 35 is a flow chart showing the comment transfer processing sequence by the document processing apparatus of the seventh embodiment.

Since steps S71 to S73 are the same as steps S61 to S63 in the sixth embodiment, a detailed description thereof will be omitted. Also, since steps S75 to S77 are the same as steps S65 to S67 in the sixth embodiment, a detailed description thereof will be omitted.

In step S74, it is checked if at least one candidate is stored in the candidate area 44 as a result of the search processing in step S73. If YES in step S74, the flow advances to step S75; otherwise, the flow advances to step S77, and processing for the next comment is executed.

As described above, upon creation of the new document comment file 54, no processing is executed for comment information for which an equivalent portion could not be successfully searched.

The sequence for creating the dropout comment file 55 on the basis of the difference between the new document comment file 54 obtained by the processing in FIG. 34 and the old document comment file 52 will be described below with reference to the flow chart in FIG. 35. FIG. 35 is a flow chart showing the sequence for creating the dropout comment file by the document processing apparatus of the seventh embodiment.

In step S81, a character string (comment contents) sandwiched between <content> and </content> in the old document comment file 52 is read out, and is stored in the character string area 43. In this processing, the same storage area as that (the character string area 43) used in the processing according to the flow chart shown in FIG. 34 is used. Alternatively, another area may be used. In step S82, the character strings sandwiched between <content> and </content> in the new document comment file 54 are searched for a character string equivalent to that stored in the character string area 43. In step S83, it is checked if the same character string is detected in the search processing in step S82. If YES in step S83, the flow advances to step S85.

On the other hand, if it is determined in step S83 that the same character string is not detected, the flow advances to step S84, and information of the comment (a corresponding character string from <comment> to </comment> in the old document comment file) is written in the dropout comment file 55. In step S85, it is checked if processing is completed for all the comment information in the old document comment file. If non-processed comment information still remains, the flow returns to step S81 to repeat the above-mentioned processing; otherwise, this routine ends.

As described above, according to the document processing apparatus of the seventh embodiment, since the comment transfer processing and the dropout comment detection processing can be realized by two different routines, a dropout comment file can be created, as needed, resulting in convenience.

<Eighth Embodiment>

The eighth embodiment will be described below.

The eighth embodiment stores a comment (a plurality of comments in some cases) which is added to a portion in an old document, for which a portion having an equivalent meaning could not be detected in a new document, in a new document comment file together with a code indicating unsuccessful transfer.

In the eighth embodiment, the method of detecting a portion having a meaning equivalent to that in an old document from a new document, and a method of adding a comment to an original document are the same as those in the sixth embodiment. Also, the formats of comment files are the same as those in the sixth embodiment.

The document processing apparatus of the eighth embodiment will be described below with reference to the accompanying drawings.

Figure 36:
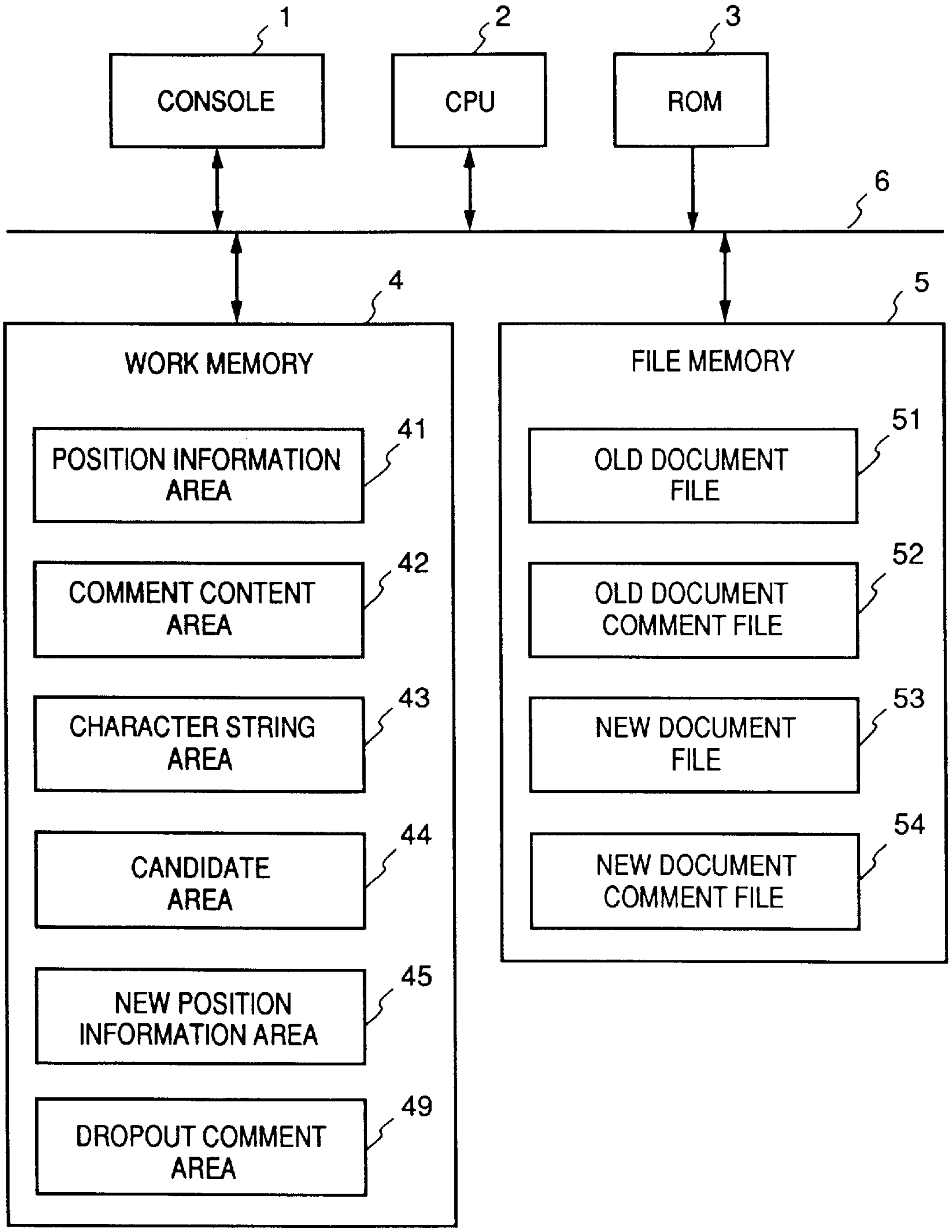
FIG. 36 is a schematic block diagram showing the arrangement of a document processing apparatus of the eighth embodiment.

FIG. 36 is a schematic block diagram showing the arrangement of the document processing apparatus of the eighth embodiment. The same reference numerals in FIG. 36 denote the same parts as in the arrangement shown in FIG. 29 in the sixth embodiment, and a detailed description thereof will be omitted. The work memory 4 comprises a dropout comment area 49. The dropout comment area 49 is an area for temporarily storing information of a dropout comment. The file memory 5 of the eighth embodiment has no dropout comment file 55.

Figure 37:
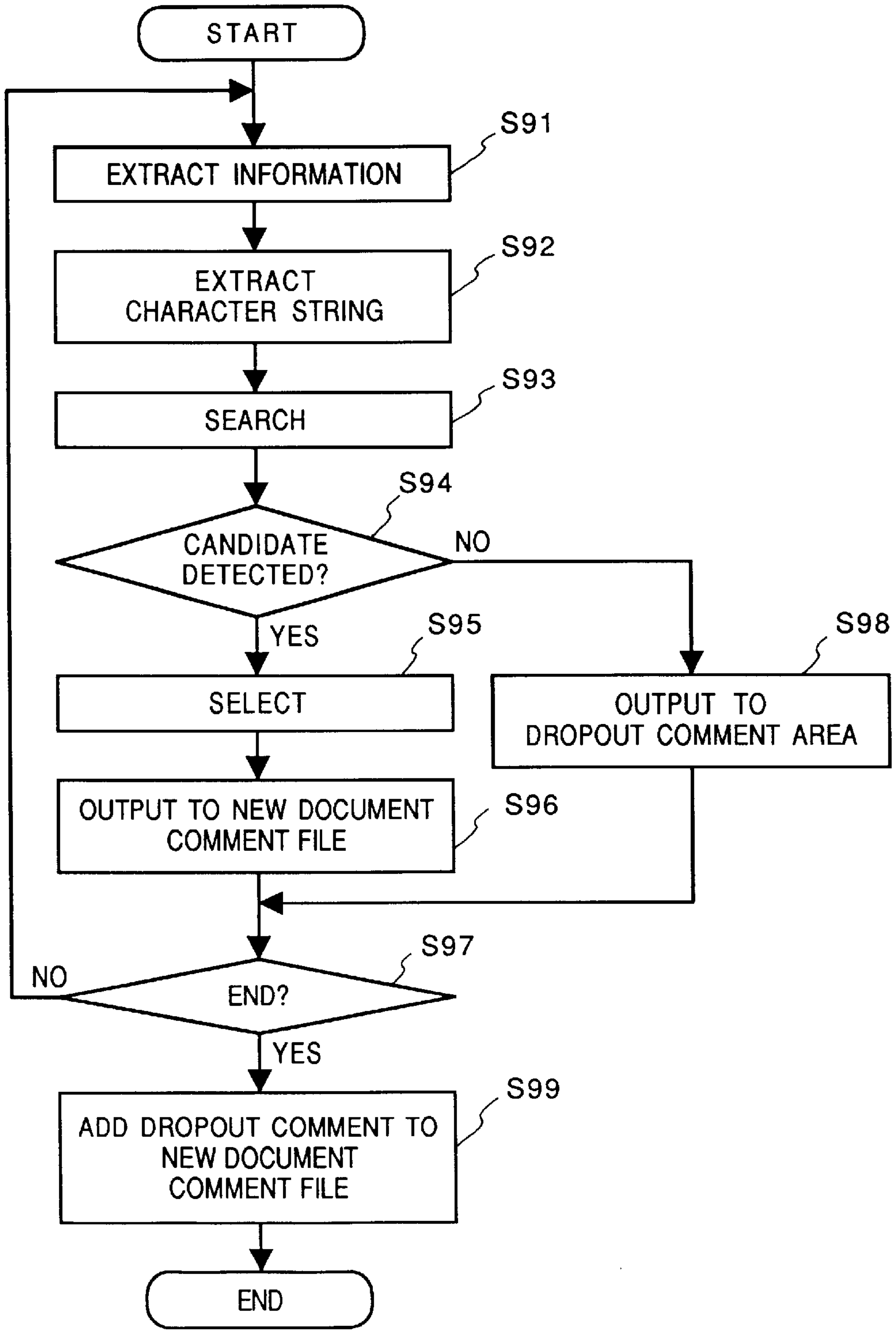
FIG. 37 is a flow chart showing the sequence of comment transfer processing in the document processing apparatus of the eighth embodiment.

The operation of comment transfer processing by the document processing apparatus of the eighth embodiment with the above arrangement will be described below. FIG. 37 is a flow chart showing the comment transfer processing sequence by the document processing apparatus of the eighth embodiment.

In FIG. 37, since steps S91 to S97 are the same as steps S61 to S67 in FIG. 30, a detailed description thereof will be omitted, and different steps will be described below.

If it is determined in step S94 that a candidate is not detected, the flow advances to step S98, and corresponding comment information is written in the dropout comment area 49 in the work memory 4. The flow then advances to step S97. If it is determined in step S97 that the comment transfer processing is completed for all the comment information stored in the old document comment file 52, the flow advances to step S99. In step S99, the contents of the dropout comment area 49 are added to the end of the new document comment file 54 while being sandwiched by character strings <dropout> and </dropout>.

FIG. 38 shows the contents of the new document comment file 54 as a result of execution of the comment transfer processing by the document processing apparatus of the eighth embodiment. The contents shown in FIG. 38 are obtained by modifying "fghij" as part of the contents of the old document file 51 in FIG. 3 to "xyz", as in the sixth embodiment described above. At this time, the new document file 53 is as shown in FIG. 31, and the new document comment file 54 is as shown in FIG. 38.

In the above description, dropout comments are collectively written at the end of the new document comment file, but may be written at the beginning of the new document comment file, as the matter of course. Alternatively, dropout comments may be distributed in the new document comment file in a format which can identify a dropout comment. For example, in step S98 in FIG. 37, each dropout comment information is directly written in the new document comment file 54 while being sandwiched between character strings <dropout> and </dropout>. In this case, processing in step S99, and the dropout comment area 49 can be omitted. With this processing, dropout comments are distributed and stored in the new document comment file while being sandwiched between character strings <dropout> and </dropout>. Alternatively, as shown in FIG. 39, a dropout comment may be indicated by assigning absolutely impossible numerical values such as "0, 0" or "−1, −1", to the values of position information in the new document comment file. In this manner, distributed dropout comments can be discriminated from normal comments without using character strings <dropout> and </dropout>. As a dropout comment detection method, the method of the seventh embodiment may be used.

In the eighth embodiment, since comments which could and could not be successfully transferred are stored in a single file, loss of either type of these comments can be prevented, thus allowing easy file management.

In the sixth to eighth embodiments described above, the perfect coincidence means is used for detecting equivalent portions of old and new documents. However, the present invention is not limited to this. For example, a similarity may be calculated based on the number of coinciding characters in a comment-added portion, and when the calculated similarity is equal to or larger than a predetermined value, an equivalent portion may be determined.

As described above, according to the document processing apparatus of each of the sixth to eighth embodiments, upon execution of automatic transfer of comments between documents, comment information which could not be transferred is identifiably stored, and comments can be prevented from being unexpectedly lost upon transfer of comments.

<Ninth Embodiment>

In the ninth embodiment, a comment which could not be successfully transferred is displayed on a window at a fixed position, thereby clearly identifiably displaying the comment from a comment which could be successfully transferred.

Figure 40:
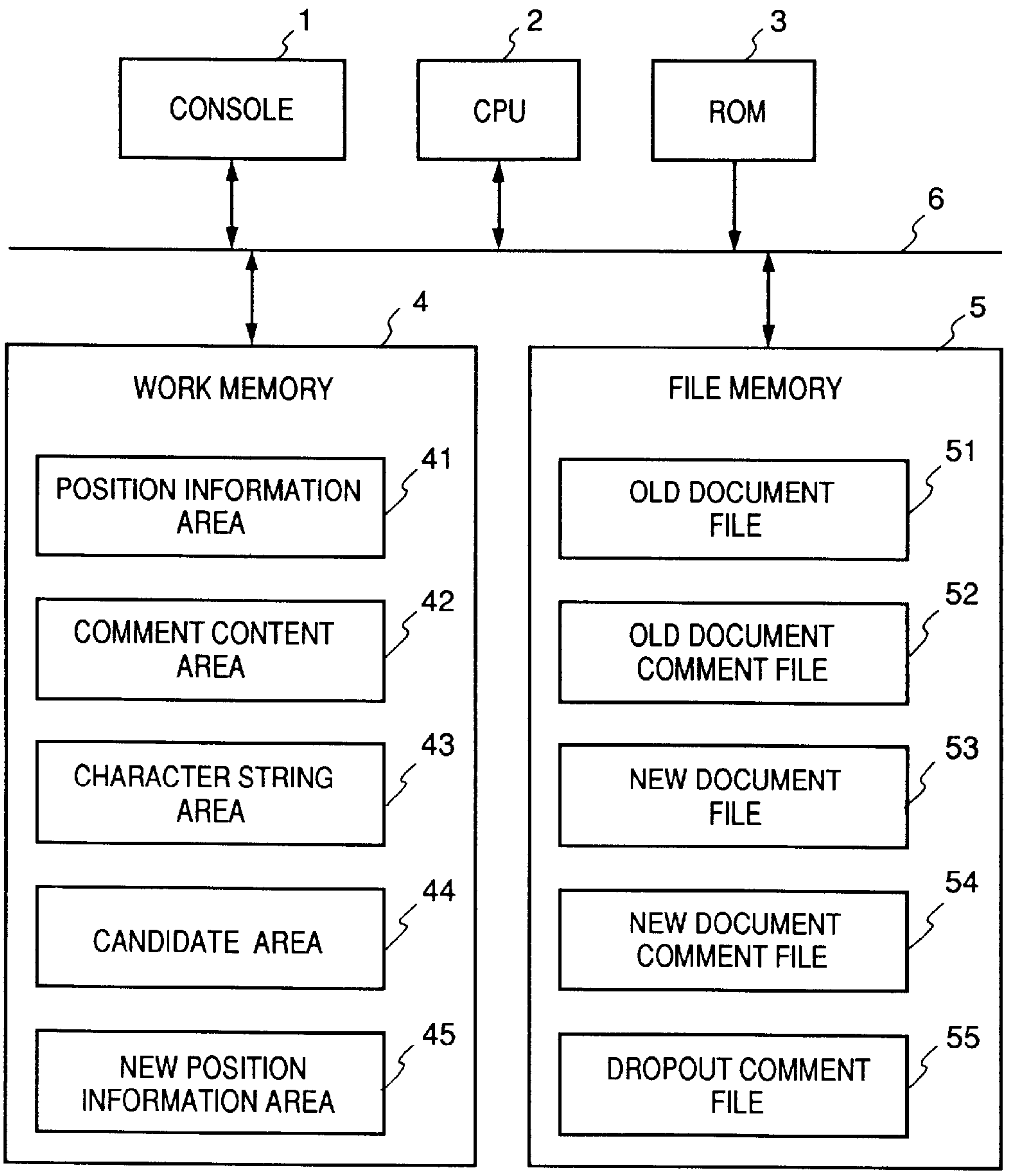
FIG. 40 is a schematic block diagram showing the arrangement of a document processing apparatus of the ninth embodiment.

FIG. 40 is a schematic block diagram showing the arrangement of a document processing apparatus of the ninth embodiment.

The arrangement shown in FIG. 40 is the same as that shown in FIG. 29 (sixth embodiment), and a detailed description thereof will be omitted. In the embodiment as described below, various instructions are input using the pointing device 1*c*, but may be input by the keyboard 1*b* or other input devices.

Figure 42:
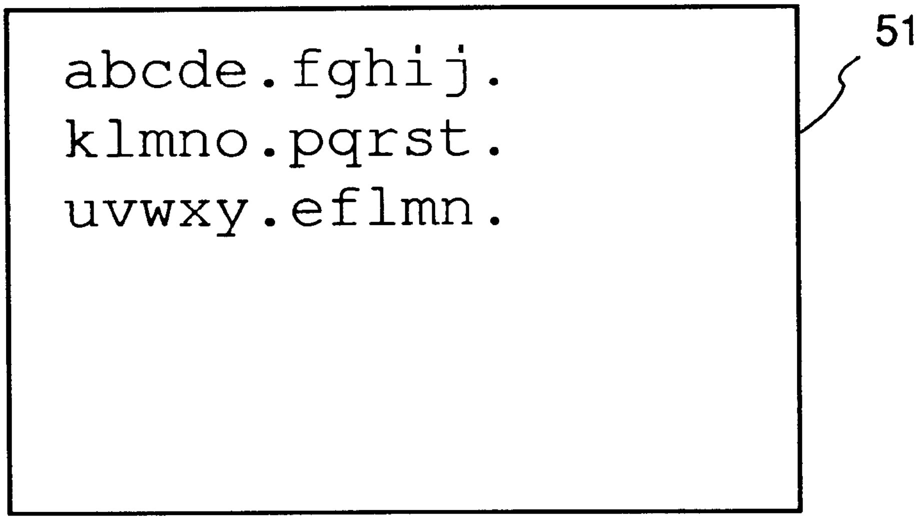
FIG. 42 is a view showing an example of an original document file (old document) in the ninth embodiment.
Figure 43:
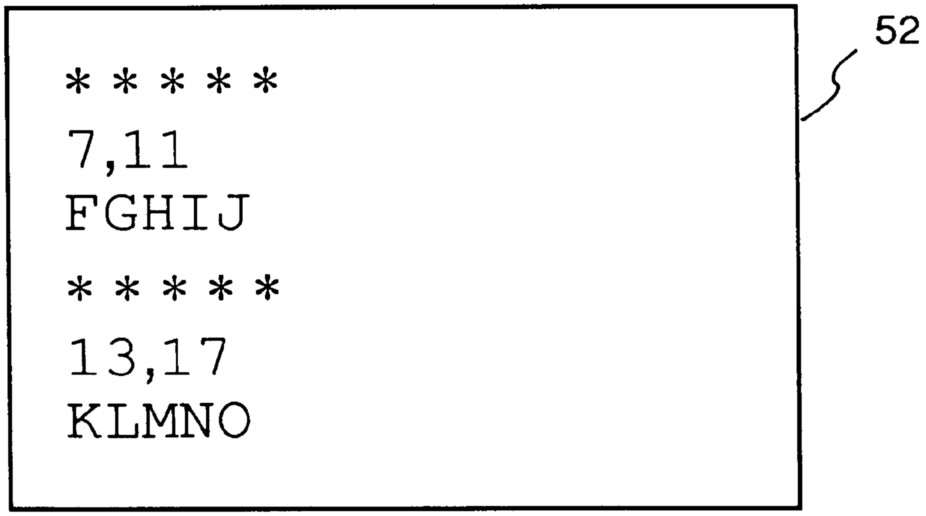
FIG. 43 is a view showing an example of a comment file (for an old document) corresponding to the document shown in FIG. 42.

FIGS. 42 and 43 respectively show the contents of the old document file 51 to be processed by the ninth embodiment, and an example of the old document comment file 52.

In the old document comment file 52 shown in FIG. 43, a character string line "***" is followed by a line of position information (7, 11), and thereafter, for example, several lines of character strings representing a comment follow in correspondence with the contents of the comment. Such sets of character strings repeat themselves by the number of comments. In the example shown in FIG. 43, a comment "FGHIJ" is present at a position (7, 11), and a comment "KLMNO" is present at a position (13, 17**).

Figure 41:
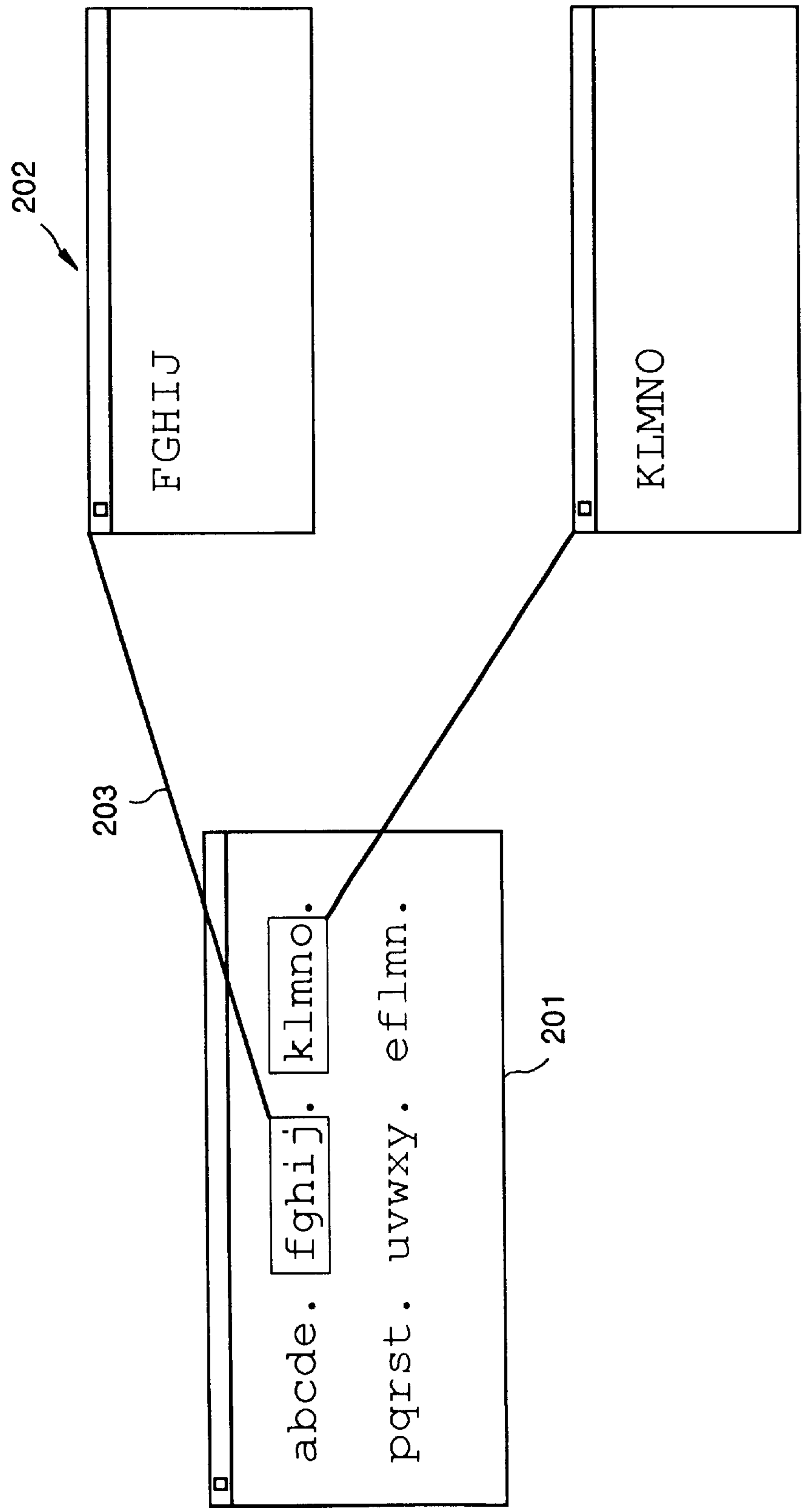
FIG. 41 is a view showing an example of a display state of an original document and comments.

When a user adds the comments 52 to portions of the electronically stored document 51 (e.g., a manual; FIG. 42), as shown in FIG. 43, the document and the comments are displayed, as shown in FIG. 41. For example, when the user moves the cursor into a rectangle surrounding a character string "fghij" on a window 201 which displays the document (original document) added with the comments, depresses the button of the pointing device to perform a drag operation, and moves the cursor, another window 202 is opened. The window 202 displays the comment "FGHIJ" corresponding to the character string "fghij". The comment-added position in the original document is indicated by a line 203 connecting the two windows.

As described above, when an original document cannot be modified, a method of separately preparing for an original document file and a comment file, and managing these files is normally used. The comment file stores position information of a character string, to which a comment is added, in the original document, and the contents of the comment, as shown in FIG. 43.

Each position information consists of two numerical values indicating the start position (the number of characters from the beginning of the document file) of a character string, and the end position of the character string. In the ninth embodiment, the end position can assume "0". In this case, a comment is added not to a character string but to a position designated by the value of the start position. The new document comment file 54 and the dropout comment file 55 have the same format.

Figure 44:
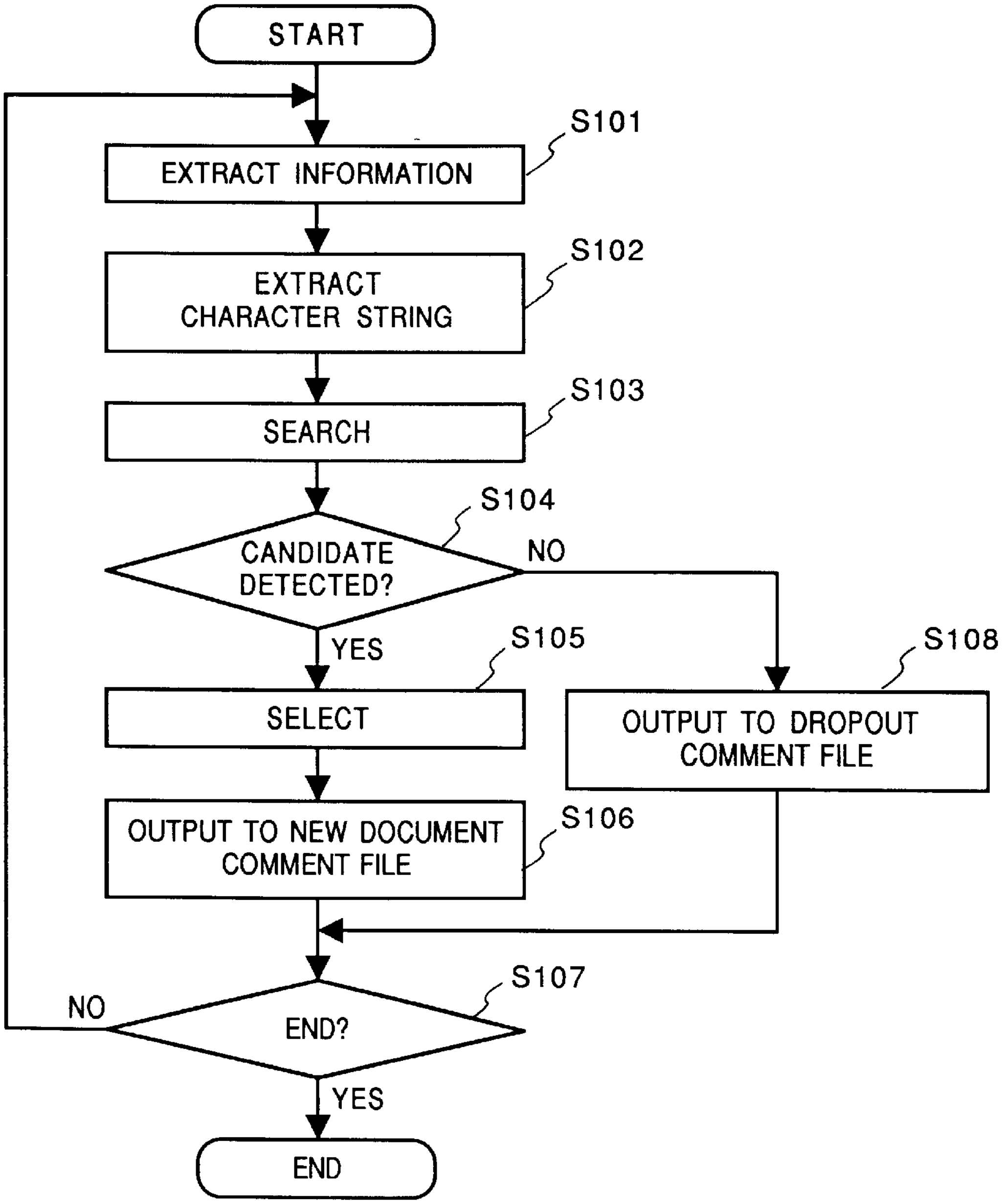
FIG. 44 is a flow chart showing the sequence for creating a dropout comment file in the ninth embodiment.

FIG. 44 is a flow chart showing the sequence for creating a dropout comment file by the document processing apparatus of this embodiment. A control program for executing this flow chart is stored in the ROM 3, and is executed by the CPU 2.

In step S101, position information and comment contents are read out from the old document comment file 52, and are respectively stored in the position information area 41 and the comment content area 42 in the work memory 4. The flow then advances to step S102. In step S102, a character string is extracted from the old document file 51 on the basis of the values of the position information read out in step S101, and is stored in the character string area 43. In this case, when the value of the end position of the position information is "0", i.e., the comment is added to a position designated by the value of the start position, a null code string is stored in the character string area 43. When the null code string is stored in the character string area 43, position information in the old document comment file 52 is directly stored in the candidate area 44. Otherwise, the new document file 53 is searched for the same character string as that stored in the character string area 43, and if the character string is detected, the position information (the start and end positions) of the detected character string is stored in the candidate area 44 (step S103). Note that the candidate area 44 can store a plurality of pieces of position information.

The flow advances to step S104 to check if a candidate is detected, i.e., if the number of candidates stored in the candidate area 44 is "0". If candidates are detected, the flow advances to step S105. In step S105, one position information of a character string to which the comment is to be re-added is selected from the candidates, and is stored in the new position information area 45. In this case, for example, position information of a character string having the one closest to the position information stored in the position information area 41 is stored in the new position information area 45.

The flow advances to step S106, and the values stored in the new position information area 45 and data in the comment content area 42 are output to the new document comment file 54. In step S107, it is checked if all the comments registered in the old document comment file 52 are checked. If YES in step S107, this routine ends; otherwise, the flow returns to step S101.

On the other hand, if it is determined in step S104 that no candidate is detected, the flow advances to step S108. In the S105, the values in the position information area 41 and data in the comment content area 42 are output to the dropout comment file 55, and the flow advances to step S107.

With the above-mentioned sequence, the dropout comment file 55 is created.

Figure 45:
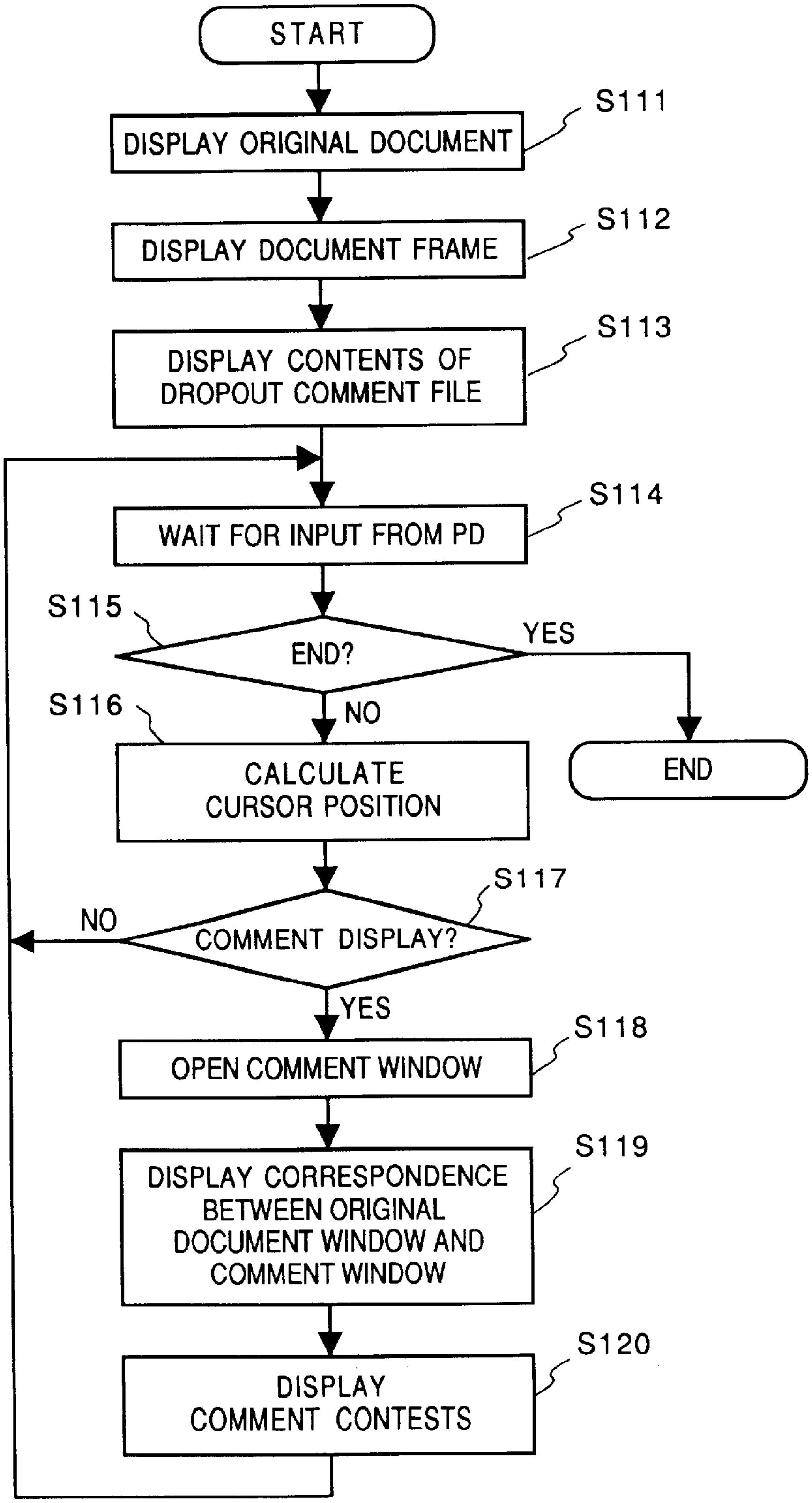
FIG. 45 is a flow chart showing the comment display sequence in the ninth embodiment.

FIG. 45 is a flow chart showing the display method in the ninth embodiment, and a control program for executing this processing is also stored in the ROM 3.

In step S111, the window for the original document (the contents of the new document file 53) is opened to display the contents of the original document. In step S112, all character strings, to which comments are added, in the original document displayed in step S111, are surrounded by rectangular frames with reference to the position information in the new document comment file 54. In this case, when the value of the end position of position information is "0", a vertical line is displayed at the start position (at a position immediately before a character designated by the start position) in place of a rectangular frame.

The flow then advances to step S113 to open the window for the dropout comment at the lower right position on the screen of the CRT 1*a* (FIG. 2), and displays the contents of the dropout comment file. The flow advances to step S114 to wait for an input from the pointing device 1*c*. In step S115, it is checked if an input from the pointing device 1*c* is an end instruction. If YES in step S115, all the windows are closed, and this routine ends.

However, if NO in step S115, the flow advances to step S116 to calculate the current position of the displayed cursor, and it is then checked in step S117 if a comment is to be displayed. In this case, the position of a character at the cursor position, i.e., the number of characters from the beginning of the original document is calculated, and whether or not a corresponding comment is present can be checked by comparing the calculated position and position information in the new document comment file 54.

When the comment is displayed, the flow advances to step S118, and the comment window is opened at a position corresponding to the release timing of the button of the pointing device 1*c*. In step S119, a correspondence between the original document window and the comment window is established by connecting the two windows by a line. In step S120, the contents of the comment are displayed, and the flow returns to step S114. On the other hand, if it is determined in step S117 that a comment is not displayed, the flow returns to step S114. This concludes the description of the display method.

An example of this embodiment will be described below with reference to FIGS. 46 to 49.

Figure 46:
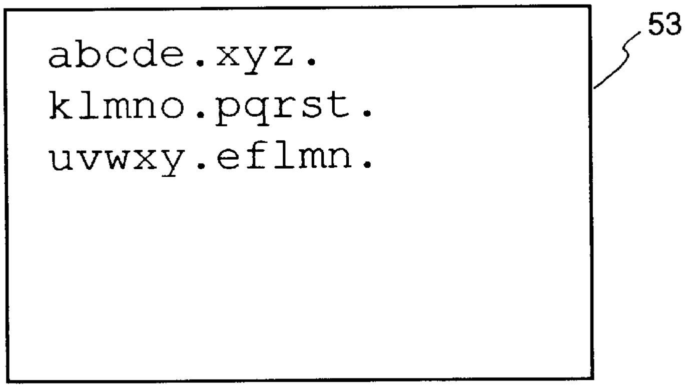
FIG. 46 is a view showing an example of a modified new document file in the ninth embodiment.
Figure 47:
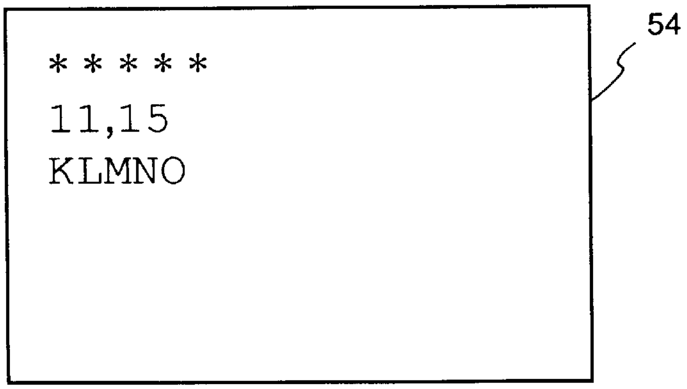
FIG. 47 is a view showing an example of a comment file for a new document in the ninth embodiment.
Figure 48:
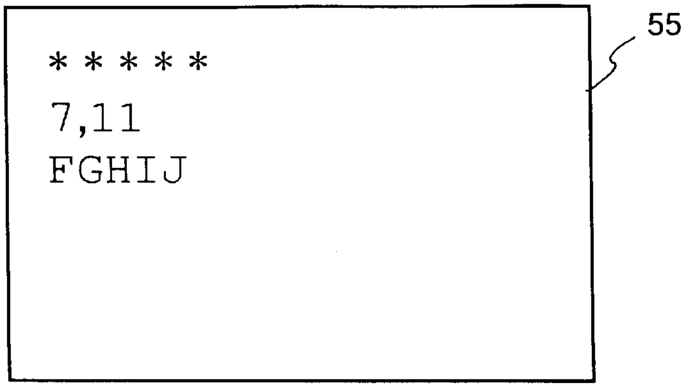
FIG. 48 is a view showing an example of a dropout comment file in the ninth embodiment.

FIG. 46 shows the contents of the modified new document file 53. More specifically, FIG. 46 shows an example of the new document file 53 wherein the contents of the old document file 51 are as displayed on the window 201 in FIG. 41 (FIG. 42), and a character string "fghij" in the old document file is modified to "xyz". FIG. 47 shows the contents of the new document comment file 54 and FIG. 48 shows an example of the contents of the dropout comment file 55, both created at that time upon modification of the document file. As can be seen from comparison between FIGS. 47 and 48, and FIG. 43, position information of the comment "KLMNO" in the new document file 54 is changed from (13, 17) to (11, 15) since the character string "fghij" before the comment-added position is modified to "xyz", and the number of characters is decreased by two, and the dropout comment file 55 stores the comment "FGHIJ" which corresponded to the character string "fghij" in the original document (old document).

Figure 49:
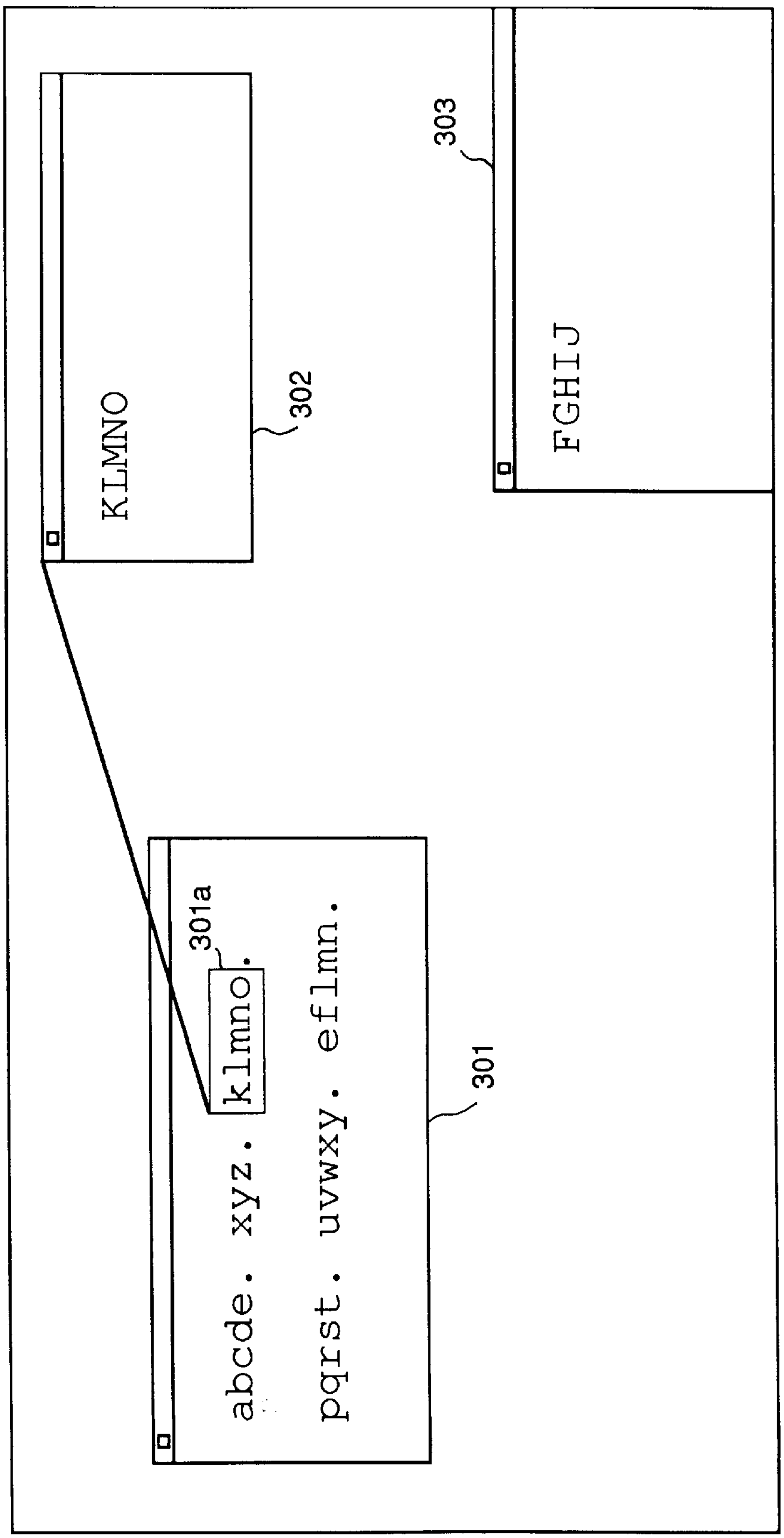
FIG. 49 is a view showing a display example of a comment and a dropout comment in the ninth embodiment.

FIG. 49 shows a display example on the screen of the CRT 1*a* upon execution of the processing of the ninth embodiment. Referring to FIG. 49, reference numeral 301 denotes a window for displaying the new document file in which a character string has already been modified, and 302, a comment display window for displaying a comment corresponding to a character string "klmno" 301*a*. Reference numeral 303 denotes a window for displaying a dropout comment.

As described above, according to the ninth embodiment, since a dropout comment is always displayed, a user can confirm the dropout comment all the time.

<10th Embodiment>

In the 10th embodiment, as in a comment which could be successfully transferred, when the cursor is moved into a specific range on the screen, and the button of the pointing device 1*c* is clicked, a comment window is displayed. Different frames for surrounding character strings added with comments are displayed in correspondence with a comment which could be successfully transferred and a comment which could not be transferred, thus allowing easy identification of these character strings.

Figure 50:
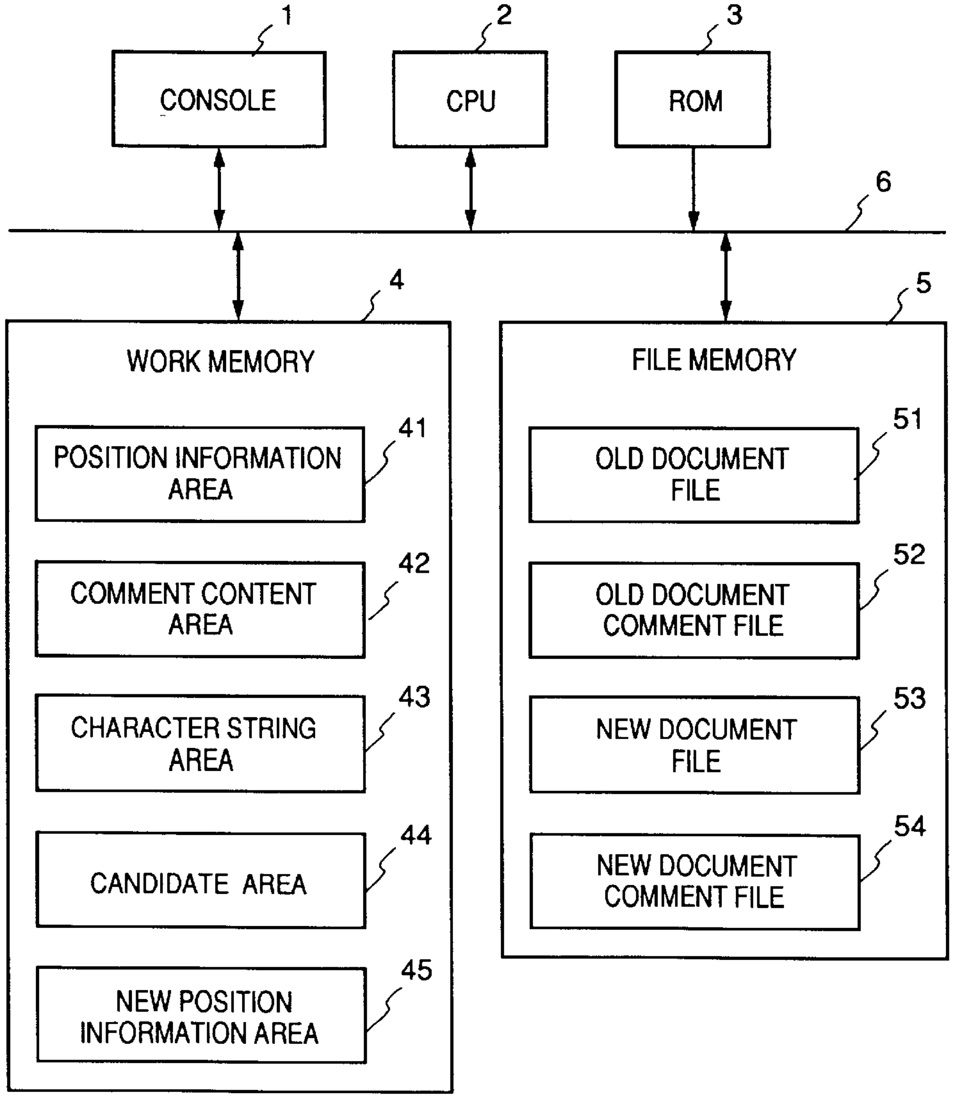
FIG. 50 is a schematic block diagram showing the arrangement of a document processing apparatus of the 10th embodiment.

FIG. 50 shows the arrangement of a document processing apparatus of the 10th embodiment. Since this block diagram shows substantially the same arrangement shown in FIG. 40 except that the dropout comment file 55 is excluded therefrom, a detailed description thereof will be omitted.

In the 10th embodiment, a comment which could not be transferred is stored in the new document comment file 54 together with a definition indicating a dropout comment. At this time, the values of position information in the old document comment file 52 are directly transferred.

Figure 51:
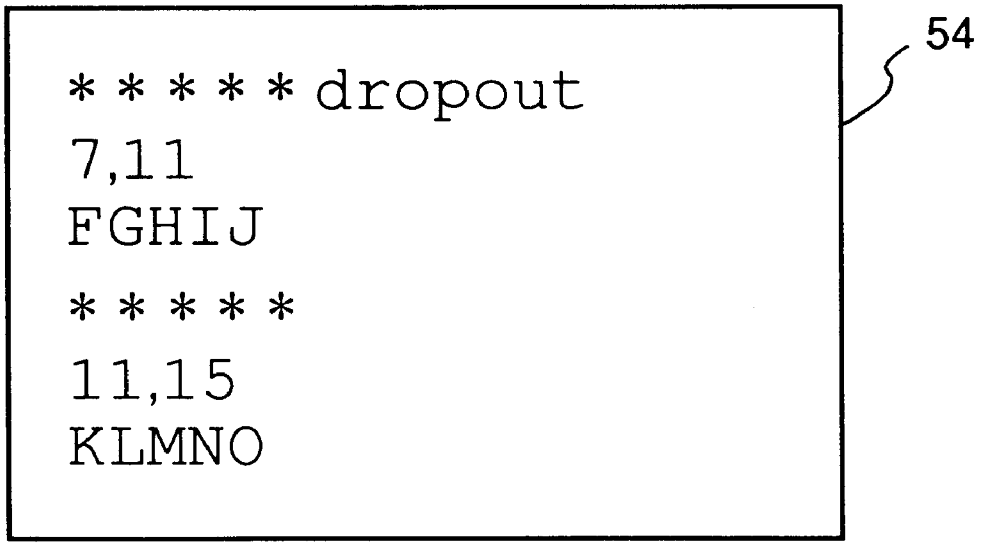
FIG. 51 is a view showing an example of a comment file for a new document in the 10th embodiment.

FIG. 51 shows the contents of the new document comment file 54 in the 10th embodiment. The contents shown in FIG. 51 indicate that comment information "FGHIJ" after a character string line indicated by "*****dropout" is a dropout comment.

Figure 52:
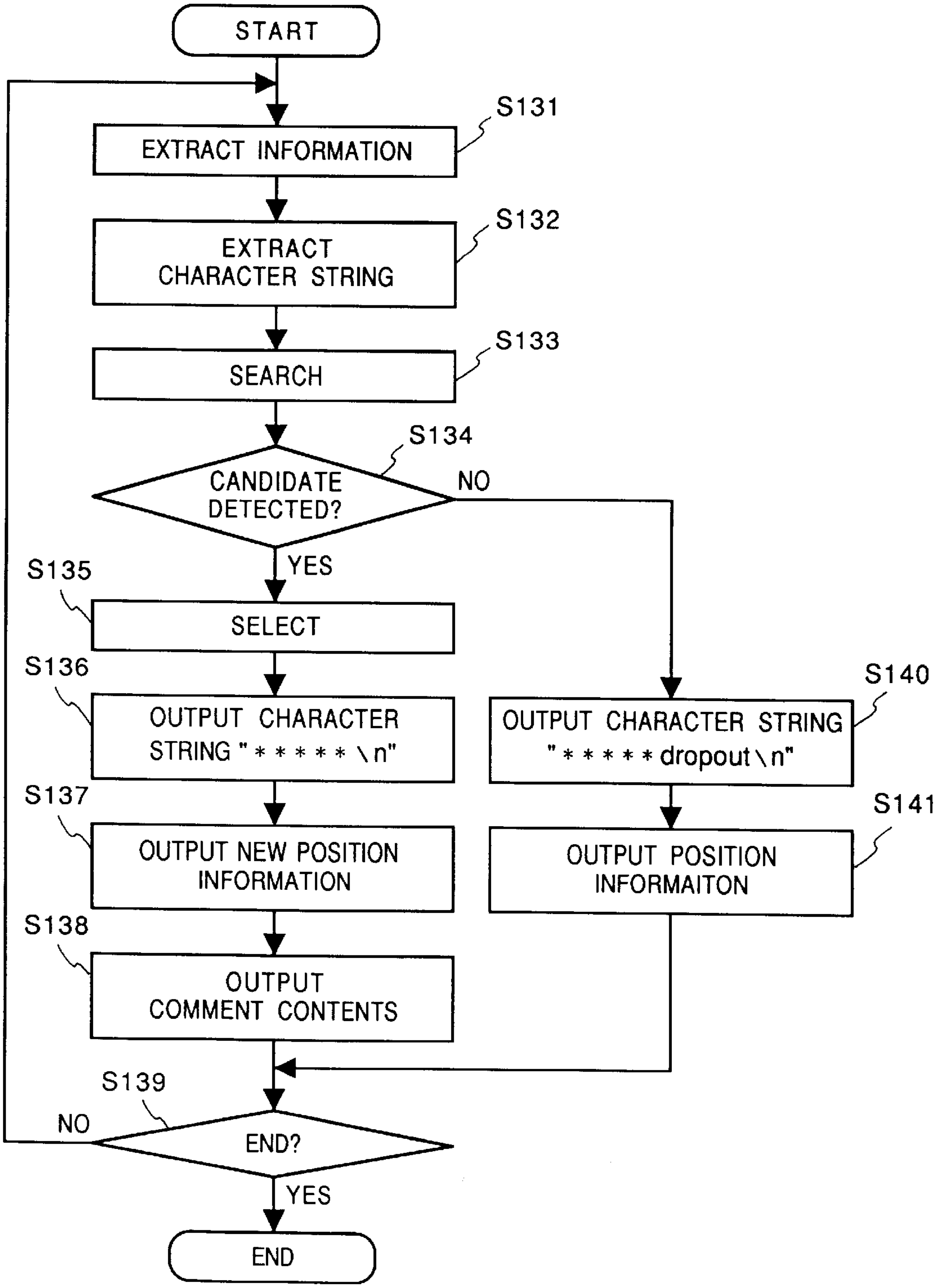
FIG. 52 is a flow chart showing the sequence for creating a comment file in the 10th embodiment.

FIG. 52 is a flow chart showing the sequence for creating the new document comment file 54 in the 10th embodiment. A control program for executing this processing is stored in the ROM 3. Since processing in steps S131 to S135 in FIG. 52 is the same as that in steps S101 to S105 in FIG. 44 described above, a detailed description thereof will be omitted. In step S136, a character string "***\n" is output to the new document comment file 54. Note that "\n" is a newline code. The contents in the new position information area 45 are output to the new document comment file 54 in step S137, and the contents in the comment content area 42 are output to the new document comment file 54 in step S138. In step S139, it is checked if all the comments registered in the old document comment file 52 are checked. If YES in step S139, this routine ends; otherwise, the flow returns to step S131**.

If it is determined in step S134 that no candidate is detected, the flow advances to step S140, and a character string "***dropout\n" is output to the new document comment file 54. The flow advances to step S141, and position information described in the old document comment file (i.e., the contents in the position information area 41) is output to the new document comment file 54. Thereafter, the flow advances to step S138**.

Figure 53:
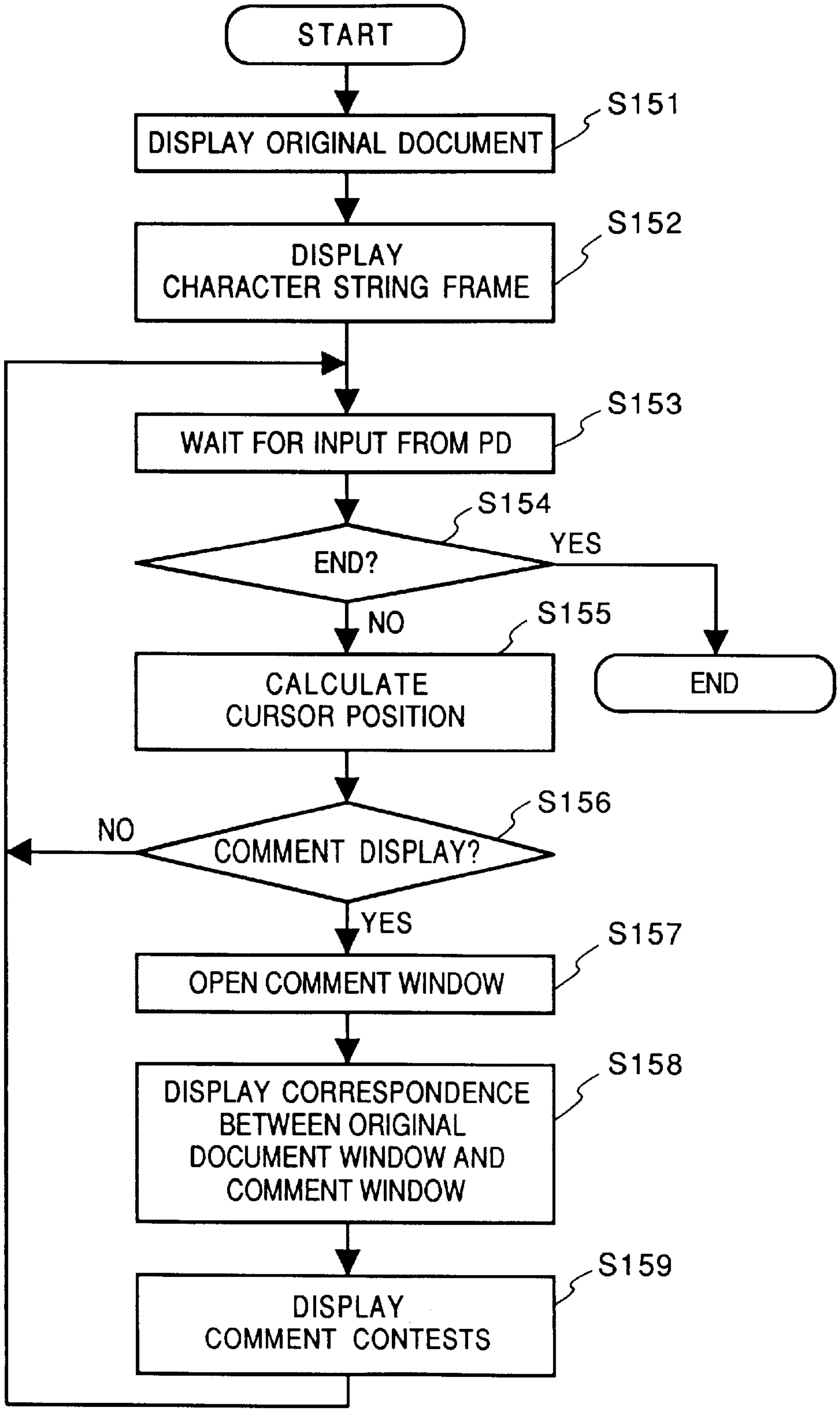
FIG. 53 is a flow chart showing the comment display sequence in the 10th embodiment.

The method of displaying windows in the 10th embodiment will be described below with reference to the flow chart in FIG. 53. A program for executing this processing is also stored in the ROM 3.

In step S151, a window for an original document is opened to display the contents of the original document (contents of the new document file 53). The flow advances to step S152, and character strings added with comments in the original document displayed in step S151 are surrounded by rectangular frames with reference to position information in the new document comment file 54. In this case, when a frame corresponding to a dropout comment is to be displayed, the width of the frame is extremely reduced, so that the rectangular frame can display none of the character strings in the original document.

The following steps S153 to S159 are the same as the processing in steps S114 to S120 in FIG. 45 of the ninth embodiment described above. In the description of FIG. 45, if it is determined in step S117 that a comment is not displayed, and after the processing in step S120, the flow returns to step S114. However, in FIG. 53, if it is determined in step S156 that a comment is not displayed, and after the processing in step S159, the flow returns to step S153. This has been a description of the display method.

Figure 54:
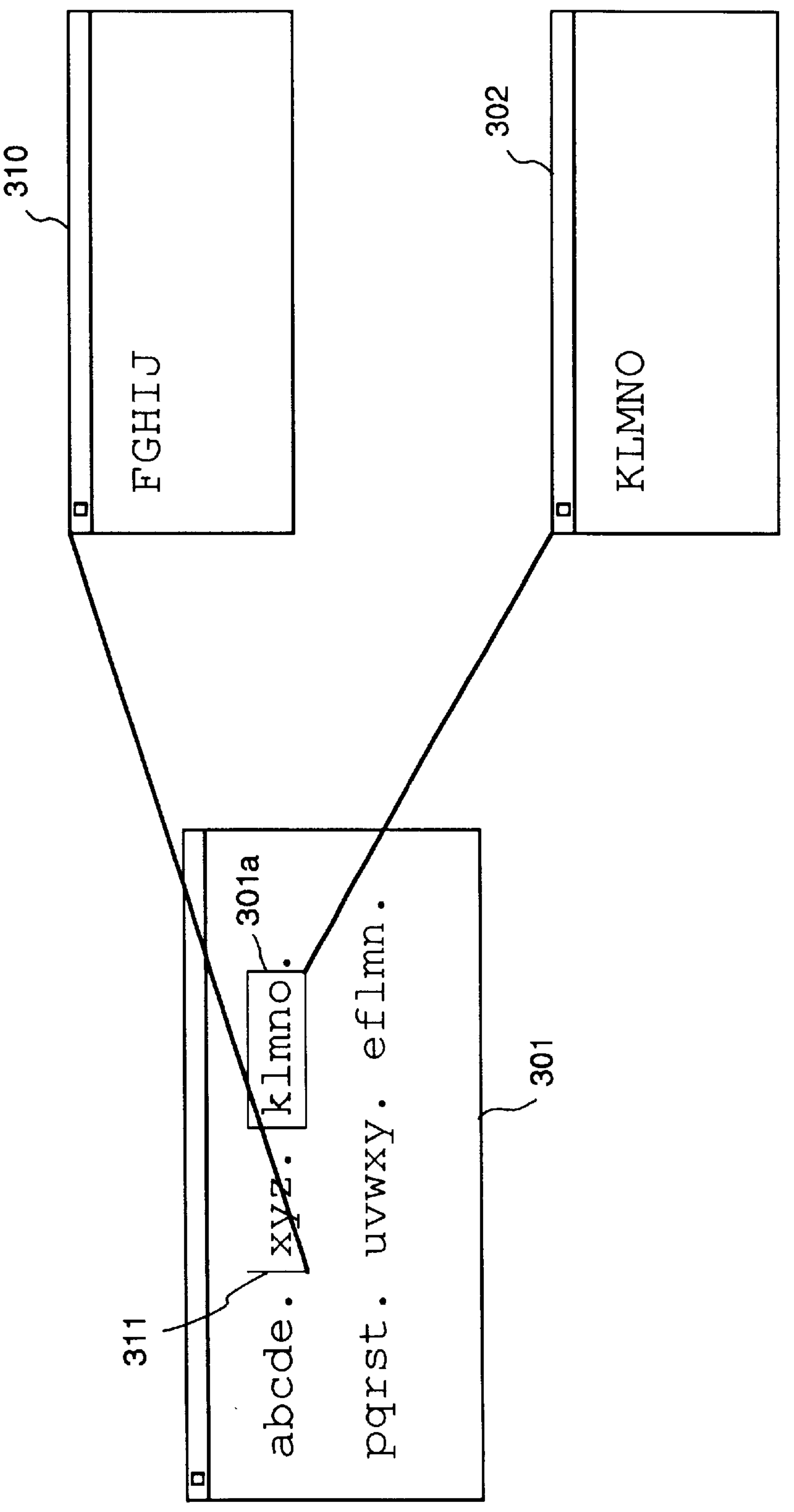
FIG. 54 is a view showing a display example of a comment added to a new document in the 10th embodiment.

FIG. 54 is a view for explaining this display example, and shows a state after the contents of the old document file 51 shown in FIG. 42 were modified to the new document file 53 shown in FIG. 46.

In FIG. 54, the comment contents corresponding to a character string "klmno" are displayed on the window 302, and dropout comment contents are displayed on the window 310 since a character string "fghij" is modified to "xyz". On the window 301, as indicated by 311, a vertical line is displayed at a position immediately before the seventh character. A dropout comment is indicated by the vertical line obtained by extremely reducing the width of a rectangular frame, so that the frame can include none of the character strings in the original document. In this manner, whether a comment is added to a dropout comment or to that position can be easily discriminated in the window 301.

As described above, in the 10th embodiment, a user can open the window to display a dropout comment only when he or she wants to do so.

<11th Embodiment>

Figure 55:
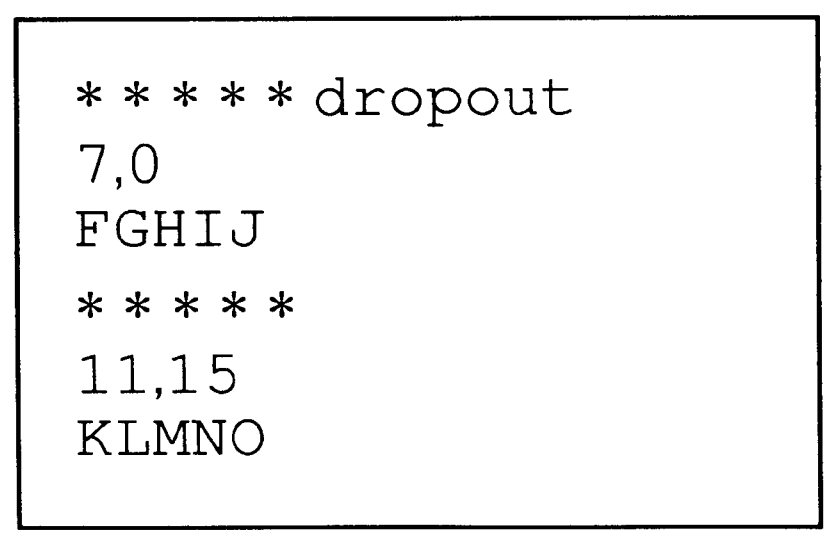

In the 11th embodiment, a comment which could be successfully transferred and a comment which could not be transferred are distinguished from each other by changing lines connecting an original document window and comment windows. Since the system arrangement in the 11th embodiment is the same as that in FIG. 50 of the 10th embodiment, a detailed description thereof will be omitted. In the 11th embodiment as well, a comment which could not be transferred is stored in the new document comment file 54 together with a definition indicating a dropout comment. At this time, position information is stored as follows. That is, of the position information in the old document comment file 52, the start position is directly transferred, and the end position is set to be "0". FIG. 55 shows an example of the contents of the new document comment file 54 in the 11th embodiment.

The sequence for creating this new document comment file 54 can be similarly described using the flow chart in FIG. 52 of the 10th embodiment. However, in the 11th embodiment, in step S141, the value of only the start position of the position information is output, and the end position "0" is output. For this reason, in FIG. 55, when a character string "FGHIJ" in the above-mentioned old document file is modified, a dropout comment is defined by "***dropout", and is stored together with position information (7, 0)**.

Figure 56:
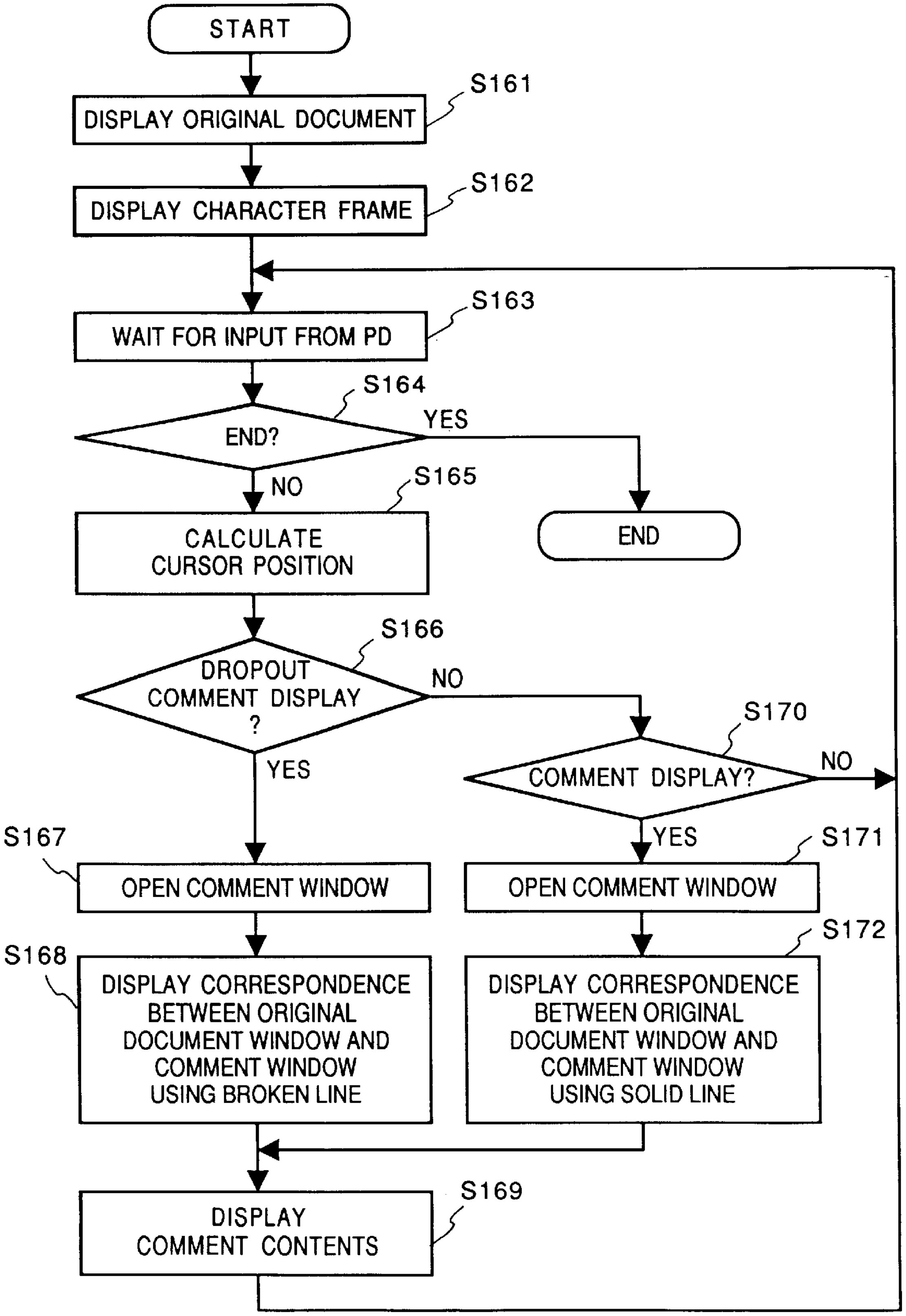
FIG. 56 is a flow chart showing the comment display sequence in the 11th embodiment.

The display method in the 11th embodiment will be described below with reference to the flow chart in FIG. 56.

In step S161, a window for the original document (the contents of the new document file 53) is opened to display the contents of the original document. The flow then advances to step S162, and rectangular frames are displayed in the original document displayed in step S161 with reference to position information in the new document comment file 54. When the value of the end position in the position information is "0", a vertical line is displayed in the same manner as in the 10th embodiment described above. More specifically, when a comment is added to a certain position or is a dropout comment, the same vertical line can be displayed. The flow advances to step S163 to wait for an input from the pointing device 1*c*.

In step S164, it is checked if an input from the pointing device 1*c* is an end instruction. If YES in step S164, all the displayed windows are closed, and this routine ends. Otherwise, the flow advances to step S165, and the position of the displayed cursor is calculated. In step S166, it is checked if a dropout comment is to be displayed. In this case, the position of a character at the displayed cursor position, i.e., the number of characters from the beginning of the original document is calculated, and whether or not a corresponding comment is a dropout comment can be checked by examining the content corresponding to the calculated position in the new document comment file.

If the content is "***dropout", the comment is a dropout comment. On the other hand, if the content is "***", the comment is not a dropout comment.

If it is determined in step S166 that a dropout comment is to be displayed, the flow advances to step S167, and a comment window is opened at a position corresponding to the release timing of the button of the pointing device 1*c*. In step S168, a correspondence between the display window of the original document and the comment window is established by connecting them by a broken line. In step S169, the comment contents are displayed in the comment window, and the flow returns to step S163.

On the other hand, if it is determined in step S166 that a dropout comment is not displayed, the flow advances to step S170 to check if a comment which could be successfully transferred is to be displayed. If NO in step S170, the flow returns to step S163; otherwise, the flow advances to step S171 to open the comment display window at a position corresponding to the release timing of the pointing device 1*c*. In step S172, a correspondence between the display window of the original document and the comment window is established by connecting them by a solid line. This has been a description of the display method.

Figure 57:
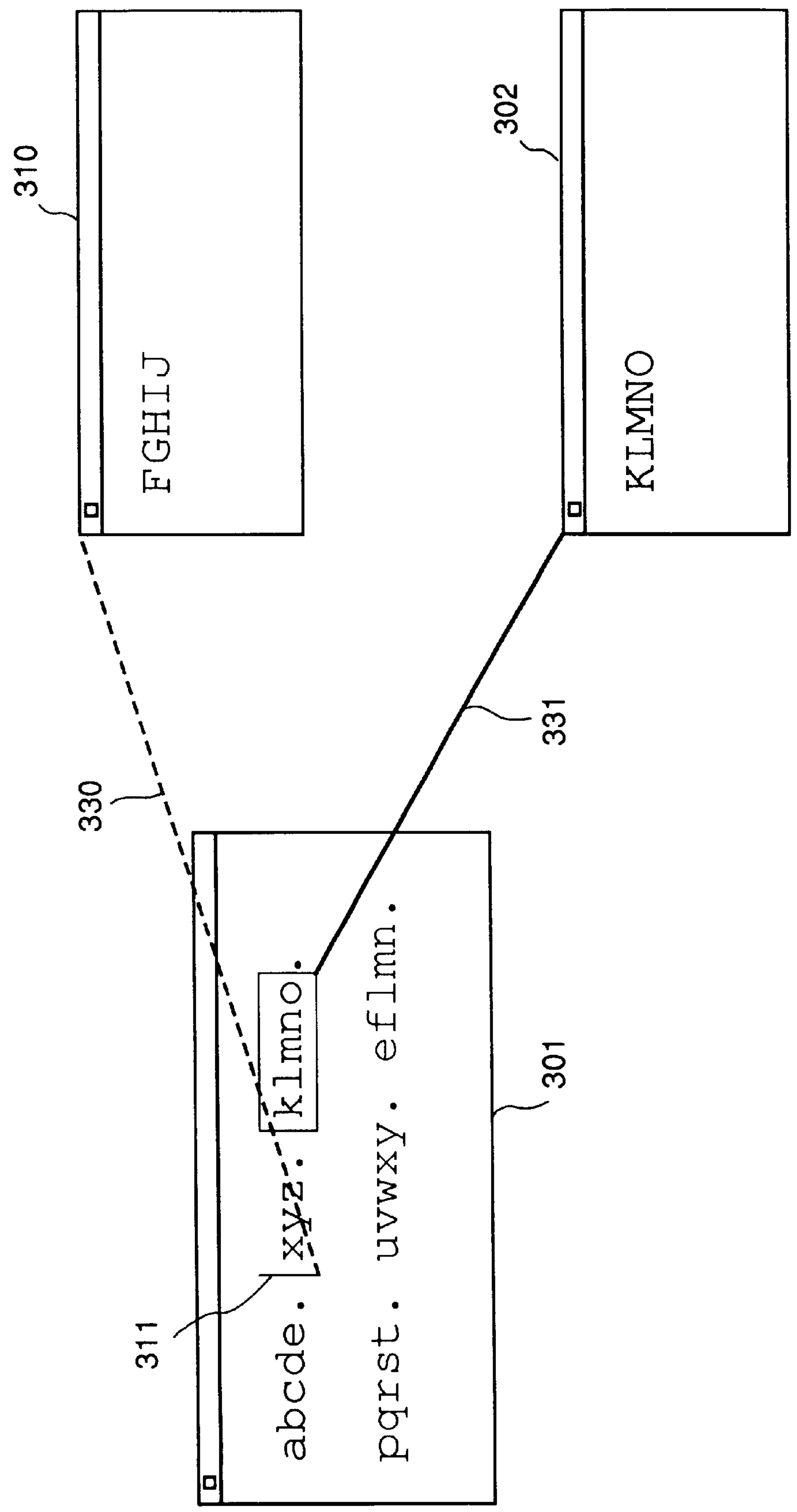
FIG. 57 is a view showing a display example of a comment and a dropout comment in the 11th embodiment.

FIG. 57 shows such a display example, and exemplifies a state after the contents of the old document file 51 shown in FIG. 42 are modified to the contents of the new document file 53 shown in FIG. 46.

As can be seen from comparison between FIGS. 57 and 54, a comment corresponding to a character string "klmno" is displayed in the window 302, and the windows 301 and 302 are connected by a solid line 331. On the other hand, a dropout comment is displayed in the window 310, and the document display window 301 and the comment display window 310 are connected by a broken line 330, thereby indicating a dropout comment.

In the 11th embodiment, when comment transfer processing is not successful, a rectangle (vertical line) displayed at the position where a character string added with a comment is assumed to have been present, and the comment display window are connected by the broken line. However, the present invention is not limited to the broken line. For example, the thickness of the solid line may be extremely changed. When a plurality of dropout comment display windows 310 are displayed, if the position relationship with an original document can be established by any method, these windows need not be connected by lines. If the CRT display la can perform a color display, a dropout comment may be identified by using a line in a different color.

<12th Embodiment>

In the 11th embodiment described above, a dropout comment is displayed in correspondence with, not a character string but, a position since no corresponding character string is present in a new document. However, the present invention is not limited to this. More specifically, in the case of a dropout comment, in place of setting the value of the end position to be "0", position information in the old document comment file may be transferred like without any modifications in the 10th embodiment.

Figure 58:
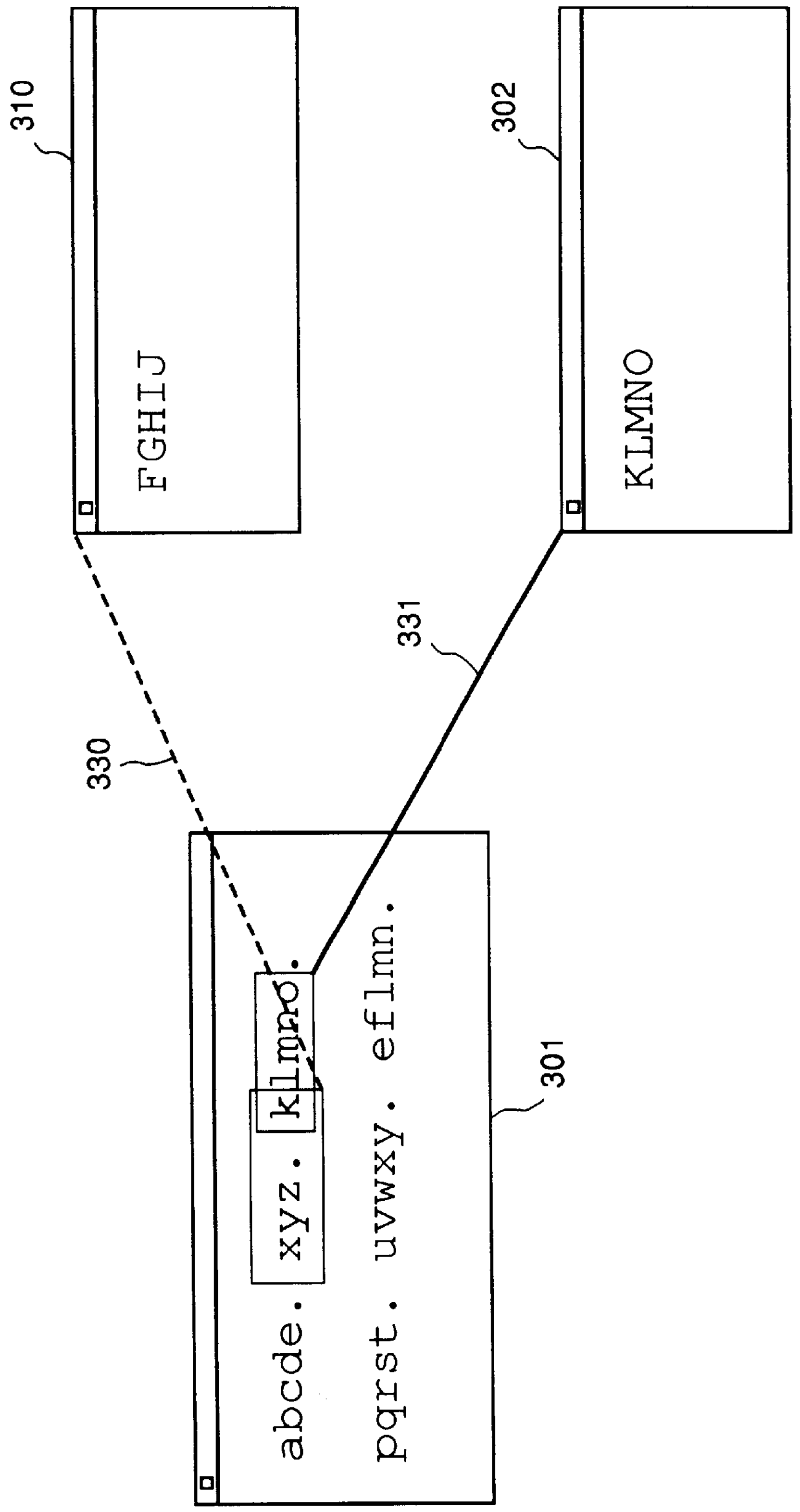
FIG. 58 is a view showing a display example of a comment and a dropout comment in the 12th embodiment.

FIG. 58 shows such an example.

In FIG. 58, a frame is displayed, so that a dropout comment corresponds to a character string "xyz, k" from the seventh to 11th characters in new document data displayed in the window 301. In this case, like in the 11th embodiment, since these two windows 301 and 310 are connected by the broken line 330, it can be understood that the window 310 displays a dropout comment. When frames surrounding character strings overlap each other, it can be determined in advance that a frame at a later start position is preferentially displayed.

<13th Embodiment>

In the 13th embodiment, a comment which could be successfully transferred, and a comment which could not be transferred are clearly distinguished from each other by changing the display states of window themselves in place of lines connecting the windows. In the case of a dropout comment, characters in the window are reversely displayed.

Figure 59:
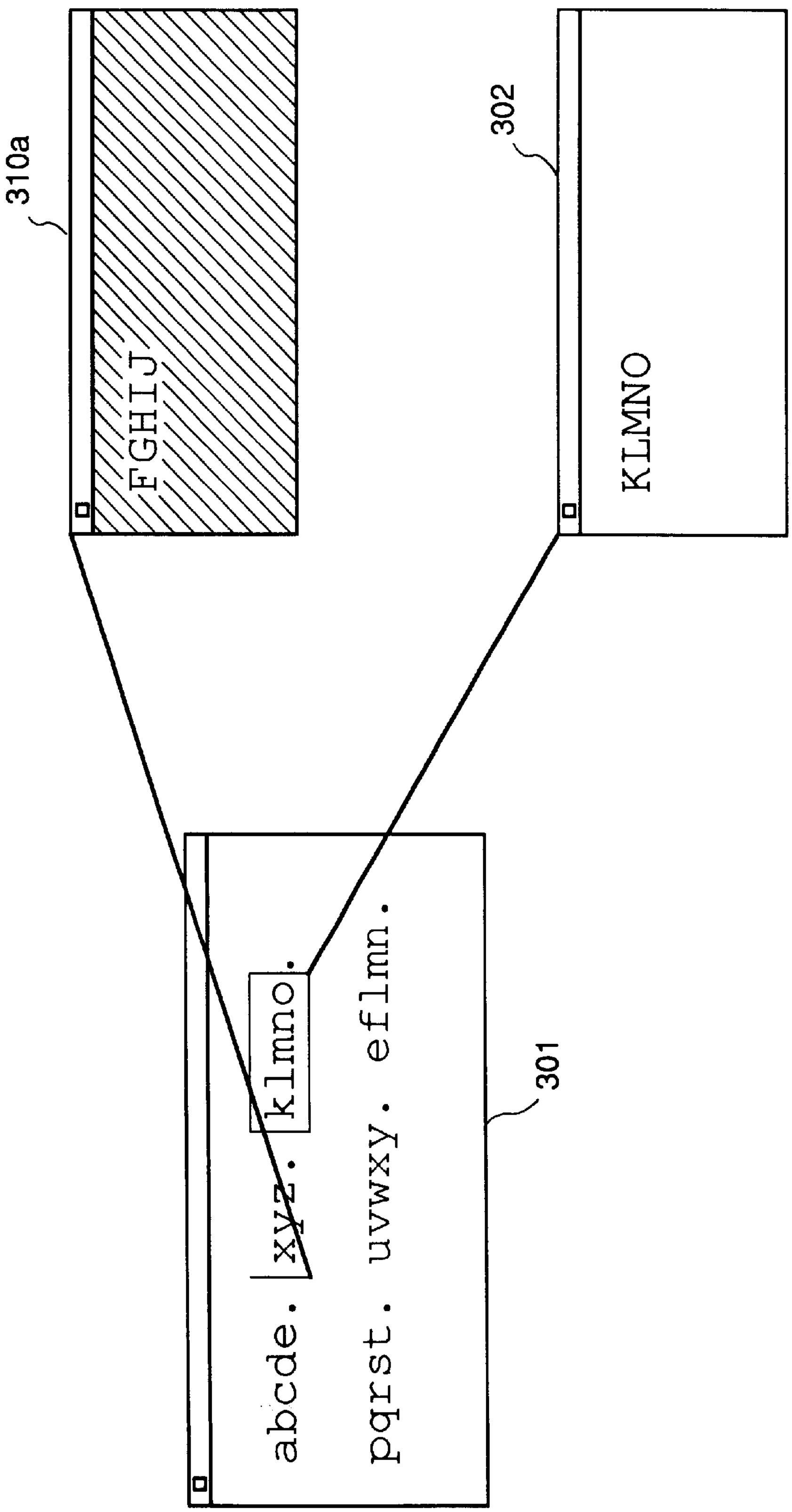
FIG. 59 is a view showing a display example of a comment and a dropout comment in the 13th embodiment.

The 13th embodiment can be explained in the same manner as in the 11th embodiment described above. If it is determined in step S166 in FIG. 56 that a dropout comment is to be displayed, the comment is displayed by reversely displaying characters in the window. In this case, the original document window 301 and a comment window 310*a* may be connected by a solid line, as shown in FIG. 59.

In the 13th embodiment, the contents of the dropout comment window 310*a* are reversely displayed. Alternatively, a message indicating a dropout comment may be described in a title bar of the comment window 310, the color of characters displayed in the comment window 310 may be changed, or the background color of the comment window 310 may be changed.

<14th Embodiment>

Since the schematic arrangement of a document processing apparatus of the 14th embodiment is also the same as that in the 10th embodiment (FIG. 50), a detailed description thereof will be omitted. The operation of the 14th embodiment will be described below.

Figure 60:
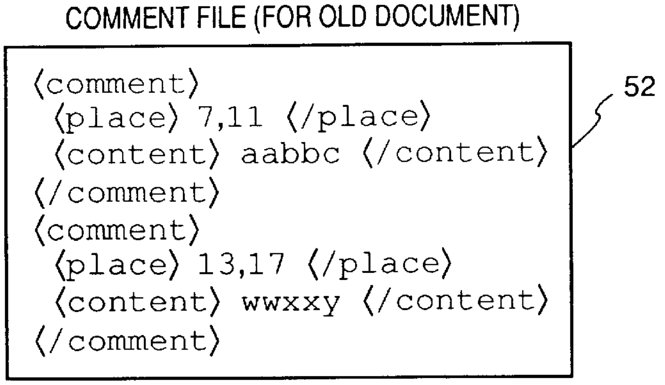
FIG. 60 is a view showing an example of a comment file for an old document in the 14th embodiment.

FIG. 60 shows the contents of a comment file obtained when a comment "aabbc" is added to a character string "fghij" in original document data (old document) shown in FIG. 42 above, and a comment "wwxxy" is added to a character string "klmno". Referring to FIG. 60, each comment is sandwiched between <comment> and </comment>, and position information is sandwiched between <place> and </place>. Furthermore, the contents themselves of a comment are stored between <content> and </content>. The position information is the same as that in the above embodiment.

Figure 61:
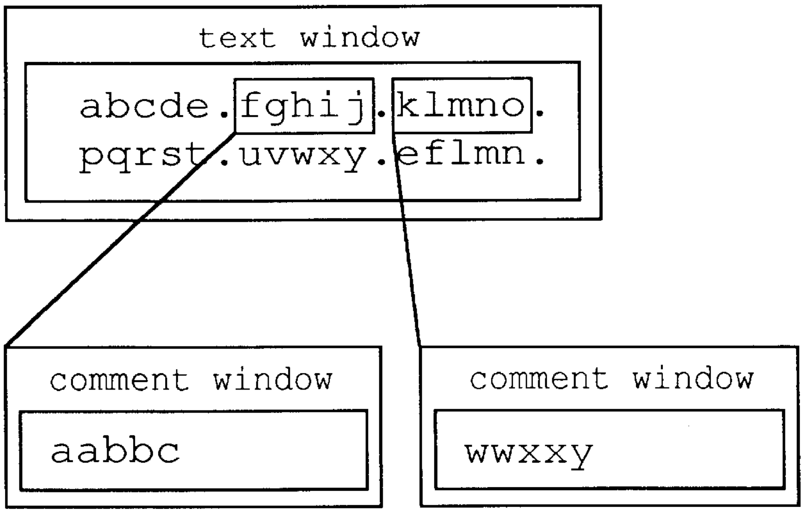
FIG. 61 is a view showing a display example of a text window and a comment window in the 14th embodiment.

FIG. 61 shows a display example wherein the original document data and comments are displayed in windows in correspondence with each other.

Figure 62:
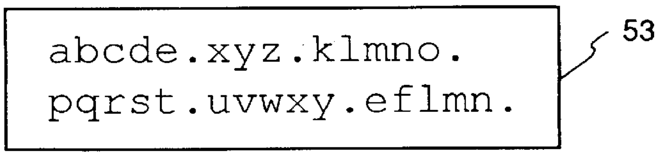
FIG. 62 is a view showing an example of a new document file in the 14th embodiment.
Figure 63:
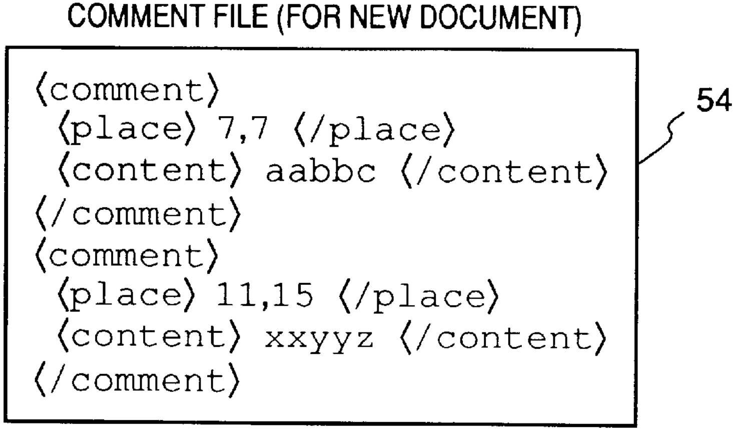
FIG. 63 is a view showing an example of the contents of a comment file for a new document file in the 14th embodiment.
Figure 64:
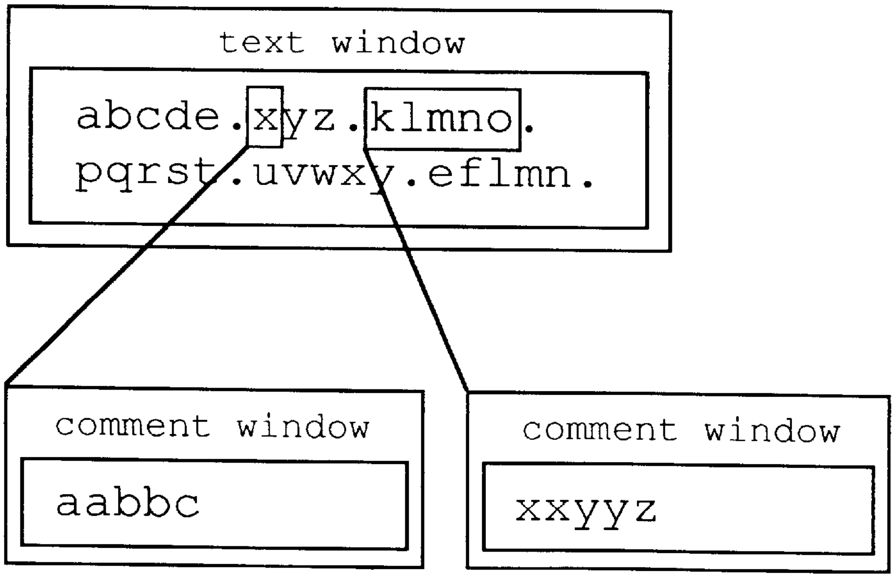
FIG. 64 is a view showing a display example of a text window and a comment window after a new document file is created in the 14th embodiment.

FIG. 62 shows new document data obtained by modifying the original document data, and FIG. 63 shows an example of the contents of the new document comment file 54 corresponding to this new document data. In the example shown in FIG. 63, since the character string "fghij" to which the comment "aabbc" is added is modified, the position information of the corresponding comment is changed to (7, 7), and position information of a comment added to the following character string "klmno" is also changed to (11, 15). In FIG. 64, the new document (FIG. 62) is displayed in a text window, and comments corresponding to character strings in the new document are displayed in windows.

Figure 65:
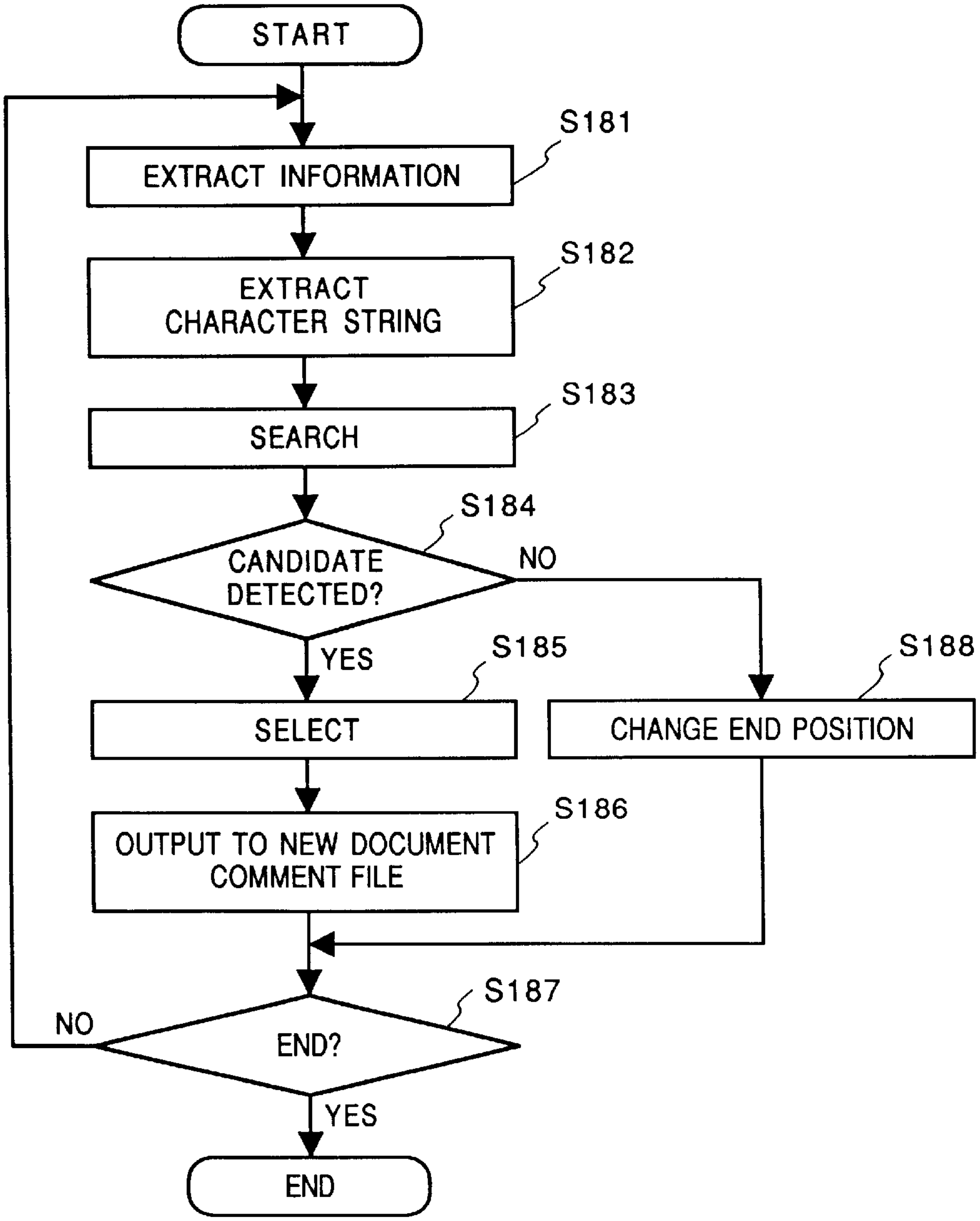
FIG. 65 is a flow chart showing the sequence for generating a comment for a new document in the 14th embodiment.

FIG. 65 is a flow chart showing processing for creating the new document comment in the 14th embodiment.

In step S181, position information and comment contents are read out from the old document comment file 52, and are respectively stored in the position information area 41 and the comment content area 42 in the work memory 4. The flow advances to step S182, and a character string is extracted from the old document file 51 on the basis of the position information read out in step S181. The extracted character string is stored in the character string area 43. In step S183, the same character string as that stored in the character string area 43 is searched from the new document file 53. If the character string is detected, position information (start and end positions) of the character string is stored in the candidate area 44. Note that the candidate area 44 can store a plurality of pieces of position information.

The flow advances to step S184 to check if candidates are detected, i.e., if the number of candidates in the candidate area 44 is "0". If candidates are detected, the flow advances to step S185. In step S185, one position information of a character string to which a comment is to be transferred is selected from the candidates, and is stored in the new position information area 45. In this case, for example, position information of a character string having position information closest to the position information stored in the position information area 41 is stored in the new position information area 45.

The flow advances to step S186, and the values in the new position information area 45 and the contents in the comment content area 42 are output to the new document comment file 54. The new document comment file may have a name obtained by adding an extension to the new document file name. For example, if the new document file name is "doc2", the new document comment file may have a name "doc2.comment". In step S187, it is checked if all comments registered in the old document comment file 52 are checked. If YES in step S187, this routine ends; otherwise, the flow returns to step S181.

If it is determined in step S184 that no candidate is detected, the flow advances to step S188, and the start position of position information in the old document file is stored as new start and end positions (see FIG. 63) in the new position information area 45.

Alternatively, if it is determined in step S184 that no candidate is detected, a new end position of position information in the original document may be set to be "0" (see FIG. 66), and may be stored in the new position information area 45 in step S188. This can be realized by setting the end position to be "0" in step S188 in FIG. 65 described above.

<15th Embodiment>

Figure 67:
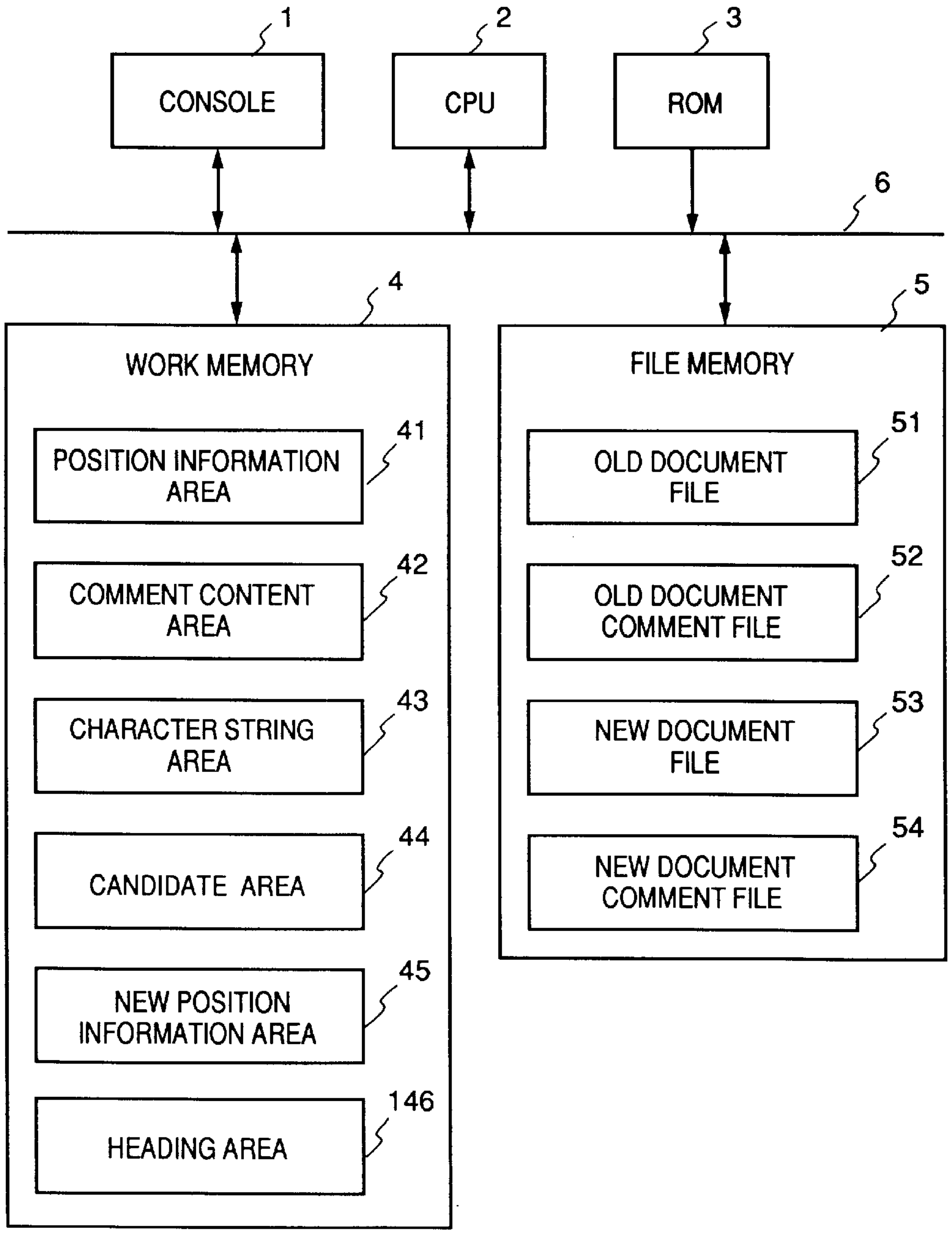
FIG. 67 is a schematic block diagram showing the arrangement of a document processing apparatus of the 15th embodiment.

FIG. 67 is a schematic block diagram showing the arrangement of a document processing apparatus according to the 15th embodiment of the present invention. The same reference numerals in FIG. 67 denote the same parts as in the above-mentioned embodiments, and a detailed description thereof will be omitted.

FIG. 69 shows an example of an original document file (old document), and FIG. 70 shows an example of the contents of a comment file for the original document file.

The document file of the 15th embodiment has the same format as that in the second embodiment. That is, the entire document is sandwiched between <doc> and </doc>, each section is sandwiched between <sec> and </sec>, and a heading of a section is sandwiched between <heading> and </heading>. Each paragraph is sandwiched between <par> and </par>.

In the example shown in FIG. 70, a comment "FGHIJ" is added to a paragraph "fghij" in a section having a heading "ABCD", and a comment "KLMNO" is added to a paragraph "klmno" in a section having a heading "XYZUVW". Note that position information in this embodiment is obtained by counting characters from the first character of the document. Characters constituting start and end symbols of document elements are counted, but space characters such as space codes, tab codes, newline codes, and the like are not counted.

When a portion having a meaning equivalent to that in an original document cannot be detected in a new document, a comment is added to a document element closest to the start position (the number of characters from the beginning) of a portion, to which the comment was added, in the original document.

Figure 68:
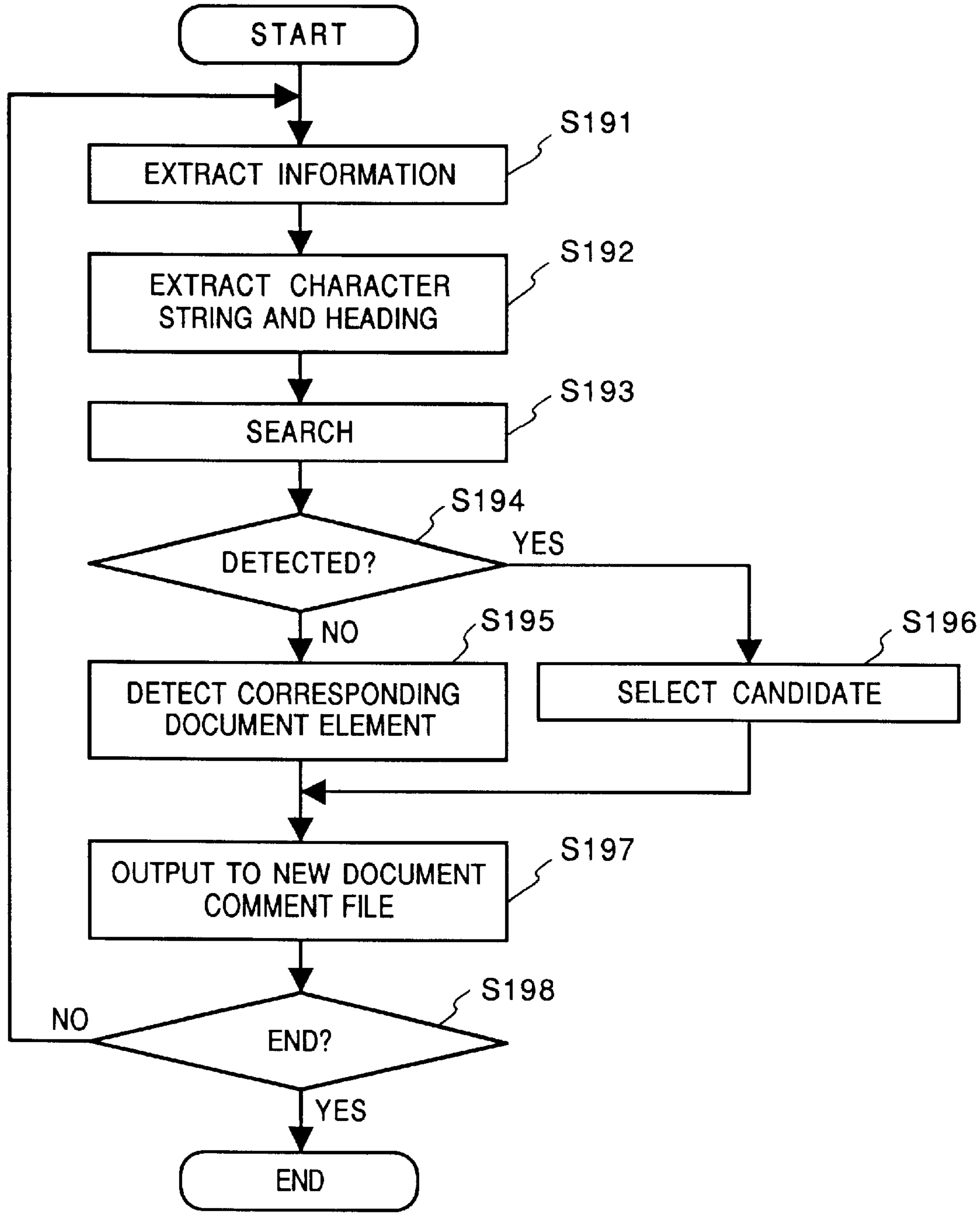
FIG. 68 is a flow chart showing the sequence for generating a comment for a new document in the 15th embodiment.

Processing shown in the flow chart in FIG. 68 shows the method of searching the above-mentioned equivalent portion, and the processing sequence executed when the equivalent portion cannot be detected.

In step S191, position information and comment contents are read out from the old document comment file 52, and are respectively stored in the position information area 41 and the comment content area 42 in the work memory 4. The flow advances to step S192, and a character string is extracted from the old document file 51 on the basis of position information read out in step S191. The extracted character string is stored in the character string area 43. In addition, the heading of a section including the comment-added portion is stored in the heading area 146. In step S193, the new document file 53 is searched for a section having the same heading as that stored in the heading area 146. If such a section is detected, the detected section is searched for the same character string as that stored in the character string area 43. If the same character string can be detected, position information (start and end positions) of the detected character string is stored in the candidate area 44. Note that the search processing may end at the first bit position, or the area 44 may store a plurality of pieces of position information.

The flow advances to step S194 to check if a candidate is detected. If YES in step S194, the flow advances to step S196; otherwise, the flow advances to step S195. In step S195, a document element closest to the start position of the comment-added portion in the original document is detected, and position information, which includes the position of the character "<" of the document element start symbol as a new start position and the position of the character ">" of the document element end symbol as a new end position, is stored in the new position information area 45.

For example, in the example shown in FIGS. 69 to 72, the contents "fghij" in a certain paragraph in the original document are modified to "xyz". The comment "FGHIJ" is added to this paragraph, and its position information is (51, 67). Therefore, in the new document, the modified character string "xyz" is detected, the start position (51) of this character string is set to be new start position information, and the last character position (65) of the character string is set to be new end position information. In this manner, as shown in FIG. 72, the position information of the comment "FGHIJ" is changed to (51, 65) in the new document comment file 54. On the other hand, if candidates are detected, the flow advances to step S196. In step S196, position information of a character string to which a comment is to be transferred is selected from the candidates, and is stored in the new position information area 45. In this case, position information of a character string having position information closest to that stored in the position information area 41 is stored in the new position information area 45.

The flow advances to step S197, and the values in the new position information area 45 and the contents in the comment content area 42 are output to the new document comment file 54. In step S198, it is checked if all the comments registered in the old document comment file 52 are checked. If YES in step S198, this routine ends; otherwise, the flow returns to step S191.

On the other hand, if at least one candidate is detected in step S194, a candidate closest to the comment-added position in the old document is selected in step S196, and the flow advances to step S197. In step S197, the selected candidate is output to the new document comment file as comment information.

Figure 73:
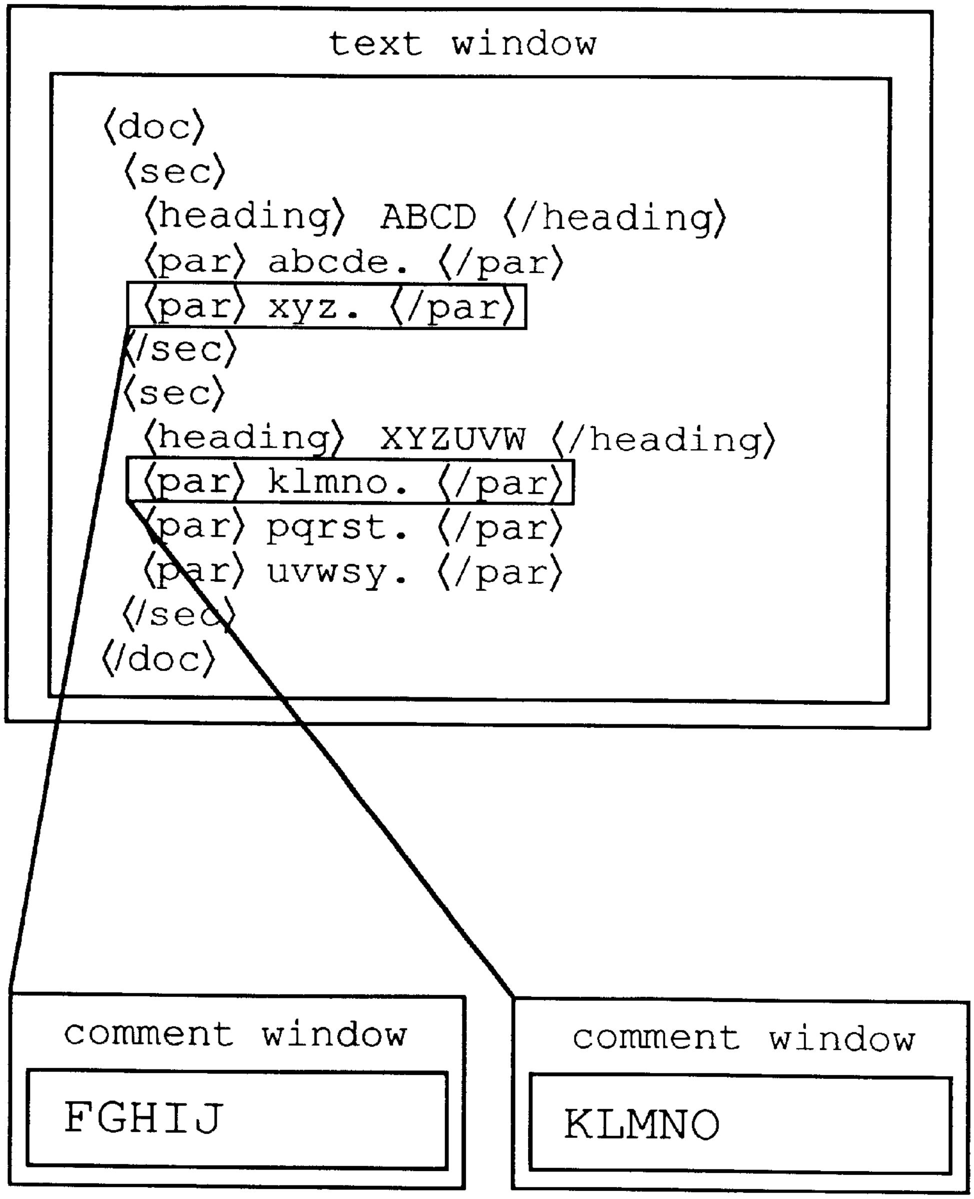
FIG. 73 is a view showing a display example of a new document file and its comment in the 15th embodiment.

FIG. 73 shows a display example of this document file and comments corresponding to character strings in the document.

As has been described in the above embodiments, as shown in FIG. 74, the end position of a comment corresponding to a modified portion in the original document may be set to be "0" to identify a dropout comment.

In the 15th embodiment, the closest document element is searched on the basis of the start position of a character string in the original document and the position of the document element start symbol in the new document. Alternatively, the end position may be used in place of the start position in the original document, and the end symbol may be used in place of the document element start symbol. In addition, the closest document element may be determined by detecting a document element which is most closely associated with a designated range. Also, the closest document element may be searched for in accordance with the ordinal number of the element in the corresponding document element <sec>.

As described above, according to the 15th embodiment, a position near the comment-added position in the original document is detected from the new document in consideration of not only position information but also document information, thus allowing more proper detection. A dropout comment file is added to and displayed at the detected position. Therefore, if a document is modified with little change in the document structure, a user can easily find a correspondence between a dropout comment and the new document.

<16th Embodiment>

In the 16th embodiment, a modification of the 14th embodiment will be described. If it is determined in step S184 in the flow chart in FIG. 65 that no candidate is detected, in step S188, the start and end positions of a higher-level document element <sec> having a heading "ABCD" in, e.g., FIG. 71 are detected, and these values are stored in the new position information area 45. For example, as shown in FIG. 71, when a paragraph "fghij" of the document is modified to "xyz", the contents of the new document comment file 54 at that time are as shown in FIG. 75, and a portion from "<" of <sec> to ">" of </sec> in FIG. 71 is designated by position information (6, 71).

In the comment file shown in FIG. 75, since the comment-added position is represented by the number of characters from the beginning, the added position of "KLMNO" is expressed by (102, 118).

<17th Embodiment>

Figure 76:
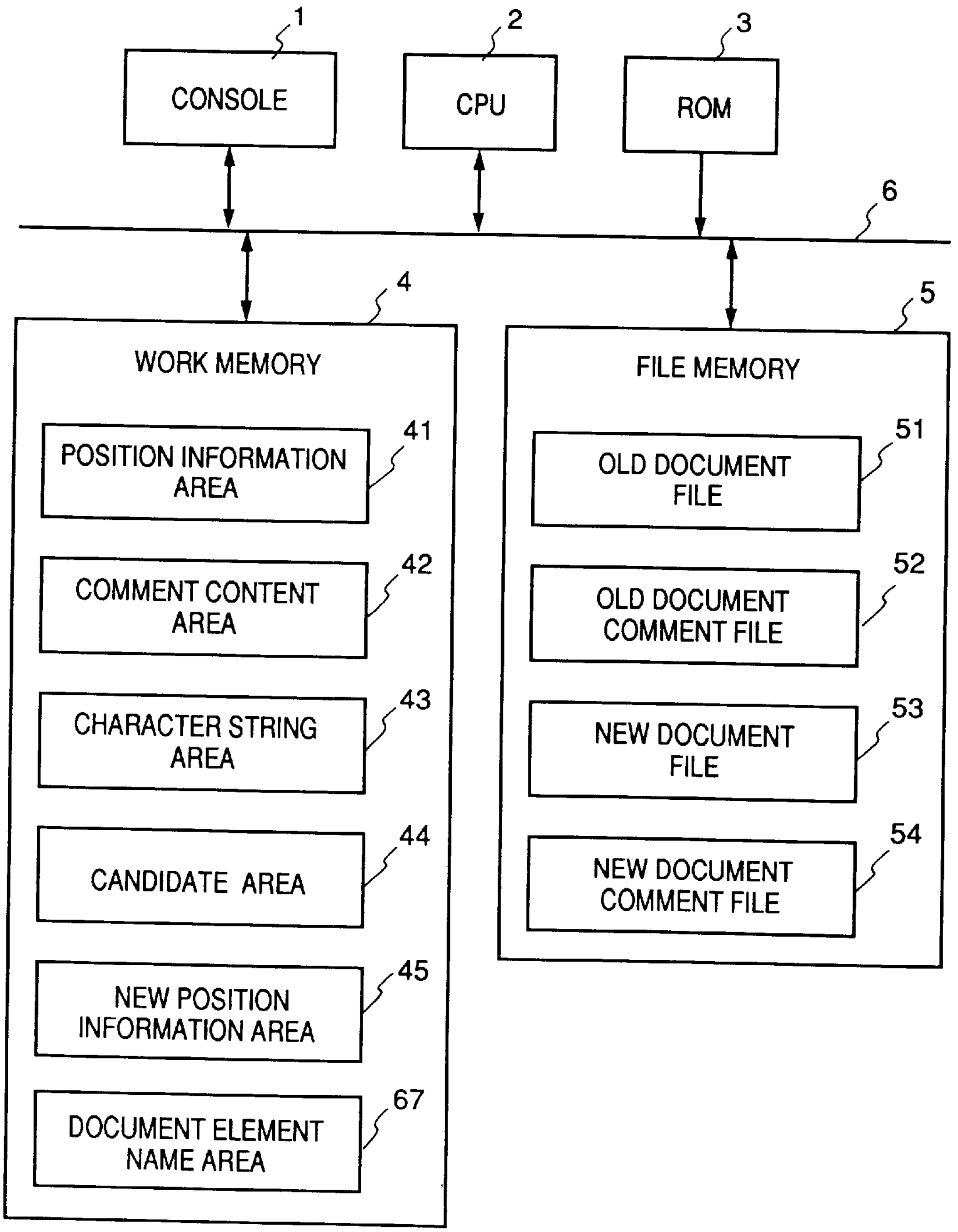
FIG. 76 is a block diagram showing the arrangement of a document processing apparatus of the 17th embodiment.
Figure 79:
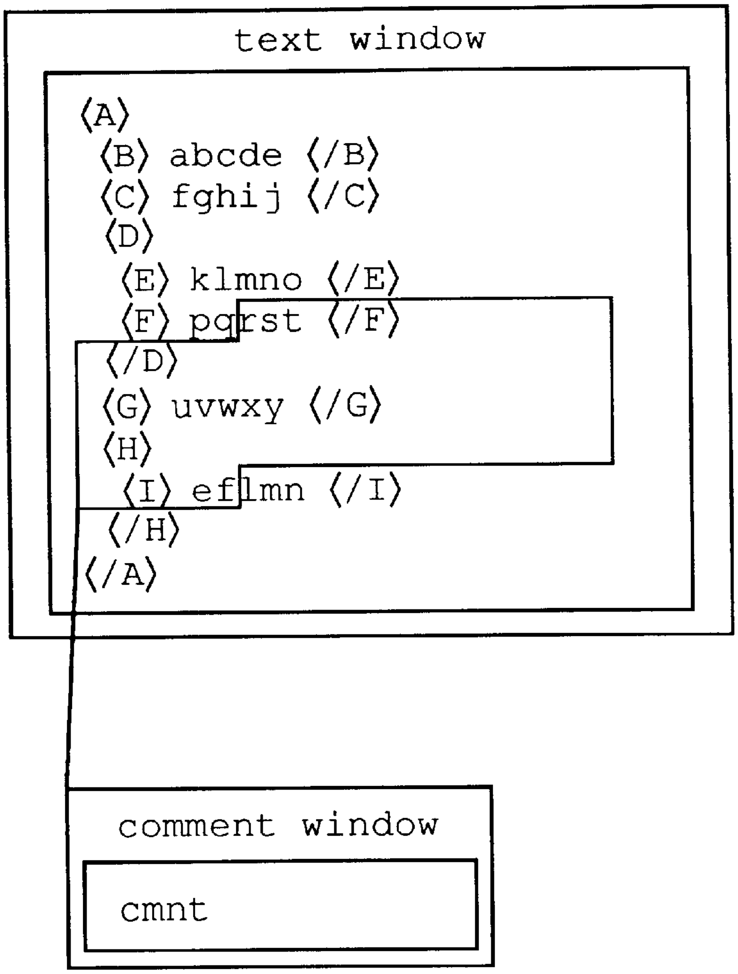
FIG. 79 is a view showing a display example of a new document file and its comment in the 17th embodiment.

FIG. 76 shows the arrangement of a document processing apparatus according to the 17th embodiment of the present invention. The same reference numerals in FIG. 76 denote the same parts as in the above embodiments, and a detailed description thereof will be omitted. FIG. 77 shows an example of document data to be processed in this embodiment, and FIG. 78 shows an example of the contents of a comment file corresponding to the document data. Document element division symbols <A>, </A>, <B>, </B>, and the like are defined in the same manner as in the above embodiments. In the 17th embodiment, as a method of identifying a higher-level document element, a minimum document element including the entire comment-added range in old document data is detected, and a document element having the same document element name and closest to the position (start position) of the above-mentioned range in the new document is detected. In this example, a comment is added to "rst . . . ef" corresponding to position information (48, 78) of a document. FIG. 79 shows a display examples of these text and comment windows.

Figure 80:
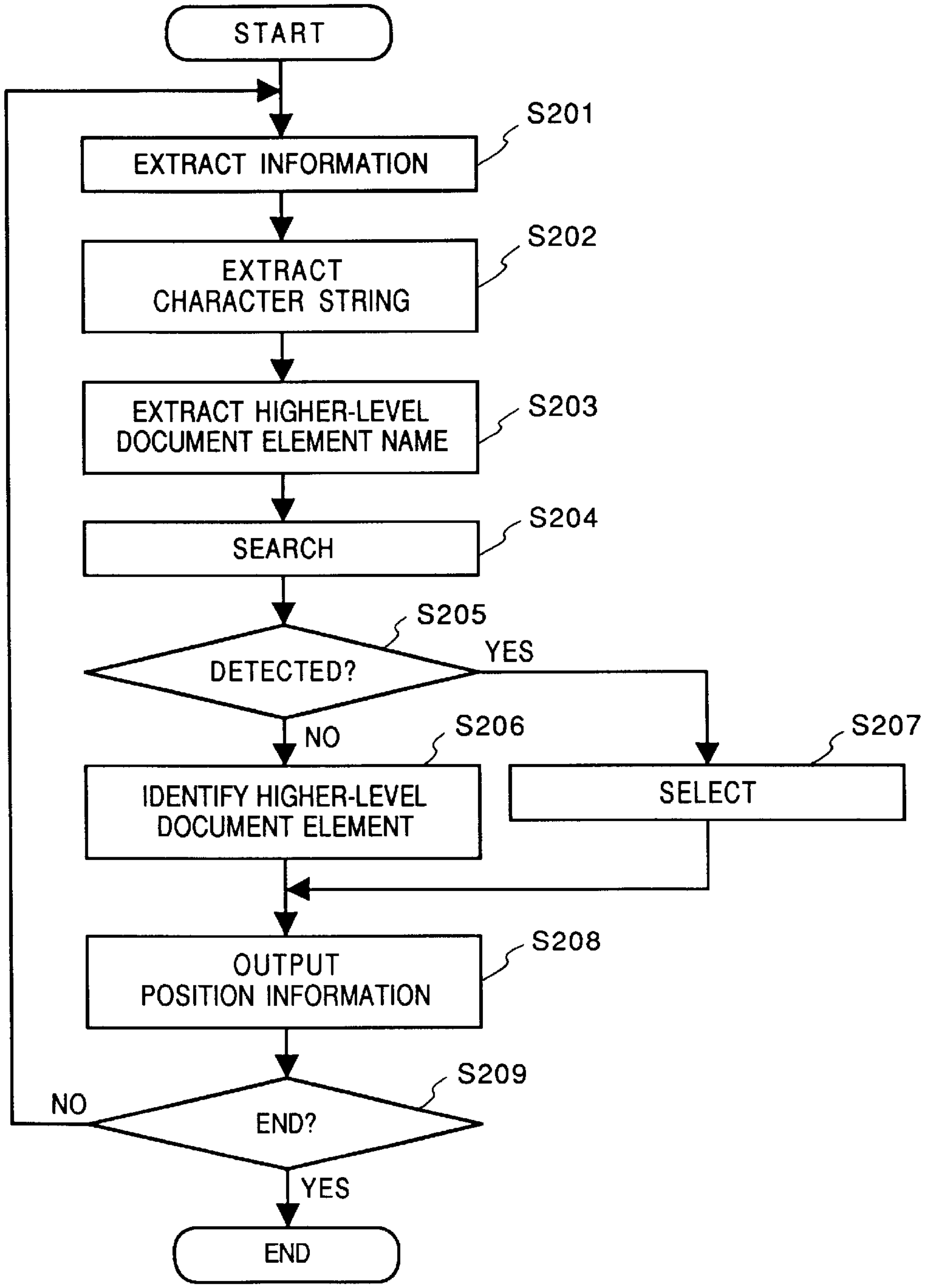
FIG. 80 is a flow chart showing the sequence for creating a comment for a new document in the 17th embodiment.

FIG. 80 is a flow chart showing the method of searching an equivalent portion, and the processing sequence executed when the equivalent portion cannot be detected.

When a character string is extracted in steps S201 and S202, the flow advances to step S203, and the name of a minimum document element including the entire comment-added portion is extracted from the old document file 51. For example, the name of the minimum document element can be extracted as follows. That is, when a document element start symbol is detected, its document element name is pushed to a document element name area 67 (the document element name area 67 is a stack); when a document element end symbol is detected, its contents are popped. While a range from the start to end positions indicated by the position information stored in the position information area 41 is searched, when the depth of the stack becomes smallest, a document element name located at the top of the stack is fetched.

Figure 82:
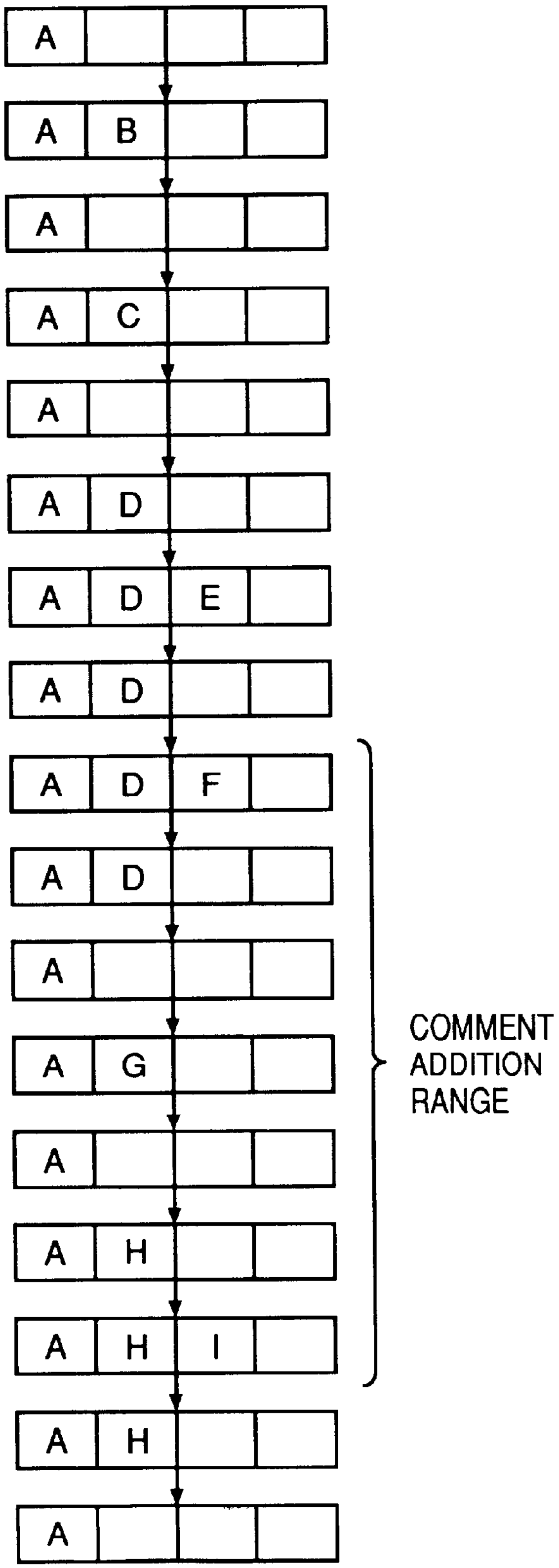
FIG. 82 is a view showing the state of stacks in a document element name area in the 17th embodiment.

FIG. 82 is a view for describing a change in contents of the document element name area 67. As shown in FIG. 82, a change in contents of the document element name area 67 corresponds to the document file shown in FIG. 77. The processing is executed from the beginning of the document file, and upon detection of the start symbol of an element A, an element name A is pushed. Since the start symbol of an element B is then detected, an element name B is pushed. Upon detection of the end symbol of the element B, the element B is popped. Thereafter, the contents of the stack change in the same sequence as described above. While the contents of the stack in the document element name area 67 are "ADF", the start point of a comment-added range appears. The end point of the comment-added range appears when the contents of the stack are "AHI". A document element name located at the top of the stack when the stack becomes shallowest in the comment-added range is A.

In step S204, the new document file 53 is searched for the same character string as that in the character string area 43, and if the same character string is detected, it is registered in the candidate area 44. In step S205, it is checked if a character string can be detected. If YES in step S205, in step S207, a candidate positionally closest to the position information stored in the position information area 41 is selected from those stored in the candidate area 44, and its position information is stored in the new position information area 45. However, if NO in step S205, the flow advances to step S206, and a document element having the same name as that extracted in step S203 is detected. A document element positionally closest to the comment-added position among the extracted document elements is detected, and its position information is stored in the new position information area 45. In step S208, the contents of the new position information area 45 and the contents of the comment content area 42 are stored in the new document comment file 54.

Figure 81:
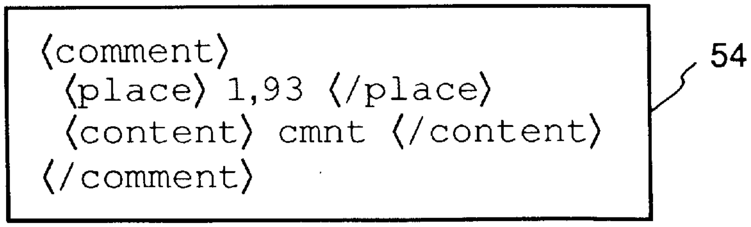
FIG. 81 is a view showing an example of a comment file for a new document in the 17th embodiment.

FIG. 81 shows a state wherein a document element <A> is identified as a higher-level document element, and position information of the document element <A> stored in the position information area 41 is stored in the new document comment file 54.

In the flow chart in FIG. 80 described above, the processing in step S203 is executed after the processing in step S202. Alternatively, the processing in step S203 may be executed when a comment transfer destination cannot be detected in the processing in step S205. The identification method of a document element in step S206 is not limited to the description of this embodiment. For example, of document elements having the same name as the extracted document element name, a document element having the same first or last several characters as those in old document data may be searched for. In this case, when a higher-level document element name is extracted from old document data, not only a document element name but also first several characters of the document element contents are extracted, and a document element can be identified using the extracted character string and document element name.

When original document data does not have any hierarchical structure, if a corresponding character string cannot be detected in new document data, a comment of original old document data is used as a comment for the entire document data. This can be realized by considering characters as document elements and the entire document data as a higher-level document element in the above-mentioned embodiment for a document having a hierarchical structure.

<18th Embodiment>

Figure 83:
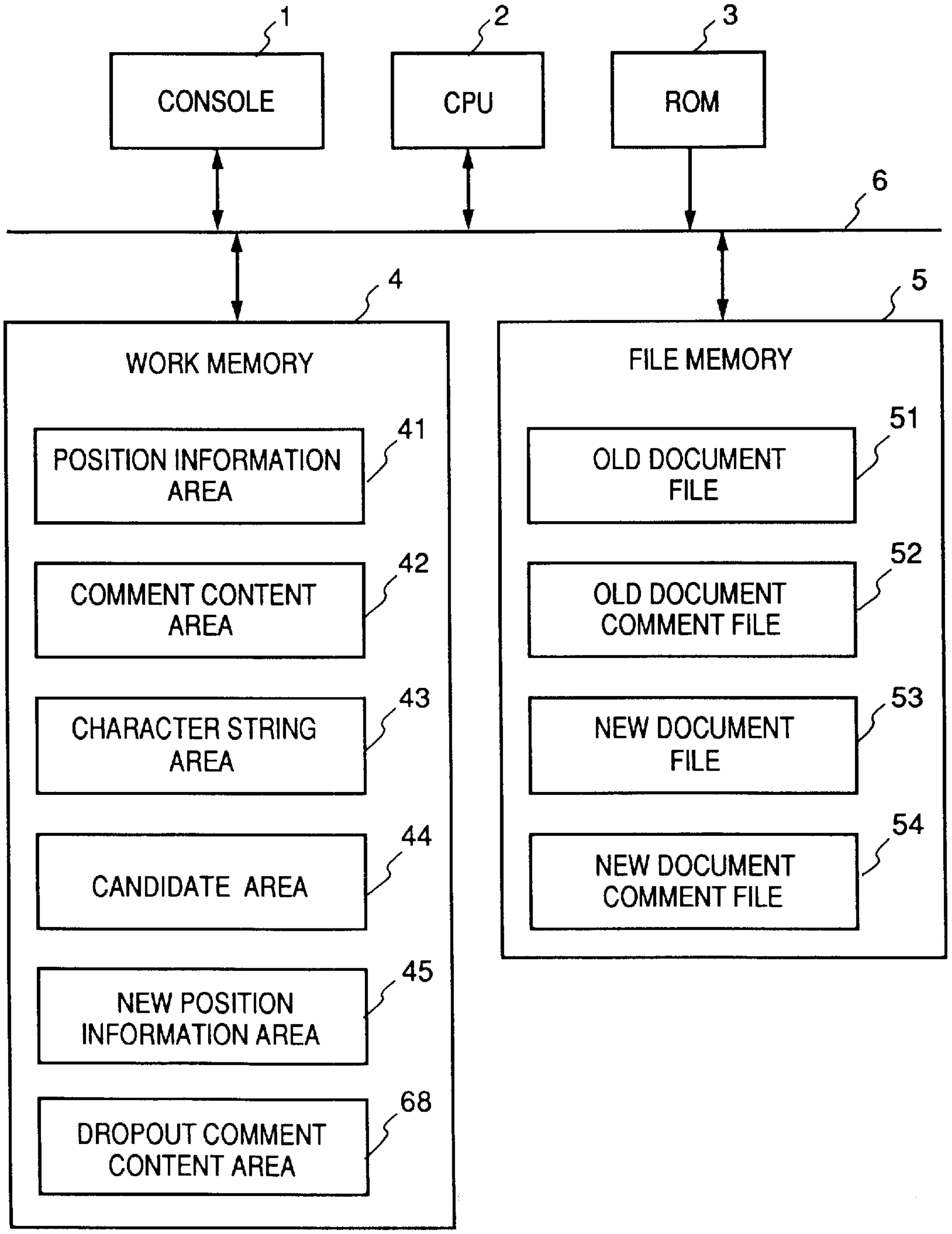
FIG. 83 is a schematic block diagram showing the arrangement of a document processing apparatus of the 18th embodiment.

FIG. 83 is a schematic block diagram showing the arrangement of a document processing apparatus according to the 18th embodiment of the present invention. The same reference numerals in FIG. 83 denote the same parts as in the above embodiments, and a detailed description thereof will be omitted.

In the 18th embodiment, when an original document is modified, and a character string corresponding to a comment added to the modified character string is not present in a new document, the comment is reflected in the new document.

For example, assume that comments shown in FIG. 60 are added to the above-mentioned original document shown in FIG. 42, and the original document is modified, as shown in FIG. 85. In FIG. 85, a character string "fghij" at the character position (7, 11) in the original document is modified to "xyz". Thus, since the character string corresponding to a comment "aabbc" is modified, the comment "aabbc" becomes a dropout comment (a comment with no corresponding character string). This dropout comment is stored while being added to the end of the new document file 53, as shown in FIG. 85.

FIG. 86 shows an example of the contents of the comment file 54 in the 18th embodiment. In FIG. 86, position information of a comment "wwxxy" added to a character string "klmno" in the original document (old document) is changed to (11, 15), and the changed position information is stored.

Figure 84:
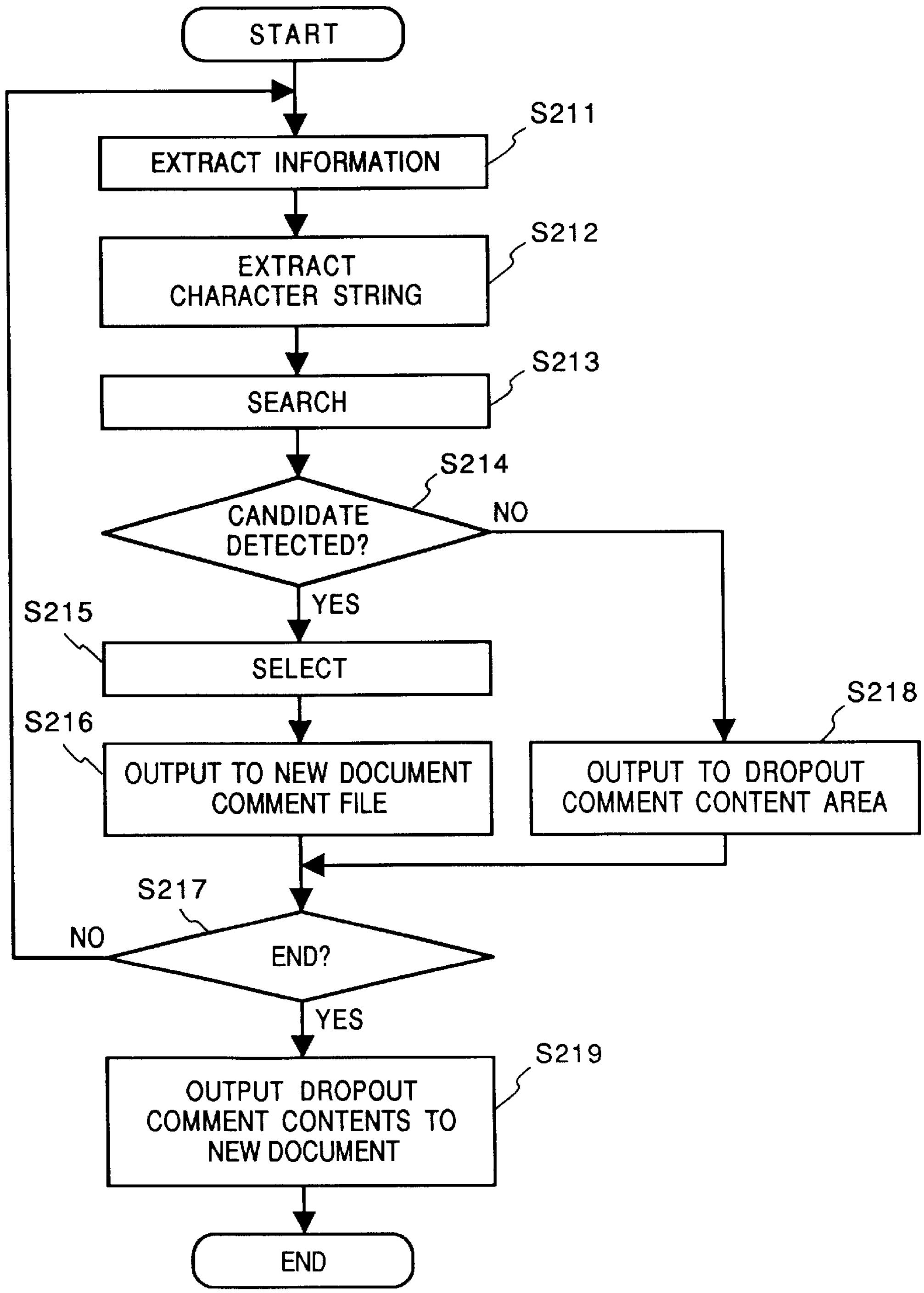
FIG. 84 is a flow chart showing the sequence for creating a comment for a new document in the 18th embodiment.

FIG. 84 is a flow chart showing this processing, and this program is stored in the ROM 3 and executed by the CPU 2, as in the above embodiments. Since the basic operation of this processing includes a portion common to the above embodiments, a characteristic portion will be briefly described below.

In step S211, position information and comment contents are read out from the old document comment file 52, and are respectively stored in the position information area 41 and the comment content area 42 in the work memory 4. The flow then advances to step S212, and a character string is extracted from the old document file 51 on the basis of the values of the position information read out in step S211. The extracted character string is stored in the character string area 43. In step S213, the new document file 53 is searched for the same character string as that extracted in step S212. If the same character string is detected, the start and end positions (the number of characters from the beginning) of the detected character string in the new document file 53 are calculated, and the pair of values are stored as a candidate in the candidate area 44. This search processing is executed for all the sentences in the new document file, and if a plurality of character strings are searched for in the new document file 53, these plurality of candidates are stored in the candidate area 44.

In step S214, it is checked if a candidate is detected. If YES in step S214, the flow advances to step S215, and a candidate closest to the comment-added position (the contents in the position information area 41) in the old document file 51 is selected from the candidates. The position information of the selected candidate is stored in the new position information area 45. As the criterion for the closeness, a candidate closer to the above-mentioned comment-added position is selected. The flow then advances to step S216, and the contents in the new position information area 45 and the contents in the comment content area 42 are written in the new document comment file 54 (see FIG. 86). Note that the new document comment file has a file name obtained by adding an extension to the new document file name, as in the above embodiments.

If it is determined in step S214 that no candidate is detected, the flow advances to step S218, the contents (a character string sandwiched between <content> and </content> in the old document comment file 52) of a comment added to an old document at that time are registered in a dropout comment content area 68. Then, the contents of the dropout comment are stored as follows. That is, a mark indicating "dropout contents are indicated below" is added to the end of the new document file 53, and thereafter, the contents of the dropout comment content area 68 are added (see FIG. 85).

As described above, according to the 18th embodiment, a dropout comment in the new document file can be easily confirmed.

<19th Embodiment>

Figure 87:
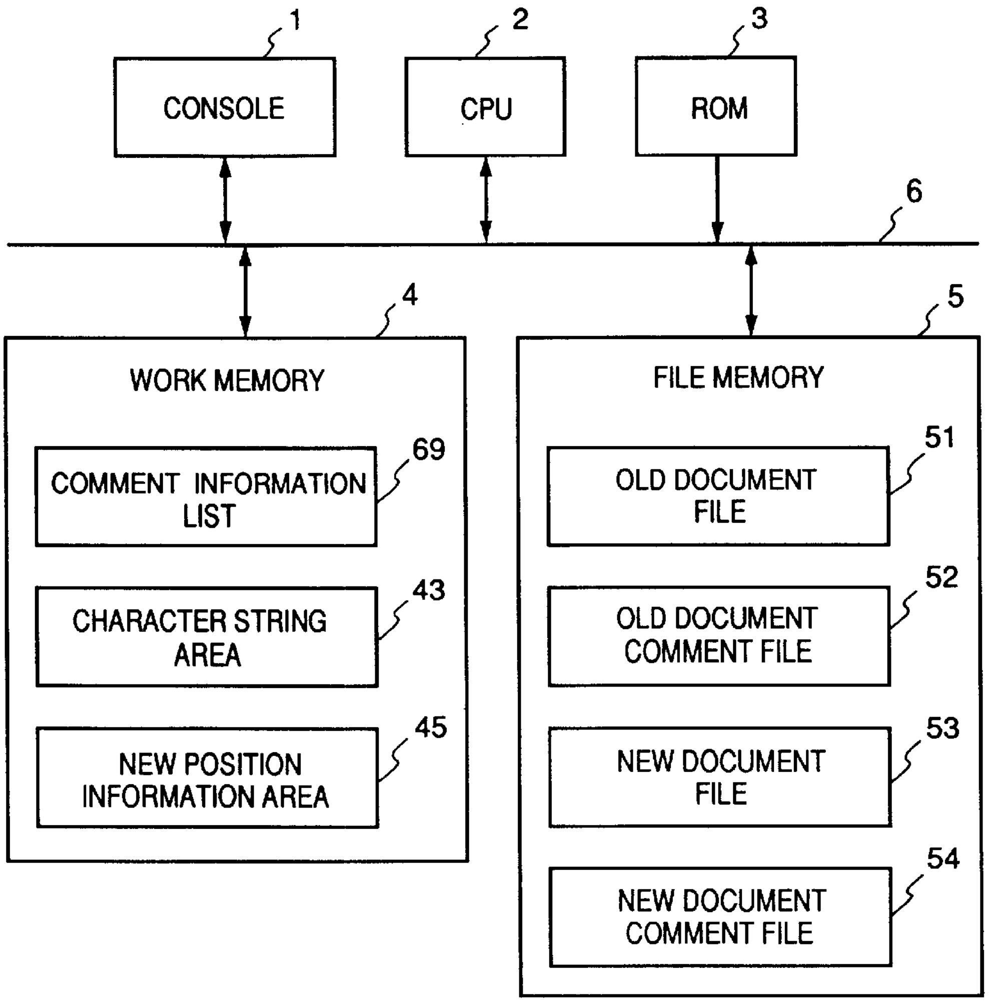
FIG. 87 is a schematic block diagram showing the arrangement of a document processing apparatus of the 19th embodiment.
Figure 88:
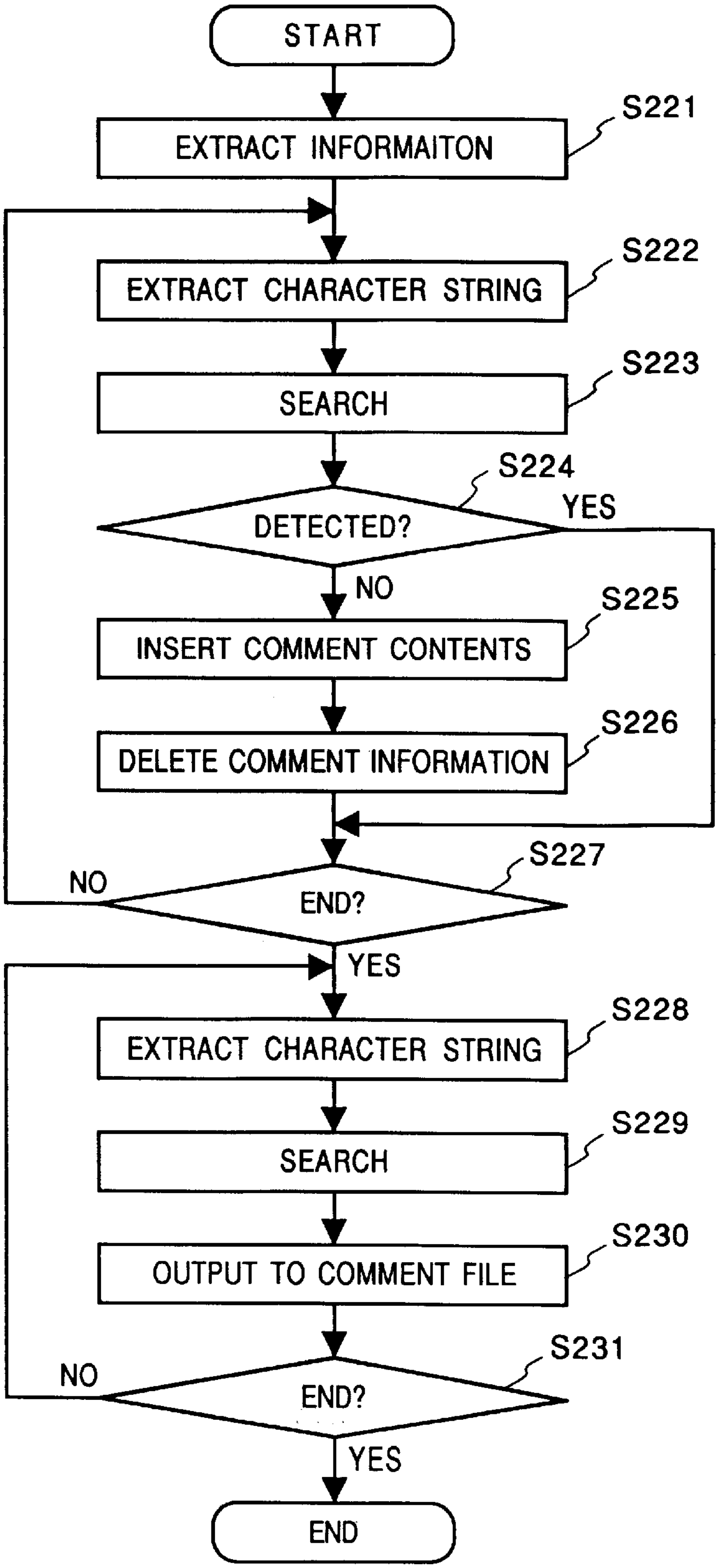
FIG. 88 is a flow chart showing the sequence for creating a comment for a new document in the 19th embodiment.

The 19th embodiment will be described below. In this embodiment, the contents of a dropout comment are output to the same position as the added position in the old document file. FIG. 87 is a schematic block diagram showing the arrangement of a document processing apparatus of the 19th embodiment, and FIG. 88 is a flow chart showing the processing of the apparatus. A comment information list 69 in FIG. 87 corresponds to a combination of the above-mentioned position information area 41 and the comment content area 42, and stores information associated with all the comments. FIG. 89 shows an example of the comment information list 69.

Referring to FIG. 89, the contents and old start and end positions of all comments are stored. Note that FIG. 89 shows a comment information list generated based on the comment file shown in FIG. 60.

The processing of this apparatus will be described below with reference to the flow chart in FIG. 88.

In step S221, old position information (start and end positions) and comment contents are read out from the old document comment file 52, and are written in the columns of old position information and comment contents in the comment information list 69. This processing is repeated by the number of all the comments, thus completing the comment information list 69.

The flow advances to step S222 to extract old document position information from the comment information list 69, and to extract a character string indicated by the extracted position information from the old document file 51. The extracted character string is stored in the character string area 43. The flow then advances to step S223 to search the new document file 53 for the same character string as that extracted in step S222. The search processing ends at the first hit position.

If no character string is detected in step S224, the flow advances to step S225, and the comment contents are inserted in the new document file 53 while being sandwiched between a character string "<dropout>" as a mark indicating the "start of dropout comment contents" and a character string "</dropout>" as a mark indicating the "end of dropout comment contents". At this time, the insertion position is a position indicated by the old start position in the comment information list 69. The flow advances to step S226, and the current comment information is deleted from the comment information list 69. That is, information of a dropout comment which could not be transferred is deleted from the comment information list 69.

After the last information in the comment information list 69 is checked, the flow advances to step S228, and a character string is extracted as in step S212 described above. In step S229, in addition to the processing in step S213 described above, position information (start and end positions) of the detected character string is calculated. In this case, a character string sandwiched between the character strings "<dropout>" and "</dropout>" is not counted. The calculated values are stored in the new position information area 45. The flow advances to step S230, and the contents of the new position information area 45 and the contents of the comment at that time are output to the new document comment file 54. In step S231, it is checked if the last information in the comment information list is checked. If NO in step S231, the flow returns to step S228 to check the next information in the comment information list 69.

FIG. 90 shows an example of the new document file 53 obtained when the document shown in FIG. 42 is modified, as shown in FIG. 85, as described above, and FIG. 91 shows an example of the contents of the new document comment file 54 at that time.

As described above, since the character string "fghij" in the old document is modified to "xyz", the comment "aabbc" becomes a dropout comment. This dropout comment is stored in the new document file 53 as a character string sandwiched between "<dropout>" and "</dropout>". In the new document comment file, only the comment "wwxxy" which could be successfully transferred is stored. Since the comment "wwxxy" was added to the character string "klmno" in the original document, its character position is changed to (11, 15) in correspondence with the modification of the character string "fghij" in the old document to "xyz".

According to the 19th embodiment, since a comment added to a character string in an old document is readded at a position in a new document near the original position in the old document, a correspondence therebetween can be easily recognized.

As described above, according to the ninth to 19th embodiments, a comment which could be successfully transferred and a comment which could not be transferred can be easily recognized.

Since a correspondence between even a comment which could not be transferred and an original character string can be recognized, the meaning of the comment added to an original document can be easily understood.

Since a comment which could be successfully transferred and a comment which could not be transferred are displayed by apparently different display methods, they can be identified at a glance.

Since a dropout comment is edited to be added to a modified document, transfer of a dropout comment can be easily executed.

Even when an equivalent portion of a comment cannot be detected from a modified document, since a comment can be added to a document element near the commentadded position in an original document, omission of comments can be prevented. Also, a comment corresponding to an original document element can be prevented from being added to a non-corresponding document element.

As described above, according to the ninth to 19th embodiments of the present invention, second document information added to first document information can be caused to correspond to the modified first document information.

Also, according to the ninth to 19th embodiments, a portion, corresponding to the original second document information, in the modified document information can be searched for, and document information, for which a portion in the first document information corresponding to the second information can be searched for, and document information, for which a corresponding portion in the first document information cannot be searched for, can be identifiably registered and displayed.

In the above-mentioned embodiments, as a method of designating the position of a comment, the number of characters or lines from the beginning of a document is used. However, the present invention is not limited to this. For example, the present invention can be applied even to a method of designating a comment position by embedding a specific code such as link information in a document, if the specific code is detected, and a character string at that position is extracted.

<20th Embodiment>

In this embodiment, a comment display method for displaying a document and comments added thereto exemplified in the above-mentioned embodiments, and a document processing apparatus will be described below.

Figure 102:
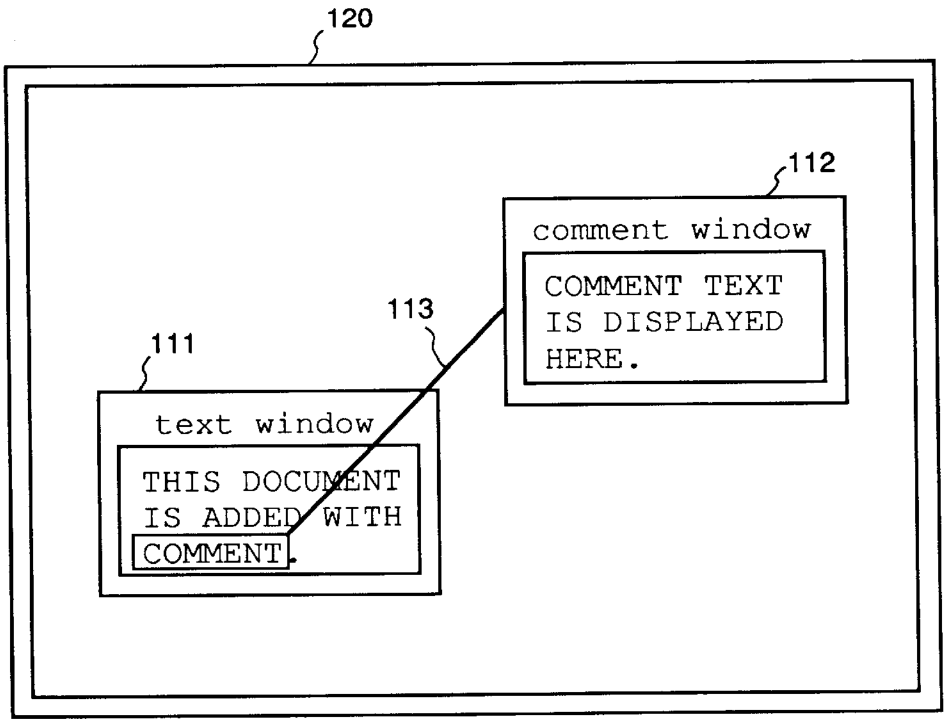
FIG. 102 is a view showing the display method of a document and a comment in a conventional document processing apparatus.
Figure 103:
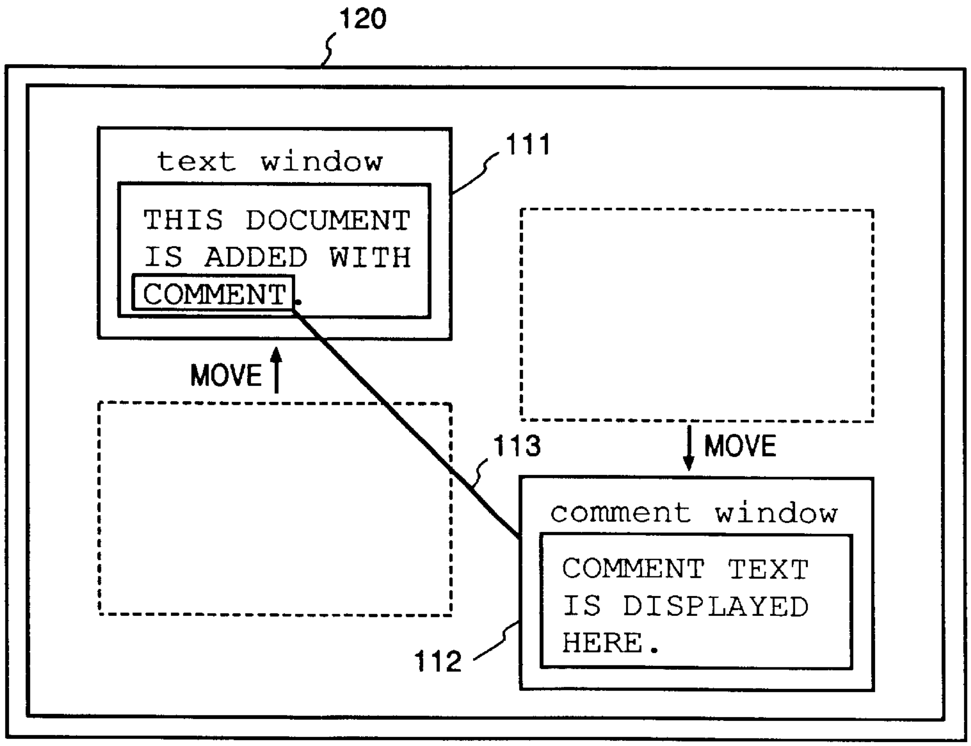
FIG. 103 is a view showing the display tracing state when a text or comment window is moved.

In general, a document processing apparatus for adding a comment to a stored document, and displaying the added comment has been proposed. An example of this apparatus will be described below with reference to FIGS. 102 and 103. FIG. 102 shows the display method of a document and a comment in the general document processing apparatus. FIG. 103 shows the display tracing state when a text or comment window is moved.

In this example, a document and a comment are displayed in different windows (a text window 111 and a comment window 112). A portion added with a comment in the text window 111 is surrounded by a frame, and is connected to the comment window 112 by a solid line 113 in the display state shown in FIG. 102. Thus, a user can recognize the relationship between an original document and a comment.

The comment window 112 begins to be displayed as follows. That is, only the text window 111 is displayed, and when the comment-added portion is clicked by, e.g., a mouse, the comment window 112 is opened, and these two windows are connected by the solid line 113. Of course, when the comment-added portion is displayed the first time, the comment window 112 may be automatically opened.

When the text window 111 or comment window 112 is moved, or when the document displayed on the text window 111 is scrolled, the solid line 113 connecting these two windows is re-drawn while tracing the positions of the two windows, as shown in FIG. 103.

In the above-mentioned example, the comment-added portion in a document display portion is simply connected to a comment display portion by a solid line, and thereafter, the line traces only a change in positional relationship between these portions. For reason, when the comment-added portion in the text window 111 moves outside the range of the text window 111 by, e.g., scrolling the window, the display of the solid line 113 which has connected the text window 111 and the comment window 112 disappears, i.e., a display indicating a connection between the document and the comment disappears, and only the comment display portion remains. For this reason, for example, when a plurality of documents with comments are to be displayed and read, the relationships between the documents and comments cannot be followed.

Every time the comment-added portion appears or disappears in or from the range of the document display portion, the comment display portion may be generated or deleted. However, this method is disadvantageous in terms of processing speed, and document scrolling may be disturbed.

In the 20th embodiment, a comment display method and a document processing apparatus in consideration of the above-mentioned problem will be described below. More specifically, in the comment display method and the document processing apparatus of this embodiment, when the added position of a comment displayed on a comment display portion moves outside a document display portion, this movement is displayed by a correspondence display between the comment display portion and the document display portion, thus allowing a user to easily grasp the correspondence between the comment display portion and the document display portion.

Figure 92:
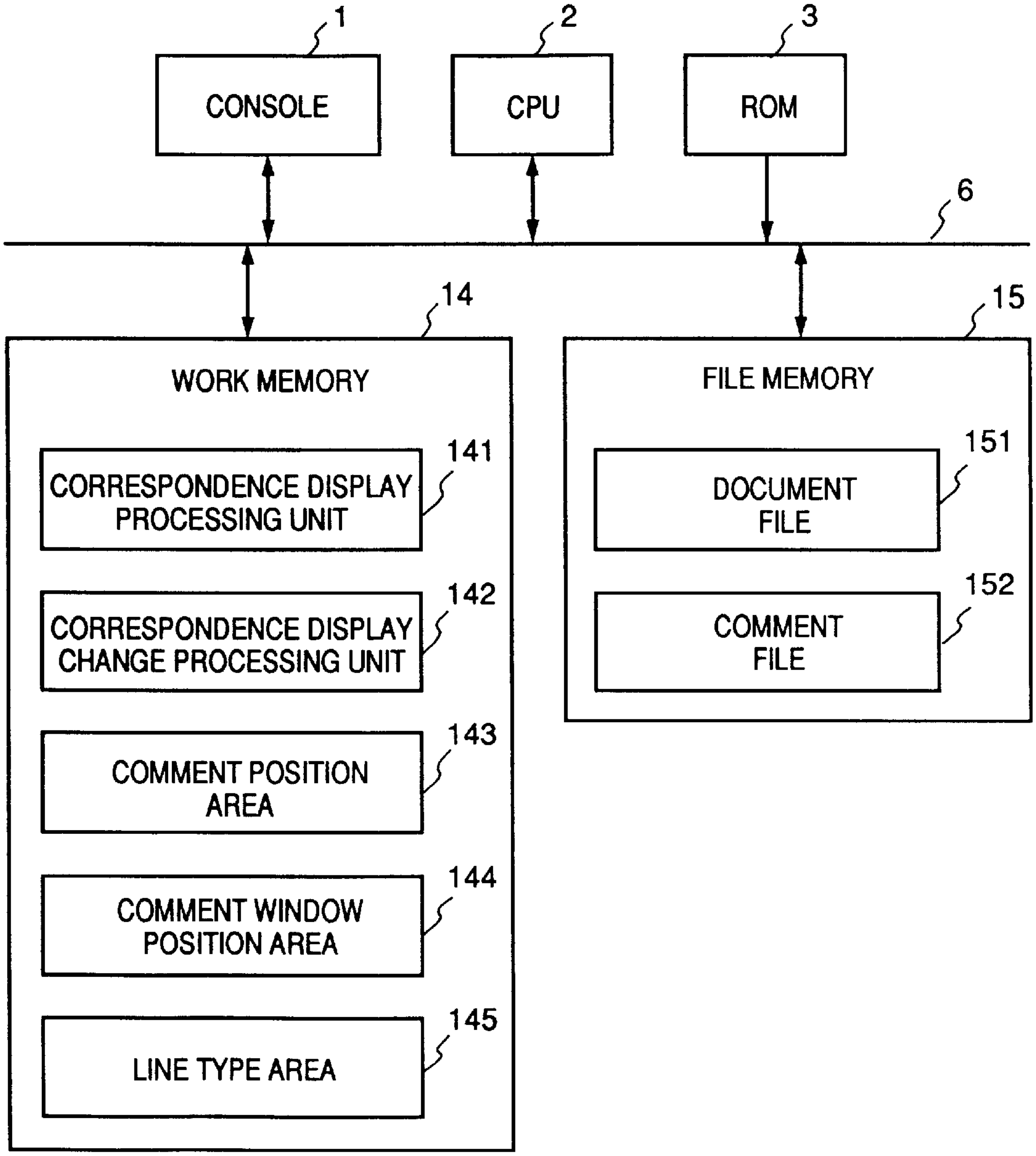
FIG. 92 is a schematic block diagram showing the arrangement of a document processing apparatus of the 20th embodiment.

FIG. 92 is a schematic block diagram showing the arrangement of the document processing apparatus according to the 20th embodiment.

The arrangement of a work memory 14 will be described below. A correspondence display processing unit 141 stores a processing program for executing a correspondence display between a displayed document and a comment. A correspondence display change processing unit 142 stores a program for changing a display method of a comment depending on whether or not the comment-added position is present within the displayed document range. The correspondence display processing unit 141 and the correspondence display change processing unit 142 will be described later. A comment position area 143 stores coordinate data representing the added position of a comment in a displayed document. A comment window position area 144 stores coordinate data representing the position of a displayed comment window. A line type area 145 stores the type data of a line segment representing a correspondence between a text window and the comment window.

A file memory 15 comprises the following arrangement. A document file 151 is an area for storing a document itself. A comment file 152 is an area for storing comments corresponding to the document file 151.

Figure 93:
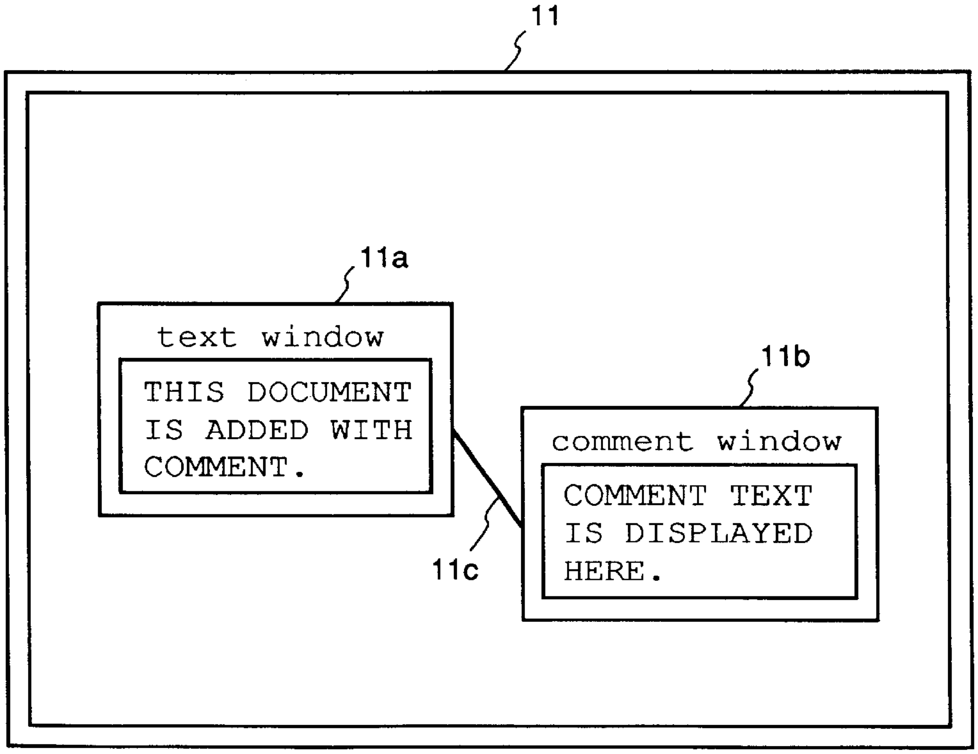
FIG. 93 is a view showing a display state of a document and comments.

The display method of a document and comments in the 20th embodiment will be described below. FIG. 93 shows the display state of a document and comments.

In the 20th embodiment, a document display portion and a comment display portion are displayed on different windows (a text window 11*a* and a comment window 11*b*). In this example, the text window 11*a* and the comment window 11*b* are connected by a solid line 11*c*, which has one point on the right side of the text window 11$a$ as a start point, and the middle point of the left side of the comment window 11$b$ as an end point. As one point on the right side of the text window 11$a$ (the start point of the solid line 11$c$), a position at the same level as that of a position where a line added with a comment is displayed (a position crossing the right side when the line added with a comment is extended to the right) is selected. Of course, a method of selecting the start and end points for connecting the solid line 11$c$ is not limited to this.

Figure 94:
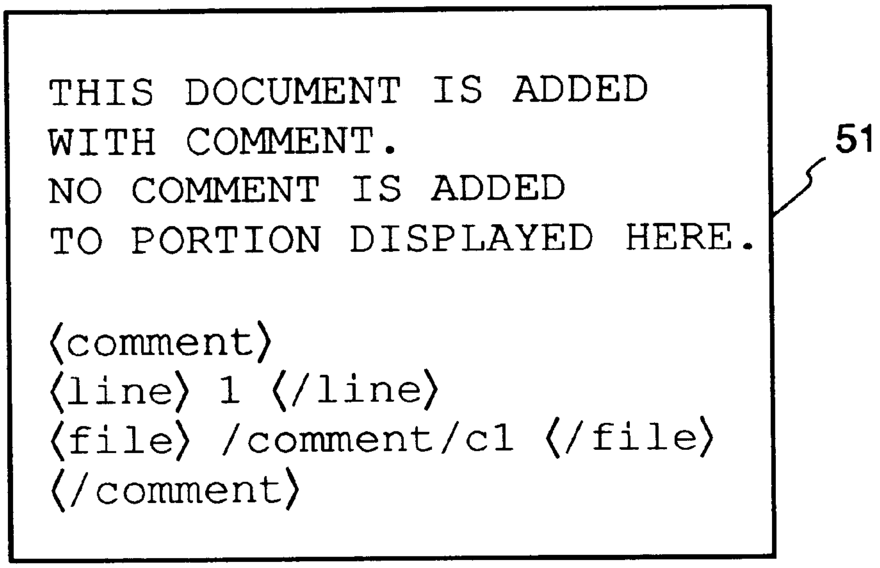
FIG. 94 is a view showing the format of a document file.
Figure 95:
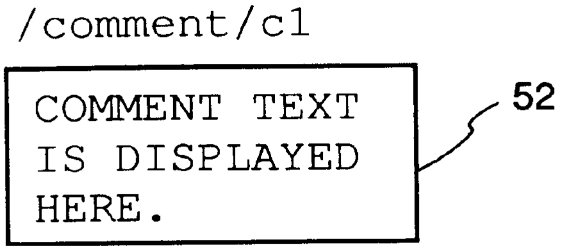
FIG. 95 is a view showing the format of a comment file in the 20th embodiment.

Document data and a method of adding a comment to document data in this embodiment will be described below. FIG. 94 shows the format of a document file. FIG. 95 shows the format of a comment file.

As a method of adding a comment to document data in this embodiment, the following method is adopted. That is, one comment is stored in one file (comment file), and this comment file is caused to correspond to a specific line in a document file.

For example, the document file has the format shown in FIG. 94, and position information indicating the position of a line where a comment is added (in this case, the first line), and a pass name of the corresponding comment file (in this case/comment/c1) are written at the end of the file. Comment information consisting of position information and a pass name is described to be sandwiched between <comment> and </comment>. With this method, a correspondence between a line in the document file, and a comment file can be understood upon checking of the document file. The comment file "/comment/c1" stores a character string representing the contents of one comment, as shown in FIG. 95. Upon execution of display of a document and a comment using these document and comment files, a display screen state shown in FIG. 93 is obtained.

Information of a position, corresponding to the level of a line added with a comment, of the right side of the text window (position information of the start point of the solid line 11$c$), and position information representing the middle point of the left side of the comment window (position information of the end point of the solid line 111$c$) are re-calculated every time the windows are moved or the displayed contents in the text window change, and are respectively stored in the comment position area 143 and the comment window position area 144. Using these data, the solid line 11$c$ is drawn.

Correspondence display processing of the document processing apparatus with the above-mentioned arrangement and functions will be described below with reference to the flow charts in FIGS. 96 and 97. Note that programs describing the processing sequences to be described below are stored in the correspondence display processing unit 141 and the correspondence display change processing unit 142, and are executed by a CPU 2.

Figure 96:
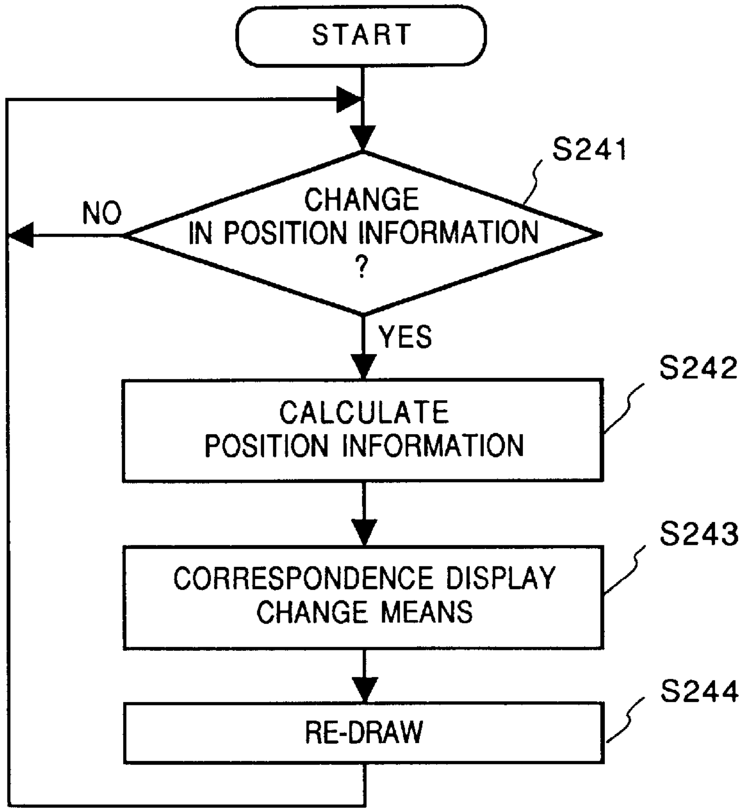
FIG. 96 is a flow chart showing the sequence of correspondence display processing in the 20th embodiment.
Figure 97:
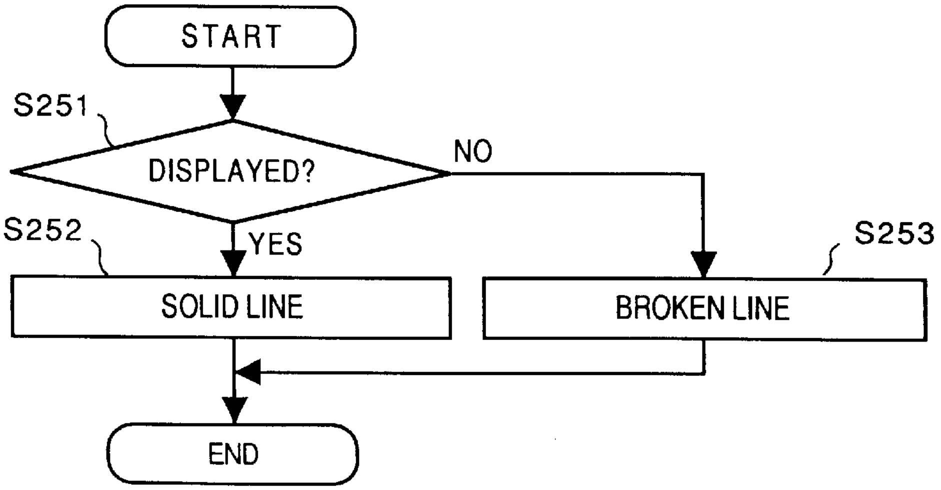
FIG. 97 is a flow chart showing the sequence of correspondence display change processing in the 20th embodiment.

FIG. 96 is a flow chart showing the processing sequence of the correspondence display processing unit 141.

In step S241, the coordinate data of the text and comment windows are checked to discriminate if the positions of these two windows have changed. For example, it is checked if scrolling processing is executed in the text window, and a line added with a comment moves. If the windows and position information of the line added with the comment remains the same, the flow returns to step S241.

If a change in position information is detected in step S241, the flow advances to step S242. In step S242, a comment position (the start coordinate position of the solid line 11$c$) and a comment window position (the end coordinate position of the solid line 11$c$) are calculated to update the contents of the comment position area 143 and the comment window position area 144. Note that the comment position area 143 stores the start coordinate data of the solid line 11$c$, and the comment window position area 144 stores the end coordinate data of the solid line 11$c$. If the comment position falls outside the display range on the text window, specific position information is stored in the comment position area 143. For example, coordinate data for designating the right end portion of a title bar (which is located at the upper portion of the window, and describes a window title) of the text window 11$a$ is stored.

In step S243, the correspondence display processing unit 142 is enabled. At this time, the contents of the line type area 145 are updated. This processing will be described later with reference to the flow chart in FIG. 97. Finally, in step S244, the solid line 11$c$ is re-drawn based on the updated position information, line type data, and the like to perform a correspondence display between the text window 11$a$ and the comment window 11$b$. The flow then returns to step S241 to repeat the above-mentioned processing.

Figure 98:
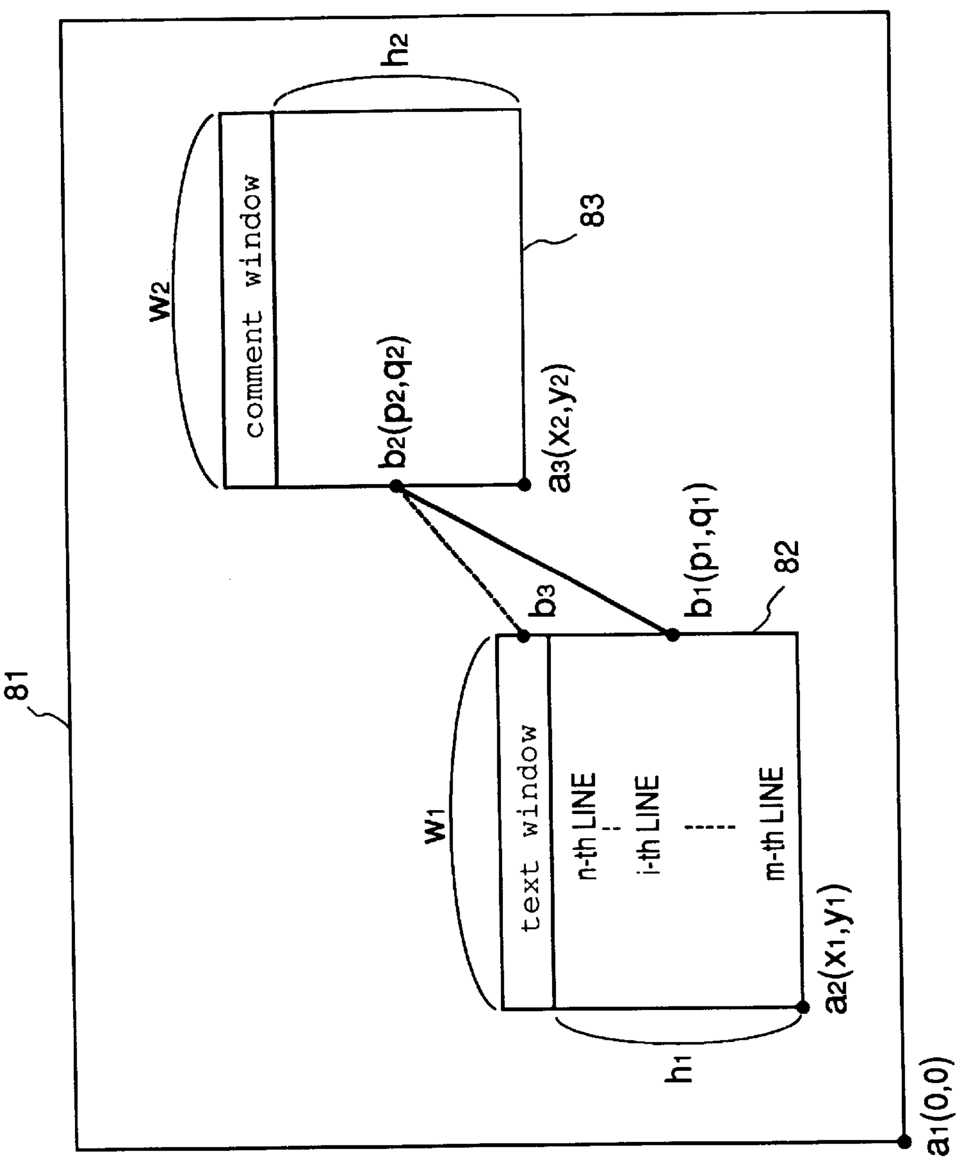
FIG. 98 is an explanatory view of a method of calculating position information for achieving a correspondence display.

The calculation method of the position information in step S242 described above will be described below with reference to FIG. 98. FIG. 98 is a view for explaining the calculation method of position information for performing correspondence display.

Position information for the correspondence display is calculated based on the positional relationship between a root window and the text or comment window, a relative position to a desired portion in the text or comment window, and the like.

For example, a case will be examined below wherein the lower left corner of a root window 81 is set to be an origin $a_1$ (0, 0), and text and comment windows have their lower left corners as their origins. A text window 82 manages information such as the size (height $h_1$, width $w_1$) of the open window, the position of the open window with reference to the origin $a_1$ of the root window 81, the width of one line of a document, the positions of currently displayed lines, and the like. With these information, the currently displayed line position of a comment in the text window 82 can be discriminated, and the comment position in the text window can be calculated based on the lower left corner of the text window as an origin. Since the positional relationship between the text window 82 and the root window 81 is known, the coordinate position of the comment position in the root window 81 can also be calculated.

For example, assume that the coordinate position of the origin of the text window 82 corresponds to ($x_y$, $y_1$) in the root window 81, and the size (height, width) of the text window is ($h_1$, $w_1$). Also, assume that the line interval in the text window is z, and the n-th to m-th lines of a document are displayed on the text window. If a comment is added to the i-th line of the document, when n ≦i≦m, a coordinate position $b_1$ (i.e., the comment position) of the right side of the text window at the same level as that of the line added with the comment is given by:

$$(p_1, q_1)=(x_1+w_1, y_1+h_1-(i-n)x\ z).$$

When n>i and i>m, it can be determined that a document portion at the comment position is not displayed in the text window 82. At this time, as data of the comment position, coordinate data $b_3$ at the level of the title bar of the right side of the text window is used. The coordinate position $b_3$ can be calculated based on a relative positional relationship of the title bar in the window, and a coordinate position $a_2$.

The comment window position can also be easily calculated since the position of the comment window 82 with respect to the root window 81 is known, and the size of a comment window 83 is also known. For example, if the coordinate position of the origin of the comment window 83 is ($x_2$, $y_2$) on the root window 81, and the size (height, weight) of the comment window 83 is ($h_2$, $w_2$), the middle point of the left side of the comment window 83 is expressed by ($x_2$, $y_2+h_2/2$).

In this manner, the comment position and the comment window position are calculated, and are respectively stored in the comment position area 143 and the comment window position area 144.

Then, the correspondence display in step S244 is realized by drawing a line having, as its two ends, two points defined by the two pieces of position information (the comment position area 143 and the comment window position area 144), using a line type designated by the contents of the line type area 145. The correspondence line is re-drawn using a line type at that time every time the contents of the comment position area 143 and the comment window position area 144 change upon movement of the windows or upon scrolling of the text window.

The processing sequence by the correspondence display change processing unit will be described below with reference to the flow chart in FIG. 97.

In step S251, it is checked based on position information stored in the comment position area 143 at that time if a comment-added portion in a document is currently displayed. If YES in step S251, line type data "solid line" is stored in the line type area 145 in step S252, and this routine ends. However, if NO in step S251, line type data "broken line" is stored in the line type area 145 in step S253, and this routine ends.

Figure 99:
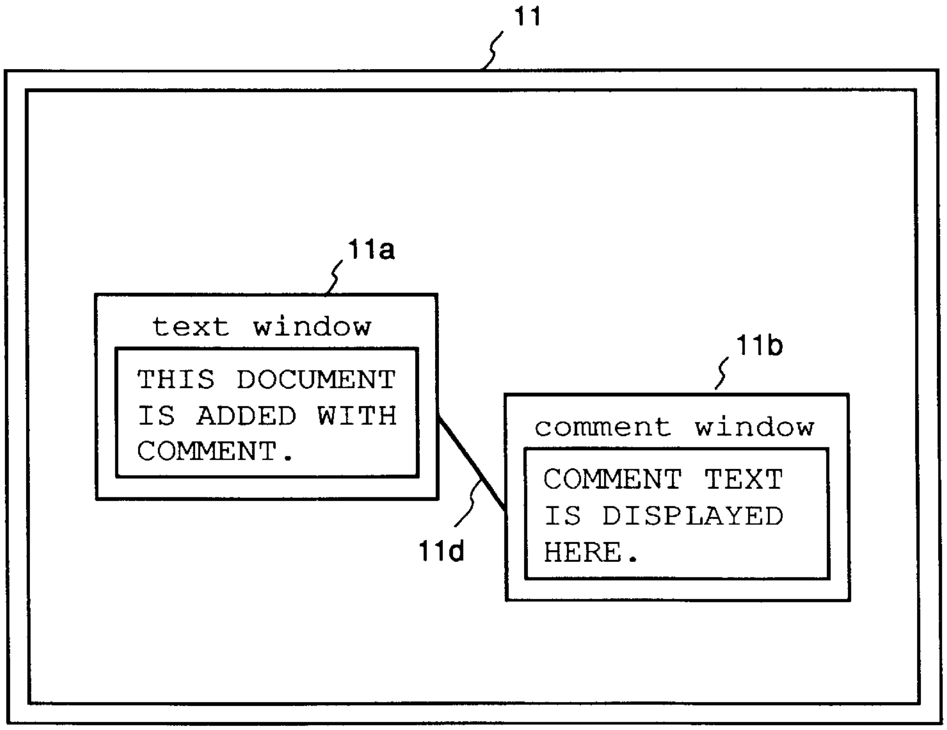
FIG. 99 is a view showing the screen display state obtained when a comment added position is displayed in a text window.
Figure 100:
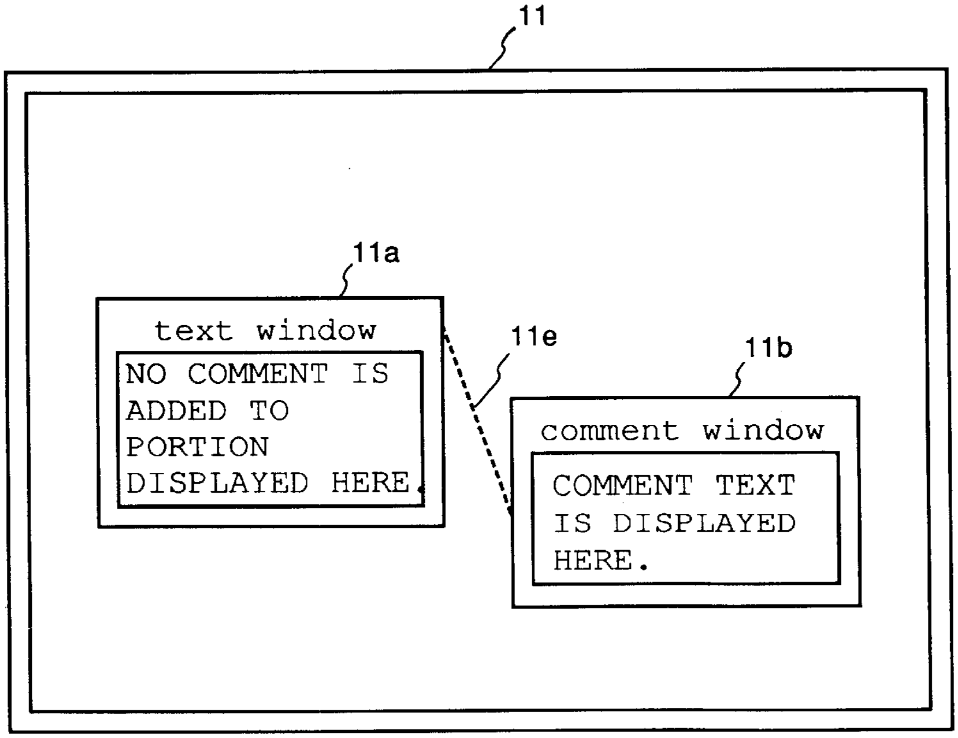
FIG. 100 is a view showing the screen display state obtained when no comment added position is displayed in the text window.

With the above-mentioned arrangement, a display state on the display screen of the CRT 1*a* is as follows. FIG. 99 shows the screen display state obtained when a comment-added position is displayed within the text window. FIG. 100 shows the screen display state obtained when the comment-added position is not displayed within the text window. Note that each of these screen display states displays the document and comment files shown in FIGS. 94 and 95.

Referring to FIG. 99, the comment-added position (a line of "This document . . . ") is displayed within the text window 11*a,* and the text and comment windows 11*a* and 11*b* are correspondence-displayed while being connected by a solid line 11*d.* The comment position as the start point of the solid line 11*d* indicates the line of "This document . . . ", i.e., the comment-added position. On the other hand, when the comment-added position is not displayed within the text window 11*a,* as shown in FIG. 100, the text and comment windows 11*a* and 11*b* are displayed while being connected by a broken line 11*e.* When the comment-added portion is displayed again, the original display state using the solid line is restored.

As described above, according to the document processing apparatus of the 20th embodiment, a document and comment are displayed in the windows, and the comment-added position in the document and the comment are displayed in correspondence with each other using a solid line. When the comment-added position falls outside the range of the text window, since the comment is displayed in correspondence with the title bar of the text window using a broken line, a user can immediately know that the comment-added position falls outside the window, and can also recognize the correspondence between the document and comment. Therefore, even when a plurality of documents having comments are displayed simultaneously, a user can recognize the correspondences between the documents and comments.

<21st Embodiment>

In step S253 (FIG. 97) by the processing of the correspondence display change processing unit 142 of the 20th embodiment, when a comment-added position falls outside the text window, a line of a different type (broken line) is used. However, the present invention is not limited to this. For example, in place of using another line type, a transparent line may be used so as to achieve a display state wherein the windows are connected by a line only when a comment-added portion is displayed in the text window, and no line is displayed between the comment and text windows when the comment-added portion is not displayed. Therefore, if means which can select whether the contents of the line type area 145 are set to be a broken line or a transparent line is arranged, a correspondence display with a comment file added to a position falling outside the text window can be realized by a broken line only when a user requires, resulting in a good appearance of the display screen, and convenience for a user.

<22nd Embodiment>

In step S251 (FIG. 97) by the processing of the correspondence display change processing unit 142 of the 20th embodiment, the correspondence display state is changed by discriminating whether or not the comment-added position is displayed. However, the present invention is not limited to this. For example, the distance between a portion currently displayed on the text window and the comment position is calculated, and a plurality of alternatives based on the calculation result are provided. In these alternatives, different line type data are stored in the line type area 145. Other arrangements are the same as those in the 20th embodiment. Thus, lines of different line types can be displayed depending on the comment-added position, and a user can roughly know the comment-added position falling outside the text window. An example of the processing sequence by the correspondence display change processing unit according to the 22nd embodiment will be described below with reference to FIG. 101.

Figure 101:
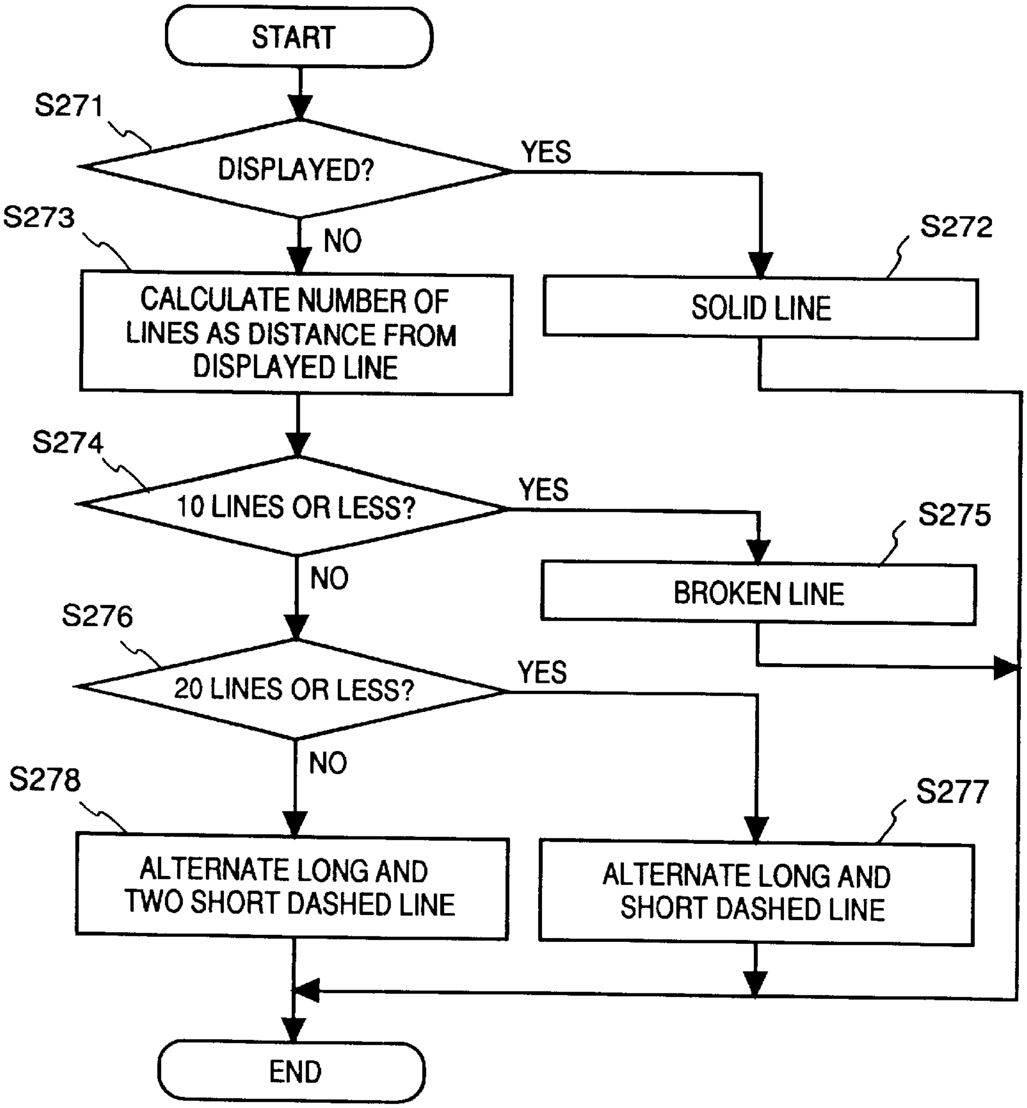
FIG. 101 is a flow chart showing the sequence of correspondence display change processing in the 22nd embodiment.

FIG. 101 is a flow chart showing the processing sequence of the correspondence display change processing unit 142 of the 22nd embodiment. The correspondence display change processing unit 142 is enabled in step S243 (FIG. 96) of the correspondence display processing unit 141 as in the 20th embodiment.

In step S271, it is checked if a comment-added position (line) is displayed within the text window. If YES in step S271, the flow advances to step S272, and line type data "solid line" is stored in the line type area 145. However, if NO in step S271, the flow advances to step S273 to calculate the number of lines between the comment-added position, and the start or end line of the currently displayed portion. In this case, a smaller one of the number of lines calculated based on the start line and that calculated based on the end line is used.

In step S274, it is checked if the number of lines calculated in step S273 is equal to or smaller than 10. If YES in step S274, the flow advances to step S275, and line type data "broken line" is stored in the line type area 145. However, if NO in step S274, the flow advances to step S276 to check if the calculated number of lines is equal to or smaller than 20. If YES in step S276, the flow advances to step S277 to store line type data "alternate long and short dashed line" in the line type area 145. However, if NO in step S276, the flow advances to step S278 to store line type data "alternate long and two short dashed line" in the line type area 145.

As described above, according to the 22nd embodiment, when the comment-added position is located at a position separated by 10 lines or less from the display range of the text window, the correspondence display is made using a broken line. When the comment-added position is located at a position separated by 11 to 20 lines or less, the correspondence display is made using an alternate long and short dashed line. When the comment-added position is located at a position separated by 21 lines or more, the correspondence display is made using an alternate long and two short dashed line. Therefore, a user can roughly know the comment added-position by checking the line type.

In the 22nd embodiment, the comment-added position is distinguished by line types. However, the present invention is not limited to this. For example, a plurality of specific coordinate data which are to be stored in the comment position area 143 when the comment-added position falls outside the display range may be prepared, and coordinate data as a comment position may be selected in correspondence with the comment-added position.

Furthermore, different display states may be used depending on whether the comment-added position falling outside the display range of the document is located before or after the display range.

The line types in the above embodiments may be changed by changing the line colors if a color display device is used.

As described above, according to the 20th to 22nd embodiments, when the added position of a comment displayed on a comment display portion moves outside the range of a document display portion, this movement can be displayed by a correspondence display between the comment display portion and the document display portion, and a user can easily recognize the correspondence between the comment display portion and the document display portion.

Note that the contents described in each of the above embodiments may be solely practiced, or may be properly combined like a combination of the ninth and 18th embodiments.

Note that a "character string" of the present invention includes not only characters but also various symbols, ruled line information, underline information, and the like used in a document processing apparatus, and the like.

Furthermore, the present invention can be applied to a system comprising either a plurality of units or a single unit. Needless to say, the present invention can be applied to the case which can be attained by supplying programs which execute the process defined by the present system or invention.

As many apparently widely different embodiments of the present invention can be made without departing from the spirit and scope thereof, it is to be understood that the invention is not limited to the specific embodiments thereof except as defined in the claims.

What is claimed is:

1. A document processing apparatus comprising:

first document memory means for storing an old document to be updated;

first comment data memory means for storing comment data to be added to the old document, in correspondence with an old addition range of a character string to which the comment data is added in the old document;

extraction means for extracting a character string within the old addition range from the old document as a search key character string;

second document memory means for storing a new document obtained by updating the old document;

search means for searching the new document for the same character string as the search key character string extracted from the old document by said extraction means;

determination mans for determining a range of the same character string detected by said search means in the new document as a new addition range of the comment data in the new document; and second comment data memory means for storing the comment data in correspondence with the new addition range determined by said determination means.

2. The apparatus according to claim 1, further comprising:

selection means for, when a plurality of equivalent portions are detected by said search means, selecting the equivalent portion at a position closest to the addition position indicated by the old position information, and wherein said second memory means stores the plurality of the equivalent portions detected by said search means or the equivalent portion selected by said selection means as the new position information representing the addition position of the comment data in the new document, in correspondence with the comment data.

3. The apparatus according to claim 1, wherein each of the old position information and the new position information designates start and end positions of the addition position of the comment data by the numbers of characters from the beginning of a corresponding one of the new and old documents.

4. The apparatus according to claim 1, wherein each of the old position information and the new position information designates the addition position by the number of lines from the beginning of a corresponding one of the old and new documents.

5. A document processing apparatus comprising:

first document memory means for storing an old document to be updated and constituted by a plurality of document elements based on a predetermined logical structure;

first comment data memory means for storing comment data to be added to the old document, in correspondence with an old addition range of a character string to which the comment data is added in the old document;

extraction means for extracting a character string within the old addition range from the old document as a search key character string, and extracting element information for specifying a document element including the old addition range as search key information;

second document memory means for storing a new document obtained by updating the old document;

first search means for searching the new document for a document element specified by the search key information;

second search means for searching the document element detected by said first search means for the same character string as the search key character string extracted from the old document by said extraction means;

determination means for determining a range of the same character string detected by said second search means in the new document as a new addition range of the comment data in the new document; and second comment data memory means for storing the comment data in correspondence with the new addition range determined by said determination means.

6. The apparatus according to claim 5, wherein the predetermined logic structure has a header area for storing a character string representing contents of a document stored in the document element, in a start portion of each document element, said extraction means extracts, as the search information, the information associated with the addition position in the old document, and the character string stored in the header area of the document element including the addition position, and said first search means searches the new document for a document element including a header area having the same character string as the extracted character string.

7. The apparatus according to claim 6, wherein the predetermined logic structure includes a section having one or a plurality of paragraphs as the document element, and the section has a header area for storing a title thereof.

8. A document processing apparatus comprising:

first document memory means for storing an old document to be updated;

first comment data memory means for storing comment data to be added to the old document, in correspondence with an old addition range of a character string to which the comment data is added in the old document;

extraction means for extracting a character string having a predetermined number of characters from the old addition range of the old document as a search key character string;

second document memory means for storing a new document obtained by updating the old document;

search means for searching the new document for the same character string as the search key character string extracted by said extraction means;

determination means for determining a range including the same character string detected by said search means in the new document as a new addition range of the comment data in the new document; and second comment data memory means for storing the comment data in correspondence with the new addition range determined by said determination means.

9. The apparatus according to claim 8, wherein the addition range is expressed in units of lines divided by new line codes, and said second memory means determines a line including the equivalent portion detected by said search means as the addition range of the comment data in the new document, and stores the determined addition range as the new position information in correspondence with the comment data.

10. The apparatus according to claim 8, wherein said extraction means extracts the character string including the predetermined number of characters from the beginning of a range designated as the addition range of the old document on the basis of the old position information.

11. The apparatus according to claim 8, wherein said extraction means extracts the character string including the predetermined number of characters from the end of a range designated as the additional range of the old document on the basis of the old position information.

12. The apparatus according to claim 8, wherein said extraction means extracts the character string including the predetermined number of characters from each of the beginning and the end of a range designated as the addition range of the old document on the basis of the old position information.

13. The apparatus according to claim 8, further comprising:

setting means for setting the number of characters of the character string to be extracted by said extraction means to be a desired value.

14. The apparatus according to claim 13, further comprising:

change means for changing the number of characters of the character string to be extracted by said extraction means on the basis of a result of a search by said search means.

15. A document processing apparatus comprising:

first document memory means for storing an old document to be updated and constituted by a plurality of document elements on a basis of a predetermined logic structure;

first comment data memory means for storing comment data to be added to the old document, in correspondence with an old addition range of a character string to which the comment data is added in the old document;

extracting means for extracting a character string including a predetermined number of characters in the old addition range of the old document as a search key character string, and extracting information for specifying a document including the old additional range as search key information;

second document memory means for storing a new document obtained by updating the old document;

first search means for searching the new document for a document element specified by the search key information;

second search means for searching the document element of the new document detected by said first search means for the same character string as the search key character string;

determination means for determining a range including the same character string detected by said second search means in the new document as a new addition range of the comment data in the new document; and second comment data memory means for storing the comment data in correspondence with the new additional range determined by said determination means.

16. The apparatus according to claim 15, wherein each of the document elements has one or a plurality of paragraphs in the predetermined logic structure, the addition range is expressed in units of paragraphs, and said second comment data memory means determines a paragraph including the equivalent portion detected by said second search means as the addition range of the comment data in the new document, and stores the determined addition range as the new position information in correspondence with the comment data.

17. The apparatus according to claim 15, further comprising:

setting means for setting the number of characters of the character string to be extracted by said extraction means to be a desired value.

18. The apparatus according to claim 15, further comprising:

change means for changing the number of characters of the character string to be extracted by said extraction means on the basis of a result of a search by said search means.

19. A document processing apparatus comprising:

first document memory means for strong an old document data to be updated;

first comment data memory means for storing comment data to be added to the old document, in correspondence with an old additional range of a character string to which the comment data is added in the old document;

extracting means for extracting words included in the old addition range in the old document;

second document memory means for storing a new document obtained by updating the old document;

search means for searching the new document for the same words as the words extracted by said extraction means;

determination means for determining a range in which an amount of the words detected by said search means beyond a predetermined amount, in the new document, as a new addition range of the comment data in the new document; and second comment data memory means for storing the comment data in correspondence with the new addition range determined by said determination means.

20. The apparatus according to claim 19, wherein the addition range is expressed in units of lines divided by new line codes, said search means searches the new document obtained by modifying the old document for, as the equivalent range, a line in which the words extracted by said extraction means occur at a predetermined rate.

21. The apparatus according to claim 19, further comprising:

setting means for setting a value of the predetermined rate used in said search means to be a desired value.

22. The apparatus according to claim 19, further comprising:

change means for changing a value of the predetermined rate used in said search means on the basis of a search state of the equivalent range by said search means.

23. A document processing apparatus comprising:

first document memory means for storing an old document data to be updated;

first comment data memory means for storing comment data to be added to the old document, in correspondence with an old addition range of a character string to which the comment data is added in the old document;

extraction means for extracting a character string within the old addition range in the old document as a search key character string;

second document memory means for storing a new document obtained by updating the old document;

search means for searching the new document for the same character string as the search key character string extracted by said extraction means;

determining means for determining a range of the same character string detected by said search means in the new document as a new addition range of the comment data in the new document;

second comment data memory means for storing the comment data in correspondence with the new addition range determined by said determining means; and third comment data memory means for, when said search means does not detect the character string, storing the comment data in a different format from the comment data stored in said second comment data memory means.

24. The apparatus according to claim 23, wherein said third comment data memory means creates a file for storing the comment data for which an equivalent portion is not detected by said search means, and stores the comment data, for which an equivalent portion is not detected, in the created file.

25. The apparatus according to claim 24, wherein said third comment data means stores the comment data and the old position information in the special-purpose file when said search means does not detect an equivalent portion.

26. A document processing apparatus comprising:

first document memory means for storing an old document to be updated;

first comment data memory means for storing comment data to be added to the old document, in correspondence with an old additional range of a character string to which the comment data is added in the old document;

extraction means for extracting a character string within the old addition range in the old document as a search key character string;

second document memory means for storing a new document by updating the old document;

search means for searching the new document for the same character string as the search key character string;

determination means for determining a range of the corresponding character string detected by said search means in the new document as a new addition range of the comment data in the new document; and second comment data memory means for, when said search means detects the character string, storing the comment data in correspondence with the new addition range determined by said determination means; and third comment data memory means for extracting comment data which is not stored in said second comment data memory means from the comment data stored in said first comment data memory means, and storing the extracted comment data.

27. The apparatus according to claim 26, wherein said third comment data memory means creates a specific file for storing comment data for which said search means does not detect an equivalent portion, extracts additional data which is not stored in said second comment data memory means from the comment data stored in said first comment data memory means, and stores the extracted comment data in the specific file.

28. The apparatus according to claim 27, wherein said third comment data memory means extracts comment data which is not stored in said second comment data memory means from the comment data stored in said first comment data memory means, and old position information corresponding to the extracted comment data, and stores the comment data and old position data in the specific file.

29. A document processing apparatus comprising:

first document memory means for storing an old document to be updated;

first comment data memory means for storing comment data to be added to the old document, in correspondence with an old addition range of a character string to which the comment data is added in the old document;

extraction means for extracting a character string within the old addition range from the old document as a search key character string on a basis of the old range information;

second document memory means for storing a new document obtained by updating the old document;

search means for searching the new document for the same character string as the search key character string;

determination means for determining a range of the same character string detected by said search means in the new document as a new addition range in the new document;

second comment data memory means for, when said search means detects the character string, storing, in a data file, the comment data in correspondence with the new addition range determined by said determination means; and third comment data memory means for, when said search means does not detect the character string, storing the comment data in the data file to be identifiable from the comment data stored in said second comment data memory means.

30. The apparatus according to claim 29, wherein said third comment data memory means stores the comment data and the corresponding old position data in the data file to be identifiable from the comment data stored in said second comment data memory means when said search means does not detect an equivalent portion.

31. The apparatus according to claim 29, further comprising:

storage means for, when said search means does not detect an equivalent portion, temporarily storing the comment data, and wherein said third comment data memory means collectively stores the comment data stored in said storage means in a predetermined area of the data file.

32. The apparatus according to claim 29, wherein said third comment data memory means stores the comment data in the data file together with predetermined identification information when said search means does not detect an equivalent portion.

33. The apparatus according to claim 29, wherein said third comment data memory means determines data, which cannot exist as an addition position, as the new position information, and stores the comment data in the data file together with the new addition information when said search mens does not detect an equivalent portion.

34. A document processing apparatus comprising:

first document memory means for storing an old document to be updated;

first comment data memory means for storing comment data to be added to the old document, in correspondence with an old addition range of a character string to which the comment data is added in the old document;

extraction means for extracting a character string within the old addition range from the old document as a search key character string;

second document memory means for storing a new document obtained by updating the old document;

search means for searching the new document for the same character string as the search key character string extracted by said extraction means;

determination means for determining a range of the same character string detected by said search means in the new document as a new addition range of the comment data in the new document; and second comment data memory means for, when said search means detects the character string, storing the comment data in correspondence with the new addition range determined by said determination means; and third comment data memory means for, when said search means does not detect the character string, storing the comment data; and display means for identifiably displaying the comment data stored in said second comment data memory means and the comment data stored in said third comment data memory means upon display of the new document.

35. The apparatus according to claim 34, wherein, upon display of the new document, said display means always displays the comment data stored in said third comment data memory means at a predetermined position of a display screen, and displays the comment data stored in said second comment data memory means by connecting a line between the comment data and the addition position of the comment data in the new document.

36. The apparatus according to claim 34, wherein said third comment data memory means stores the comment data and the corresponding old position data when said search means does not detect an equivalent portion, said display means displays the addition position of the comment data in a display region of the new document on the basis of the position information stored in said second and third comment data memory means, and displays a correspondence with the corresponding addition position upon display of the comment data, and the display of the addition position by said display means allows identification as to whether the displayed addition position is stored in the second or third comment data memory means.

37. The apparatus according to claim 34, wherein said display means displays the addition position in a display region of the new document on the basis of the position information stored in said second and third comment data memory means, and displays the comment data corresponding to the displayed addition position to allow identification as to whether the comment data is one stored in said second or third comment data memory means.

38. The apparatus according to claim 34, wherein the display of the comment data by said display means distinguishes the comment data stored in said second comment data memory means from that stored in said third comment data memory means by a line type of a line segment connecting the addition position and the comment data.

39. The apparatus according to claim 34, wherein the display of the comment data by said display means distinguishes the comment data stored in said second comment data memory means from that stored in said third comment data memory means by a normal display or a reversal display.

40. A document processing apparatus comprising:

first document memory means for storing an old document to be updated;

first comment data memory means for storing comment data to be added to the old document, in correspondence with an old addition range of a character string to which the comment data is added in the old document;

extraction means for extracting a character string within the old addition range from the old document as a search key character string;

second document memory means for storing a new document obtained by updating the old document;

search means for searching the new document for the same character string as the search key character string;

determination means for determining a range of the same character string determined by said search means in the new document as a new addition range of the comment data in the new document; and second comment data memory means for storing the comment data in correspondence with the new addition range determined by said determination means; and third comment data memory means for, when said search means does not detect the character string, storing range information indicating a range near the addition range represented by the old addition range information as new range information representing the addition range of the comment data in the new document in correspondence with the comment data.

41. The apparatus according to claim 40, wherein the old position information represents and addition range to which the comment data is to be added, and the new position information in said third comment data memory means is determined to represent a range for one start character of the addition range represented by the old position information.

42. A document processing apparatus comprising:

first document memory means for storing an old document to be updated constituted by a plurality of document elements;

first comment data memory means for storing comment data to be added to the old document, in correspondence with a document element to which the comment data is added;

second document memory means for storing a new document obtained by updating the old document;

search means for searching the new document for a document element equivalent to the document element specified by old range information;

determination means for determining range information specifying the document element detected by said search means in the new document as new range information;

second comment data memory means for storing the comment data in correspondence with the new range information determined by said determination means; and third comment data memory means for, when said search means does not detect an equivalent document element, selecting a document element near a range corresponding to the document element specified by the old range information the new document, and storing new range information specifying the selected document element in correspondence with the comment data.

43. The apparatus according to claim 42, wherein each of the old and new documents has a hierarchical structure, and when said search means does not detect an equivalent document element, said third comment data memory means selects a higher-level document element including a document element near a position corresponding to the document element represented by the old position information in the new document, and stores new position information representing the selected document element in correspondence with the comment data.

44. A document processing apparatus comprising:

first document memory means for storing an old document to be updated constituted by a plurality of document elements;

first comment data memory means for storing comment data to be added to the old document, in correspondence with an old addition range of a character string to which the comment data is added in the old document;

extraction means for extracting a character string within the old addition range from the old document as a search key character string on a basis of the old addition range information;

second document memory means for storing a new document obtained by updating the old document;

search means for searching the new document for the same character string as the search key character string extracted by said extraction means;

determination means for determining a range of the same character string detected by said search means in the new document as a new addition range of the comment data in the new document; and second comment data memory means for storing the comment data in correspondence with the new addition range determined by said determination means; and third comment data memory means for, when said search means does not detect the character string, selecting a document element including the range, represented by the old addition range information, in the new document, and storing information representing the selected document element as the new range information in correspondence with the comment data.

45. The apparatus according to claim 44, wherein each of the old and new documents has a hierarchical structure of document elements, and when said search means does not detect an equivalent document element, said third comment data memory means selects a document element in a lowermost layer including the entire position, represented by the old position information in the new information, in the new position, and stores information representing the selected document element as the new position information in correspondence with the comment data.

46. A document processing apparatus comprising:

first document memory means for storing an old document to be updated;

first comment data memory means for storing comment data to be added to the old document in correspondence with an old addition range of a character string to which the comment data is added in the old document;

extraction means for extracting a character string within the old addition range in the old document as a search key character string on a basis of the old range information;

second document memory means for storing a new document obtained by updating the old document;

search means for searching the new document for the same character string as the search key character string;

determination means for determining a range of the same character detected by said search means in the new document as a new addition range of the comment data in the new document; and second comment data memory means for storing the comment data in correspondence with the new addition range determined by said determining means; and storage means for, when said search means does not detect an equivalent character string, storing the comment data in a predetermined area of the new document.

47. The apparatus according to claim 46, further comprising:

temporary memory means for, when said search means does not detect an equivalent portion, temporarily storing the comment data, and wherein said storage means collectively stores comment data, for which an equivalent portion is not searched for in the new document, in the predetermined area of the new document.

48. The apparatus according to claim 46, wherein said storage means stores the comment data in the new document together with predetermined identification information when said search means does not detect an equivalent portion.

49. The apparatus according to claim 1, further comprising:

first display means for displaying a certain range of the document data of the old document or the new document and document data to be added thereto;

discrimination means for discriminating whether or not the addition range of the displayed comment data is present within a range of the document data currently displayed by said first display means;

second display means for, when said discrimination means discriminates that the addition range is present within the currently displayed range of the document data, displaying a first graphic symbol representing a correspondence between the displayed comment data and the addition range; and third display means for, when said discrimination means discriminates that the addition range is not present within the currently displayed range of the document data, displaying a second graphic symbol identifiably representing that the addition range falls outside the currently displayed range, and a correspondence between the document data and the displayed comment data.

50. The apparatus according to claim 49, wherein said second display means displays the correspondence between the comment data and the addition position using a line segment indicating a line where the addition position is present in the displayed range of the document data and a display of the comment data, and said third display means displays the correspondence between the document data and the comment data by connecting a predetermined position of a display region of the document data and a display region of the comment data using a line segment.

51. The apparatus according to claim 49, further comprising:

change means for changing line types of the line segments used by said second and third display means depending on whether the line segment is used by said second or third display means.

52. The apparatus according to claim 49, further comprising:

calculation means for, when said discrimination means discriminates that the addition position is not present within the currently displayed range of the document data, calculating an amount on the basis of a distance between the currently displayed range and the addition position, and wherein said third display means changes the correspondence display between the currently displayed document data and the comment data on the basis of the amount calculated by said calculation means.

53. A document processing method comprising:

a first document memory step of storing an old document to be updated;

a first comment data memory step of storing comment data to be added to the old document, in correspondence with an old addition range of a character string to which the comment data is added in the old document;

an extraction step of extracting a character string within the old addition range from the old document as a search key character string;

a second document memory step of storing a new document obtained by updating the old document;

a search step of searching the new document for the same character string as the search key character string extracted from the old document by said extraction step;

a determination step of determining a range of the same character string detected by said search step in the new document as a new addition range of the comment data in the new document; and second comment data memory step of storing the comment data in correspondence with the new addition range determined by said determination step.

54. A document processing method comprising:

a first document memory step of storing an old document to be updated which is constituted by a plurality of document elements based on a predetermined logic structure;

a first comment data memory step of storing comment data to be added to the old document, in correspondence with an old addition range of the a character string to which comment data is added in the old document;

an extraction step of extracting a character string within the old addition range in the old document as a search key character string, and extracting information for specifying a document element including the old addition range as search key information;

a second document memory step of storing a new document obtained by updating the old document;

a first search step of searching the new document for a document element specified by the search key information;

a second search step of searching the document element detected in the first search step for the same character string as the search key character string extracted from the old document by said extraction step;

a determination step of determining a range of the same character string detected by said second search step in the new document as a new addition range of the comment data in the new document; and a second comment data memory step of storing the comment data in correspondence with new range information representing the new addition range.

55. A document processing method comprising:

a first document memory step of storing an old document to be updated;

a first comment data memory step of storing comment data to be added to the old document, in correspondence with an old addition range of a character string to which the comment data is added in the old document;

an extraction step of extracting a character string having a predetermined number of characters within the old addition range of the old document as a search key character string;

a second document memory step of storing a new document obtained by updating the old document;

a search step of searching the new document for the same character string as the search key character string extracted by said extraction step;

a determination step of determining a range of the same character string detected by said search step in the new document as a new addition range of the comment data in the new document; and a second comment data memory step of storing the comment data in correspondence with the new addition range determined by said determination step.

56. A document processing method comprising:

a first document memory step of storing an old document to be updated which is constituted by a plurality of document elements on a basis of a predetermined logic structure;

a first comment data memory step of storing comment data to be added to the old document, in correspondence with an old addition range of a character string to which the comment data is added in the old document;

an extraction step of extracting a character string including a predetermined number of characters in the old addition range of the old document as a search key character string, and extracting information for specifying a document element including the old addition range as search key information;

a second document memory step of storing a new document obtained by updating the old document;

a first search step of searching the new document for a document element specified by the search key information;

a second search step of searching the document element of the new document detected in the first search step for the same character string as the search key character string;

a determination step of determining a range of the same character string detected by said second search step in the new document as a new addition range of the comment data in the new document; and a second comment data memory step of storing the comment data in correspondence with new range information representing the new addition range determined by said determination step.

57. A document processing method comprising:

a first document memory step of storing an old document data to be updated;

a first comment data memory step of storing comment data to be added to the old document, in correspondence with an old addition range of a character string to which the comment data is added in the old document;

an extraction step of extracting words included in a character string in the old addition range in the old document;

a second document memory step of storing a new document obtained by updating the old document;

a search step of searching the new document for the same words as the words extracted in the extraction step;

a determination step of determining a range in which an amount of the words detected by said search step beyond a predetermine amount, in the new document, as a new addition range of the comment data in the new document; and a second comment data memory step of storing the comment data in correspondence with new range information representing the new addition range determined by said determination step.

58. A document processing method comprising:

a first document memory step of storing an old document to be updated;

a first comment data memory step of storing comment data to be added to the old document, in correspondence with an old addition range of a character string to which the comment data is added in the old document;

an extraction step of extracting a character string within the old addition range in the old document as a search key character string on a basis of the old range information;

a second document memory step of storing a new document obtained by updating the old document;

a search step of searching the new document for the same character string as the search key character string extracted by said extraction step;

a determination step of determining a range of the same character string detected by said search step in the new document as a new addition range of the comment data in the new document;

a second comment data memory step of storing the comment data in correspondence with the new addition range determined by said determination step, in correspondence with the comment data in the new document; and a third comment data memory step of storing the comment data in a different format from the comment data stored in the second comment data memory step when the character string is not detected in the search step.

59. A document processing method comprising:

a first document memory step of storing an old document to be updated;

a first comment data memory step of storing comment data to be added to the old document, in correspondence with an old addition range of a character string to which the comment data is added in the old document;

an extraction step of extracting a character string within the old addition range in the old document as a search key character string;

a second document memory step of storing a new document obtained by updating the old document;

a search step of searching the new document for the same character string as the search key character string;

a determination step of determining a range of the same character string detected by said search step in the new document as a new addition range of the comment data in the new document; and a second comment data memory step of storing the comment data in correspondence with the new addition range determined by said determination step, when the equivalent character string is detected in the search step; and a third memory step of extracting comment data which is not stored in the first comment data memory step, and storing the extracted comment data.

60. A document processing method comprising:

a first document memory step of storing an old document to be updated;

a first comment data memory step of storing commend data to be added to the old document, in correspondence with an old addition range of a character string to which the comment data is added in the old document;

an extraction step of extracting a character string within the old addition range in the old document as a search key character string;

a second document memory step of storing a new document obtained by updating the old document;

a search step of searching the new document for the same character string as the search key character string;

a determination step of determining a range of the same character string detected by said search step in the new document as a new addition range of the comment data in the new document;

a second comment data memory step of storing, in a data file the comment data in correspondence with the new addition position determined by said determination step, when the character string is detected in the search step; and a third comment data memory step of storing the comment data in the data file to be identifiable from the comment data stored in the second comment data memory step when the character string is not detected in the search step.

61. A document processing method comprising:

a first document memory step of storing an old document to be updated;

a first comment data memory step of storing comment data to be added to the old document, in correspondence with an old addition range of a character string to which the comment data is added in the old document;

an extraction step of extracting a character string within the old addition range in the old document as a search key character string on a basis of the old range information;

a second document memory step of storing a new document by updating the old document;

a search step of searching the new document for the same character string as the search key character string extracted by said extraction step;

a determination step of determining a range of the same character string detected by said search step in the new document as a new addition range of the comment data in the new document; and a second comment data memory step of storing the comment data in correspondence with the new addition range determined by said determination step when the character string is detected in the search step;

a third comment data memory step of storing the comment data when the character string is not detected in the search step; and a display step of identifiably displaying the comment data stored in the second comment data memory step and the comment data stored in the third comment data memory step upon display of the new document.

62. A document processing method comprising:

a first document memory step of storing an old document to be updated;

a first comment data memory step of storing comment data to be added to the old document, in correspondence with an old addition range of a character string to which the comment data is added in the old document;

an extraction step of extracting a character string within the old addition range from the old document as a search key character string on a basis of the first range information;

a second document memory step of storing a new document obtained by updating the old document;

a search step of searching the new document for the same character string as the search key character string;

a determination step of determining a range of the same character string detected by said search step in the new document as a new addition range of the comment data in the new document; and a second comment data memory step of storing the comment data in correspondence with the new addition range determined by said determination step; and a third comment data memory step of storing range information indicating a range near the addition range represented by the old range information as new range information representing the addition range of the comment data in the new document in correspondence with the comment data, when the character string is not detected in the search step.

63. A document processing method comprising:

a first document memory step of storing an old document to be updated, which is constituted by a plurality of document elements;

a first comment data memory step of storing comment data to be added to the old document constituted by a plurality of document elements, in correspondence with a document element to which the comment data is added;

a second document memory step of storing a new document obtained by updating the old document;

a search step of searching the new document for a document element equivalent to the document element specified by the old position information;

a determination step of determining range information specifying the document element detected by said search step in the new document as new range information;

a second comment data memory step of storing the comment data in correspondence with the equivalent document element, detected in the search step in the new document; and a third comment data memory step of selecting a document element near a position corresponding to the document element specified by the old position information in the new document, and storing new position information specifying the selected document element in correspondence with the comment data, when an equivalent document element is not detected in the search step.

64. A document processing method comprising:

a first document memory step of storing an old document to be updated, which is constituted by a plurality of document elements;

a first comment data memory step of storing comment data to be added to the old document constituted by a plurality of document elements, in correspondence with an old addition range of a character string to which the comment data is added in the old document;

an extraction step of extracting a character string within the old addition range from the old document as a search key character string on a basis of the old range information;

a second document memory step of storing a new document obtained by updating the old document;

a search step of searching the new document for the character string as the search key character string extracted by said extraction step;

a determination step of determining a range of the same character string detected by said search step in the new document as a new addition range of the comment data in the new document;

a second comment data memory step of storing the comment data in correspondence with the new addition range determined by said determination step; and a third comment data memory step of selecting a document element including the old range, represented by the old range information, in the new document, and storing information representing the selected document element as the new range information in correspondence with the comment data, when the character string is not detected in the search step.

65. A document processing method comprising:

a first document memory step of storing an old document to be updated;

a first comment data memory step of storing comment data to be added to the old document, in correspondence with an old addition range of a character string to which the comment data is added in the old document;

an extraction step of extracting a character string within the old addition range in the old document as a search key character string on a basis of the old range information;

a second document memory step of storing a new document obtained by updating the old document;

a search step of searching the new document for the same character string as the search key character string;

a determination step of determining a range of the same character string detected by said search step in the new document as a new addition range of the comment data in the new document; and a second comment data memory step of storing the comment data in correspondence with the new addition range determined by said determination step; and a storage step of storing the comment data in a predetermined area of the new document when an equivalent character string is not detected in the search step.

66. The method according to claim 53, further comprising:

a first display step of displaying a certain range of the document data of the old document or the new document and comment data to be added thereto;

a discrimination step of discriminating whether or not the addition range of the displayed comment data is present within a range of the document data currently displayed in the first display step;

a second display step of displaying a first graphic symbol representing a correspondence between the displayed comment data and the addition range when it is discriminated in the discrimination step that the addition range is present within the currently displayed range of the document data; and a third display step of displaying a second graphic symbol identifiably representing that the addition range falls outside the currently displayed range, and a correspondence between the document data and the displayed comment data when it is discriminated in the discrimination step that the addition range is not present within the currently displayed range of the document data.

* * * * *

UNITED STATES PATENT AND TRADEMARK OFFICE

CERTIFICATE OF CORRECTION

PATENT NO. : 6,438,566 B1 
DATED : August 20, 2002
INVENTOR(S) : Yasuhiro Okuno et al.

It is certified that error appears in the above-identified patent and that said Letters Patent is hereby corrected as shown below:

Title page,
Item [57], ABSTRACT,
Line 3, "comment" should read -- a comment --.

Drawings,
Sheet 16, Figure 21B, "PLURARITY" should read -- PLURALITY --.
Sheet 35, Figure 45, "CONTESTS" should read -- CONTENTS --.
Sheet 41, Figure 53, "CONTESTS" should read -- CONTENTS --.
Sheet 48, Figure 62, "FIL" should read -- FILE --.
Sheet 67, Figure 88, "INFORMAITON" should read -- INFORMATION --.

Column 1,
Line 10, "The" should read -- Field of the Invention ¶ The --.

Column 7,
Line 64, "la," should read -- 1a, --.

Column 10,
Line 64, "file-52." should read -- file 52. --.

Column 11,
Line 12, "newline" should read -- new line --;
Line 53, "element" should read -- elements --.

Column 12,
Line 18, "consisting" should read -- consisting of --;
Line 37, "ma" should read -- a --.

Column 14,
Line 39, "are" should read -- and are --.

Column 15,
Line 23, "newline" should read -- new line --;
Line 59, "here" should read -- where --.

Column 19,
Line 59, "start" should read -- beginning --.

Column 23,
Line 65, "as" should be deleted.

Column 24,
Line 57, "different" should read -- difference --.

Column 25,
Line 59, "using" should read -- using this --.

UNITED STATES PATENT AND TRADEMARK OFFICE
CERTIFICATE OF CORRECTION

PATENT NO. : 6,438,566 B1 
DATED : August 20, 2002
INVENTOR(S) : Yasuhiro Okuno et al.

It is certified that error appears in the above-identified patent and that said Letters Patent is hereby corrected as shown below:

Column 27,
Line 62, "for" should be deleted.

Column 30,
Line 34, "newline" should read -- new line --.

Column 32,
Line 59, "la" should read -- 1a --;
Line 64, "string but," should read -- string, but --.

Column 33,
Line 2, "like" should read -- similarly --;
Line 23, "in" should be deleted.

Column 35,
Line 6, "newline" should read -- new line --.

Column 39,
Line 13, "these" should read -- this --.

Column 40,
Line 58, "readded" should read -- re-added --.

Column 41,
Line 11, "commentadded" should read -- comment-added --.

Column 43,
Line 39, "line 111c)" should read -- line 11c) --.

Column 44,
Line 38, "these" should read -- this --;
Line 42, "origin." should read -- original. --;
Line 47, "$(x_y,y_1$" should read -- $(x_1, y_1)$ --.

Column 48,
Line 1, "mans" should read -- means --.

Column 50,
Line 63, "strong" should read -- storing --.

Column 51,
Line 1, "additional" should read -- addition --.

Column 52,
Line 14, "additional" should read -- addition --;
Line 28, "and" should be deleted.

UNITED STATES PATENT AND TRADEMARK OFFICE

CERTIFICATE OF CORRECTION

PATENT NO. : 6,438,566 B1
DATED : August 20, 2002
INVENTOR(S) : Yasuhiro Okuno et al.

It is certified that error appears in the above-identified patent and that said Letters Patent is hereby corrected as shown below:

Column 53,
Line 42, "mens" should read -- means --;
Lines 63 and 67, "and" should be deleted.

Column 55,
Line 2, "and" should be deleted;
Line 13, "and" should read -- an --;
Line 44, "the" should read -- in the --.

Column 56,
Lines 13 and 55, "and" should be deleted.

Column 58,
Line 18, "second" should read -- a second --;
Line 28, "the a" should read -- a --.

Column 59,
Line 63, "predetermine" should read -- predetermined --.

Column 60,
Line 53, "and" should be deleted;
Line 65, "commend" should read -- comment --.

Column 61,
Line 47, "and" should be deleted.

Column 64,
Line 4, "and" should be deleted.

Signed and Sealed this

Thirtieth Day of December, 2003

JAMES E. ROGAN
*Director of the United States Patent and Trademark Office*